United States Patent
Lienhart et al.

(10) Patent No.: US 9,147,112 B2
(45) Date of Patent: *Sep. 29, 2015

(54) ADVERTISEMENT DETECTION

(71) Applicant: RPX CORPORATION, San Francisco, CA (US)

(72) Inventors: Rainer W. Lienhart, Friedberg (DE); Charles A. Eldering, Furlong, PA (US)

(73) Assignee: RPX Corporation, San Francisco, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/158,978

(22) Filed: Jan. 20, 2014

(65) Prior Publication Data

US 2014/0133695 A1 May 15, 2014

Related U.S. Application Data

(63) Continuation of application No. 13/718,151, filed on Dec. 18, 2012, now Pat. No. 8,634,652, which is a continuation of application No. 13/297,576, filed on Nov. 16, 2011, now Pat. No. 8,374,387, which is a (Continued)

(51) Int. Cl.
*G06K 9/00* (2006.01)
*G06K 9/36* (2006.01)
(Continued)

(52) U.S. Cl.
CPC ...... *G06K 9/00744* (2013.01); *G06F 17/30802* (2013.01); *G06F 17/30814* (2013.01);
(Continued)

(58) Field of Classification Search
CPC .......... G06K 9/00744; G06K 9/00758; G06K 9/3266; G06K 9/00711; G06Q 30/0241; G06Q 30/02; H04N 21/44008; H04N 21/458; H04N 21/41415; H04N 21/8547; H04N 21/4331; H04N 21/2143; H04N 21/2547; H04N 21/812; H04N 7/0887; H04N 21/25891; H04N 21/8456; H04N 21/8405; H04N 21/8352
USPC ................. 382/100, 181, 232, 233, 168, 124; 348/E5.005, E5.002, E7.071, E5.009, 348/E5.108, E7.07, E5.137, E5.109, 335, 348/E5.007, E7.036; 375/240.28, 240.25, 375/E7.211, E7.024, E7.025, E7.268, 375/240.01, E7.267, E7.094, E7.129, 375/E7.25, E7.278, E7.222
See application file for complete search history.

(56) References Cited

U.S. PATENT DOCUMENTS 3,919,479 A 11/1975 Moon et al.
4,888,638 A 12/1989 Bohn
(Continued)

FOREIGN PATENT DOCUMENTS

EP 1313313 5/2003
GB 2361127 10/2001
(Continued)

OTHER PUBLICATIONS

Unpublished U.S. Appl. No. 09/568,084, filed May 10, 2000. First named inventor: Charles A. Eldering.
(Continued)

*Primary Examiner* — Sheela Chawan
(74) *Attorney, Agent, or Firm* — Howison & Arnott, LLP

(57) ABSTRACT

A method and system for detection of video segments in compressed digital video streams is presented. The compressed digital video stream is examine to determine synchronization points, and the compressed video signal is analyzed following detection of the synchronization points to create video fingerprints that are subsequently compared against a library of stored fingerprints.

16 Claims, 34 Drawing Sheets

Related U.S. Application Data continuation of application No. 12/804,615, filed on Jul. 26, 2010, now Pat. No. 8,073,194, which is a continuation of application No. 11/397,815, filed on Apr. 4, 2006, now Pat. No. 7,809,154, which is a continuation-in-part of application No. 11/067,606, filed on Feb. 25, 2005, now Pat. No. 7,738,704, which is a continuation-in-part of application No. 10/790,468, filed on Mar. 1, 2004, now Pat. No. 7,694,318.

(60) Provisional application No. 60/671,380, filed on Apr. 14, 2005, provisional application No. 60/452,802, filed on Mar. 7, 2003, provisional application No. 60/510,896, filed on Oct. 14, 2003.

(51) Int. Cl.
| | | |
|---|---|---|
| *G06F 17/30* | (2006.01) | |
| *G06K 9/32* | (2006.01) | |
| *G06Q 30/02* | (2012.01) | |
| *H04H 60/37* | (2008.01) | |
| *H04N 7/16* | (2011.01) | |
| *H04N 21/214* | (2011.01) | |
| *H04N 21/234* | (2011.01) | |
| *H04N 21/2547* | (2011.01) | |
| *H04N 21/258* | (2011.01) | |
| *H04N 21/2668* | (2011.01) | |
| *H04N 21/414* | (2011.01) | |
| *H04N 21/433* | (2011.01) | |
| *H04N 21/44* | (2011.01) | |
| *H04N 21/458* | (2011.01) | |
| *H04N 21/81* | (2011.01) | |
| *H04N 21/8352* | (2011.01) | |
| *H04N 21/84* | (2011.01) | |
| *H04N 21/8405* | (2011.01) | |
| *H04N 21/845* | (2011.01) | |
| *H04N 21/8547* | (2011.01) | |
| *H04H 60/59* | (2008.01) | |
| *H04N 7/088* | (2006.01) | |

(52) U.S. Cl.
CPC ........ *G06K9/00711* (2013.01); *G06K 9/00758* (2013.01); *G06K 9/3266* (2013.01); *G06Q 30/02* (2013.01); *G06Q 30/0241* (2013.01); *H04H 60/37* (2013.01); *H04N 7/0887* (2013.01); *H04N 7/162* (2013.01); *H04N 21/2143* (2013.01); *H04N 21/23418* (2013.01); *H04N 21/23424* (2013.01); *H04N 21/2547* (2013.01); *H04N 21/25891* (2013.01); *H04N 21/2668* (2013.01); *H04N 21/41415* (2013.01); *H04N 21/4331* (2013.01); *H04N 21/44008* (2013.01); *H04N 21/44016* (2013.01); *H04N 21/458* (2013.01); *H04N 21/812* (2013.01); *H04N 21/8352* (2013.01); *H04N 21/84* (2013.01); *H04N 21/8405* (2013.01); *H04N 21/8455* (2013.01); *H04N 21/8456* (2013.01); *H04N 21/8547* (2013.01); *H04H 60/59* (2013.01); *H04N 7/088* (2013.01)

(56) References Cited

U.S. PATENT DOCUMENTS

| | | |
|---|---|---|
| 4,974,085 A | 11/1990 | Campbell |
| 5,029,014 A | 7/1991 | Lindstrom |
| 5,155,591 A | 10/1992 | Wachob |
| 5,319,455 A | 6/1994 | Hoarty et al. |
| 5,389,964 A | 2/1995 | Oberle |
| 5,436,653 A | 7/1995 | Ellis |
| 5,446,919 A | 8/1995 | Wilkins |
| 5,574,572 A | 11/1996 | Malinowski et al. |
| 5,600,366 A | 2/1997 | Schulman |
| 5,661,516 A | 8/1997 | Carles |
| 5,668,917 A | 9/1997 | Lewine |
| 5,715,018 A | 2/1998 | Fasciano |
| 5,748,263 A | 5/1998 | Ball |
| 5,774,170 A | 6/1998 | Hite |
| 5,892,536 A | 4/1999 | Logan |
| 5,973,723 A | 10/1999 | DeLuca |
| 5,973,750 A | 10/1999 | Ogawa et al. |
| 5,978,381 A | 11/1999 | Perlman et al. |
| 5,986,692 A | 11/1999 | Logan |
| 5,987,210 A | 11/1999 | Iggulden et al. |
| 5,999,689 A | 12/1999 | Iggulden |
| 6,002,443 A | 12/1999 | Iggulden |
| 6,028,950 A | 2/2000 | Merjanian |
| 6,078,896 A | 6/2000 | Kaehler |
| 6,100,941 A | 8/2000 | Dimitrova |
| 6,122,016 A | 9/2000 | DeHaan |
| 6,404,977 B1 | 6/2002 | Iggulden |
| 6,425,127 B1 | 7/2002 | Bates |
| 6,446,261 B1 | 9/2002 | Rosser |
| 6,463,585 B1 | 10/2002 | Hendricks |
| 6,469,749 B1 | 10/2002 | Dimitrova |
| 6,487,721 B1 | 11/2002 | Safadi |
| 6,490,370 B1 | 12/2002 | Krasinski et al. |
| 6,536,037 B1 | 3/2003 | Guheen et al. |
| 6,560,578 B2 | 5/2003 | Eldering |
| 6,577,346 B1 | 6/2003 | Perlman |
| 6,593,976 B1 | 7/2003 | Lord |
| 6,597,405 B1 | 7/2003 | Iggulden |
| 6,606,744 B1 | 8/2003 | Mikurak |
| 6,615,039 B1 | 9/2003 | Eldering |
| 6,633,651 B1 | 10/2003 | Hirzalla |
| 6,646,655 B1 | 11/2003 | Brandt et al. |
| 6,675,174 B1 | 1/2004 | Bolle et al. |
| 6,698,020 B1 | 2/2004 | Zigmond et al. |
| 6,704,930 B1 | 3/2004 | Eldering |
| 6,721,733 B2 | 4/2004 | Lipson et al. |
| 6,738,978 B1 | 5/2004 | Hendricks et al. |
| 6,771,316 B1 | 8/2004 | Iggulden |
| 6,819,863 B2 | 11/2004 | Dagtas et al. |
| 6,820,277 B1 | 11/2004 | Eldering |
| 6,892,193 B2 | 5/2005 | Bolle et al. |
| 6,912,571 B1 | 6/2005 | Serena |
| 6,983,481 B2 | 1/2006 | Fellenstein |
| 6,987,883 B2 | 1/2006 | Lipton et al. |
| 7,020,304 B2 | 3/2006 | Alattar et al. |
| 7,039,932 B2 | 5/2006 | Eldering |
| 7,051,351 B2 | 5/2006 | Goldman |
| 7,055,166 B1 | 5/2006 | Logan et al. |
| 7,062,084 B2 | 6/2006 | Messing et al. |
| 7,064,796 B2 | 6/2006 | Roy et al. |
| 7,068,724 B1 | 6/2006 | Hamilton |
| 7,089,575 B2 | 8/2006 | Agnihotri et al. |
| 7,110,454 B1 | 9/2006 | Chakraborty |
| 7,116,377 B2 | 10/2006 | Zeidler |
| 7,146,632 B2 | 12/2006 | Miller |
| 7,168,083 B2 | 1/2007 | Kalker |
| 7,185,044 B2 | 2/2007 | Ryan et al. |
| 7,185,353 B2 | 2/2007 | Schlack |
| 7,228,555 B2 | 6/2007 | Schlack |
| 7,266,832 B2 | 9/2007 | Miller |
| 7,269,330 B1 | 9/2007 | Iggulden |
| 7,272,295 B1 | 9/2007 | Christopher |
| 7,298,962 B2 | 11/2007 | Quan |
| 7,327,885 B2 | 2/2008 | Divakaran et al. |
| 7,328,448 B2 | 2/2008 | Eldering |
| 7,333,864 B1 | 2/2008 | Herley |
| 7,461,392 B2 | 12/2008 | Herley |
| 7,467,398 B2 | 12/2008 | Fellenstein |
| 7,500,258 B1 | 3/2009 | Eldering |
| 7,650,617 B2 | 1/2010 | Hoshino et al. |
| 7,738,704 B2 * | 6/2010 | Lienhart et al. ............... 382/181 |
| 7,809,154 B2 * | 10/2010 | Lienhart et al. ............... 382/100 |
| 7,813,954 B1 | 10/2010 | Price et al. |
| 8,073,194 B2 * | 12/2011 | Lienhart et al. ............... 382/100 |
| 8,374,387 B2 * | 2/2013 | Lienhart et al. ............... 382/100 |

(56) References Cited

U.S. PATENT DOCUMENTS

| | | | |
|---|---|---|---|
| 8,634,652 B2* | 1/2014 | Lienhart et al. | 382/195 |
| 2001/0032333 A1 | 10/2001 | Flickinger | |
| 2001/0049620 A1 | 12/2001 | Blasko | |
| 2002/0010919 A1 | 1/2002 | Lu et al. | |
| 2002/0067730 A1 | 6/2002 | Hinderks | |
| 2002/0069218 A1 | 6/2002 | Sull et al. | |
| 2002/0072966 A1 | 6/2002 | Eldering | |
| 2002/0075402 A1 | 6/2002 | Robson | |
| 2002/0083439 A1 | 6/2002 | Eldering | |
| 2002/0083441 A1 | 6/2002 | Flickinger | |
| 2002/0083445 A1 | 6/2002 | Flickinger | |
| 2002/0087973 A1 | 7/2002 | Hamilton | |
| 2002/0120925 A1 | 8/2002 | Logan | |
| 2002/0123928 A1 | 9/2002 | Eldering | |
| 2002/0124077 A1 | 9/2002 | Hill et al. | |
| 2002/0126224 A1 | 9/2002 | Lienhart | |
| 2002/0129362 A1 | 9/2002 | Chang | |
| 2002/0144262 A1 | 10/2002 | Plotnick | |
| 2002/0144263 A1 | 10/2002 | Eldering | |
| 2002/0178445 A1 | 11/2002 | Eldering | |
| 2002/0178447 A1 | 11/2002 | Plotnick | |
| 2002/0184047 A1 | 12/2002 | Plotnick | |
| 2002/0186957 A1 | 12/2002 | Yuen | |
| 2002/0194592 A1 | 12/2002 | Tsuchida | |
| 2003/0004810 A1 | 1/2003 | Eldering | |
| 2003/0012548 A1 | 1/2003 | Levy et al. | |
| 2003/0023972 A1 | 1/2003 | Gutta | |
| 2003/0048853 A1 | 3/2003 | Oh et al. | |
| 2003/0093790 A1 | 5/2003 | Logan et al. | |
| 2003/0115595 A1 | 6/2003 | Stevens | |
| 2003/0122966 A1 | 7/2003 | Markman et al. | |
| 2003/0123841 A1 | 7/2003 | Jeannin | |
| 2003/0149975 A1 | 8/2003 | Eldering | |
| 2003/0185541 A1 | 10/2003 | Green | |
| 2003/0192045 A1 | 10/2003 | Fellenstein | |
| 2003/0192046 A1 | 10/2003 | Spehr | |
| 2003/0226150 A1 | 12/2003 | Berberet et al. | |
| 2003/0227475 A1 | 12/2003 | Fellenstein | |
| 2004/0001161 A1 | 1/2004 | Herley | |
| 2004/0025176 A1 | 2/2004 | Franklin et al. | |
| 2004/0128317 A1 | 7/2004 | Sull et al. | |
| 2004/0148625 A1 | 7/2004 | Eldering | |
| 2004/0163106 A1 | 8/2004 | Schrempp et al. | |
| 2004/0189873 A1 | 9/2004 | Konig | |
| 2004/0194130 A1 | 9/2004 | Konig | |
| 2004/0226035 A1 | 11/2004 | Hauser | |
| 2004/0237102 A1 | 11/2004 | Konig | |
| 2004/0260682 A1 | 12/2004 | Herley et al. | |
| 2005/0015795 A1 | 1/2005 | Iggulden | |
| 2005/0044561 A1 | 2/2005 | McDonald | |
| 2005/0066352 A1 | 3/2005 | Herley | |
| 2005/0086621 A1 | 4/2005 | Burges et al. | |
| 2005/0120367 A1 | 6/2005 | Linzer | |
| 2005/0149968 A1 | 7/2005 | Konig | |
| 2005/0166224 A1 | 7/2005 | Ficco | |
| 2005/0172312 A1 | 8/2005 | Lienhart | |
| 2005/0177847 A1 | 8/2005 | Konig | |
| 2005/0193410 A1 | 9/2005 | Eldering | |
| 2005/0253966 A1 | 11/2005 | Martens | |
| 2005/0283796 A1 | 12/2005 | Flickinger | |
| 2006/0015464 A1 | 1/2006 | Dewolde | |
| 2006/0195859 A1* | 8/2006 | Konig et al. | 725/19 |
| 2006/0195860 A1* | 8/2006 | Eldering et al. | 725/19 |
| 2006/0195861 A1 | 8/2006 | Lee | |
| 2006/0242667 A1 | 10/2006 | Petersen | |
| 2006/0245625 A1 | 11/2006 | Tichelaar et al. | |
| 2006/0248569 A1 | 11/2006 | Lienhart | |
| 2006/0271947 A1 | 11/2006 | Lienhart | |
| 2007/0130581 A1 | 6/2007 | DelSesto et al. | |
| 2007/0248224 A1 | 10/2007 | Buskey et al. | |

FOREIGN PATENT DOCUMENTS

| | | |
|---|---|---|
| GB | 2361128 | 10/2001 |
| GB | 2365649 | 2/2002 |
| GB | 2399976 | 9/2004 |
| JP | 11185039 | 7/1999 |
| JP | 11213163 | 8/1999 |
| JP | 21024956 | 1/2001 |
| JP | 21111921 | 4/2001 |
| JP | 22329205 | 11/2002 |
| WO | WO98/20675 | 5/1998 |
| WO | WO98/56128 | 12/1998 |
| WO | WO99/66719 | 12/1999 |
| WO | WO00/36775 | 6/2000 |
| WO | WO00/54504 | 9/2000 |
| WO | WO00/64165 | 10/2000 |
| WO | WO00/70869 | 11/2000 |
| WO | WO01/33848 | 5/2001 |
| WO | WO02/03227 | 1/2002 |
| WO | WO02/09328 | 1/2002 |
| WO | WO02/102079 | 12/2002 |
| WO | WO03/010965 | 2/2003 |
| WO | WO03/052551 | 6/2003 |
| WO | WO03/053058 | 6/2003 |
| WO | WO03/105377 | 12/2003 |

OTHER PUBLICATIONS

Unpublished U.S. Appl. No. 09/635,539, filed Aug. 10, 2000. First named inventor: Charles A. Eldering.

Unpublished U.S. Appl. No. 09/635,544, filed Aug. 10, 2000. First named inventor: Gregory C. Flickinger.

Unpublished U.S. Appl. No. 09/658,204, filed Sep. 8, 2000. First named inventor: Charles A. Eldering.

Unpublished U.S. Appl. No. 09/680,622, fled Oct. 6, 2000. First named inventor: Gregory C. Flickinger.

Unpublished U.S. Appl. No. 09/712,790, filed Nov. 14, 2000. First named inventor: Charles A. Eldering.

Unpublished U.S. Appl. No. 10/031,268, filed Mar. 23, 2002. First named inventor: Charles A. Eldering.

Unpublished U.S. Appl. No. 10/049,246, filed Jan. 28, 2002. First named inventor: Jeffrey S. Hamilton.

Rainer Lienhart et al, On the Detection and Recognition of Television Commercials, University of Mannheim, Praktische Informatik vol. IV, Apr. 1997, 509-516, Mannheim, Germany.

Product Literature, "A Feature-Based Algorithm for Detecting and Classifying Production Effects" printed from http://www.c.s.cornell.edu/rdz/Papers/Archive/90070119 on Mar. 26, 2004.

Product Literature, Mork, Peter et al, "Indexing Tamper Resistant Features for Image Copy Detection," printed from the hhttp://www-db.stanford.edu/chenli/rime/demo1.0.html on Mar. 26, 2004; 1999; 5 pp.

IEEE Paper "Localizing and Segmenting Text in Images and Videos" by Lienhart, R. and Wernicke, A., Apr. 2002, 13 pp.

Minerva M. Yeung & Bede Liu, Efficient Matching and Clustering of Video Shots, Sep. 1995, 338-341, Princeton Univeristy, Princeton, NJ.

GM Landau/Vishkin, "Pattern matching in a digitized image".

Greg Pass/Ramin Zabih/Justin Miller;, "Comparing Images Using Color Coherence Vectors".

Fullà, et al; Detección de anuncios en secuencias de televisión; Universidad Politécnia de Valencia, Dept de Comunicaciones, Oct. 13, 2003, 100 pgs.

Fullà and Albiol, Detection of TV Commercials; Technical University of Valencia, pp. 541-544.

Drucker; et al; "Smartskip: Consumer Level Browsing and Skipping of Digital Video Content"; Technology to Help people find information; Minn, MN; Apr. 20-25, 2002; vol. 4, Issue 1; pp. 219-226.

Dimitrova, et al; On Selective Video Content Analysis & Filtering; IS&T/SPIE Conf. on Storage and Retrieval of Media Databases; Jan. 2000; SPIE vol. 3972; 10 pgs.

Dimitrova, et al; "Applications of Video Content Analysis and Retrieval"; IEEE Multimedia, Jul.-Sep. 2002; pp. 42-54.

(56) References Cited

OTHER PUBLICATIONS

Gauch J.M. et al; "Identification of New Commercials Using Repeated Video Sequence Detection", Proceedings of IEEE International Conf. on Image Processing, ICIP '2005 Sep. 11, 2005, pp. 1252-1255.

Pua K.M. et al; "Real time repeated video sequence identification", Computer Vision and Image Understanding Academic Press, San Diego, CA, vol. 93, No. 3, Mar. 2004, pp. 310-327.

Naturel, X et al; "A fast shot matching strategy for detecting duplicate sequences in a television stream", Proceedings of the 2nd International Workshop on Computer Vision Meets Databases, Baltimore, MD, International Conference Proceedings Series, Jun. 17, 2005, pp. 21-27. ACM Press, NY.

NextStream, "A Solution for Ad Insertion within a Digital Television Network"; Sep. 2003.

D.C. Hutchison et al., "Application of Second Generation Advanced Multi-media Display Processor (AMDP2) in a Digital Micro-Mirror Array Based HDTV", IEEE, 2001.

E. McGrath, "Digital Insertion of Advertising into a Digital Stream (DID)", International Broadcasting Convention, IEEE 1997.

\* cited by examiner

|     |     |     |     |     |     |     |     |     |     |     |     |
| --- | --- | --- | --- | --- | --- | --- | --- | --- | --- | --- | --- |
| 320 ↙ 10 | 00 | 00 | 00 | 10 | 00 | 00 | 00 | 10 | 00 | 00 | 00 |
| 330 ↙ $R_2$ | $G_0$ | $B_0$ | $R_0$ | $G_2$ | $B_0$ | $R_0$ | $G_0$ | $B_2$ | $R_0$ | $G_0$ | $B_0$ |
| 10 | 00 | 01 | 00 | 10 | 01 | 00 | 00 | 11 | 00 | 00 | 01 |
| $R_2$ | $G_0$ | $B_1$ | $R_0$ | $G_2$ | $B_1$ | $R_0$ | $G_0$ | $B_3$ | $R_0$ | $G_0$ | $B_1$ |
| 10 | 01 | 00 | 00 | 11 | 00 | 00 | 01 | 10 | 00 | 01 | 00 |
| $R_2$ | $G_1$ | $B_0$ | $R_0$ | $G_3$ | $B_0$ | $R_0$ | $G_1$ | $B_2$ | $R_0$ | $G_1$ | $B_0$ |
| 11 | 00 | 00 | 01 | 10 | 00 | 01 | 00 | 10 | 01 | 00 | 00 |
| $R_3$ | $G_0$ | $B_0$ | $R_1$ | $G_2$ | $B_0$ | $R_1$ | $G_0$ | $B_2$ | $R_1$ | $G_0$ | $B_0$ |

| $R_0$ | $R_1$ | $R_2$ | $R_3$ | $G_0$ | $G_1$ | $G_2$ | $G_3$ | $B_0$ | $B_1$ | $B_2$ | $B_3$ |
| --- | --- | --- | --- | --- | --- | --- | --- | --- | --- | --- | --- |
| 9 | 3 | 3 | 1 | 9 | 3 | 3 | 1 | 9 | 3 | 3 | 1 |

| LABEL (COLOR) | FEATURE VECTOR (COUNT) |
|---|---|
| 0 | 4 |
| 1 | 2 |
| 2 | 2 |
| 3 | 1 |

400

| LABEL (COLOR) | FEATURE VECTOR (COUNT) |
|---|---|
| 0 | 2 |
| 1 | 3 |
| 2 | 1 |
| 3 | 3 |

410

420 $\sim$ ( | 4 - 2 | + | 2 - 3 | + | 2 - 1 | + | 1 - 3 | ) = 6

SUM OF ABSOLUTE DIFFERENCES

430 $\sim$ $((4-2)^2 + (2-3)^2 + (2-1)^2 + (1-3)^2) =$ 10

SUM OF SQUARES

FIG. 4

| LABEL (COLOR) | FEATURE VECTOR (COUNT) |
|---|---|
| 0 | 2 |
| 1 | 3 |
| 2 | 1 |
| 3 | 3 |

600

| LABEL (COLOR) | FEATURE VECTOR (COUNT) |
|---|---|
| 0 - C | 2 |
| 0 - I | 0 |
| 1 - C | 3 |
| 1 - I | 0 |
| 2 - C | 0 |
| 2 - I | 1 |
| 3 - C | 2 |
| 3 - I | 1 |

604

| LABEL (COLOR) | FEATURE VECTOR (COUNT) |
|---|---|
| 0 | 2 |
| 1 | 3 |
| 2 | 1 |
| 3 | 3 |

602

| LABEL (COLOR) | FEATURE VECTOR (COUNT) |
|---|---|
| 0 - C | 0 |
| 0 - I | 2 |
| 1 - C | 2 |
| 1 - I | 1 |
| 2 - C | 0 |
| 2 - I | 1 |
| 3 - C | 3 |
| 3 - I | 0 |

606

608 ΔCH = | 2 - 2 | + | 3 - 3 | + | 1 - 1 | + | 3 - 3 | = 0

610 ΔCCV = ( | 2-0 | + | 0-2 | ) + ( | 3-2 | + | 0-1 | ) + ( | 0-0 | + | 1-1 | ) + ( | 2-3 | + | 1-0 | ) = 8

*FIG. 6A*

| LABEL (REGION ) | FEATURE VECTOR (AVG. COLOR) |
|---|---|
| 710 | 1.5 |
| 720 | 2.5 |
| 730 | 1.0 |
| 740 | 1.5 |
| 750 | 2.0 |
| 760 | 1.5 |
| 770 | 1.75 |
| 780 | 1.25 |
| 785 | 1.5 |
| 790 | 0.5 |
| 795 | 2.5 |

FIG. 7

| LABEL (COLOR) | FEATURE VECTOR (COUNT) |
|---|---|
| 0 | 61 |
| 1 | 60 |

900

| LABEL (COLOR) | FEATURE VECTOR (COUNT) |
|---|---|
| 0 | 61 |
| 1 | 60 |

910

$920$ $\Delta CH = 0$

| LABEL (COLOR) | FEATURE VECTOR (COUNT) |
|---|---|
| 0 - C | 47 |
| 0 - I | 14 |
| 1 - C | 50 |
| 1 - I | 10 |

930

| LABEL (COLOR) | FEATURE VECTOR (COUNT) |
|---|---|
| 0 - C | 47 |
| 0 - I | 14 |
| 1 - C | 50 |
| 1 - I | 10 |

940

$950$ $\Delta CCV = 0$

| LABEL (REGION) | FEATURE VECTOR (AVG. COLOR) |
|---|---|
| 815 | 0 |
| 820 | 0 |
| 825 | .5 |
| 830 | .5 |
| 835 | .5 |
| 840 | .5 |
| 845 | .5 |
| 850 | .5 |

960

| LABEL (REGION) | FEATURE VECTOR (AVG. COLOR) |
|---|---|
| 855 | .5 |
| 860 | .5 |
| 865 | 0 |
| 870 | 1 |
| 875 | 1 |
| 880 | 0 |
| 885 | .75 |
| 890 | .25 |

970

$980$  $\Delta AC = |0-.5| + |0-.5| + |0-.5| + |.5-0| + |.5-1| + |.5-1| + |.5-0| + |.5-.75| + |.5-.25| = 3.5$

FIG. 9

ADVERTISEMENT DETECTION

CROSS REFERENCE TO RELATED APPLICATION

This application is a continuation of U.S. patent application Ser. No. 13/718,151, filed Dec. 18, 2012, entitled Video Entity Recognition in Compressed Digital Video Streams, which is a continuation of U.S. patent application Ser. No. 13/297,576, filed Nov. 16, 2011, entitled Video Entity Recognition in Compressed Digital Video Streams, now U.S. Pat. No. 8,374,387, which is a continuation of U.S. patent application Ser. No. 12/804,615, filed Jul. 26, 2010, entitled Video Entity Recognition in Compressed Digital Video Streams, now U.S. Pat. No. 8,073,194, which is a continuation of U.S. patent application Ser. No. 11/397,815, filed Apr. 4, 2006, entitled Video Entity Recognition in Compressed Digital Video Streams, now U.S. Pat. No. 7,809,154, which is a continuation-in-part of U.S. patent application Ser. No. 11/067,606, filed Feb. 25, 2005, entitled Detecting Known Video Entities Utilizing Fingerprints, now U.S. Pat. No. 7,738,704, which is a continuation-in-part of U.S. patent application Ser. No. 10/790,468, filed Mar. 1, 2004, entitled Video Detection and Insertion, now U.S. Pat. No. 7,694,318. U.S. patent application Ser. No. 11/397,815 claims the benefit of U.S. Provisional Patent Application No. 60/671,380, filed Apr. 14, 2005, entitled Video Entity Recognition in Compressed Digital Video Streams. U.S. patent application Ser. No. 10/790,468 claims the benefit of U.S. Provisional Application No. 60/452,802, filed Mar. 7, 2003, entitled System and Method for Advertisement Substitution in Broadcast and Prerecorded Video Streams; and U.S. Provisional Application No. 60/510,896, filed Oct. 14, 2003, entitled Video Detection and Insertion.

The entire disclosures of the above listed Applications, including U.S. patent application Ser. No. 13/297,576, U.S. patent application Ser. No. 12/804,615, U.S. patent application Ser. No. 11/397,815, U.S. patent application Ser. No. 11/067,606, U.S. patent application Ser. No. 10/790,468, U.S. Provisional Patent Application No. 60/671,380, U.S. Provisional Application No. 60/452,802 and U.S. Provisional Application No. 60/510,896 are incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Detection of video segments is used to recognize known video segments and take subsequent video processing steps. In one example, specific advertisements or video scenes are detected in a video stream and substituted or deleted from the video stream. In other applications it is desirable to recognize certain scenes for other purposes such as video indexing or the creation of other metadata or other reference material attached to that particular video scene. In all of these examples it is necessary to be able to recognize a known video segment.

Methods have been developed which can be used to detect known video sequences. These methods include recognition of certain characteristics associated with scene changes or certain video segments as well as the comparison of video segments with fingerprints of those video segments. In the fingerprinting technique, the known video segments are characterized and the incoming video stream is compared with the characterizations to determine if a known video sequence is in fact present at that time.

One technique for recognizing video segments is to create a color coherence vector (CCV) or a low-res image (e.g., of size 8 by 8 pixels) representation of a known video sequence and compare the CCV or low-res image fingerprint against the color coherence vectors or low-res images of incoming video streams. Other techniques can be used to compare the incoming video to stored fingerprints but all of the known presently used techniques are based on operations performed in the uncompressed domain. This requires that the video be completely decompressed in order to calculate the specific parameters of the fingerprint and perform a comparison. Even in the instances in which there is a partial decompression, specific algorithms performed on the decompressed stream need to be performed to compare the incoming video stream with the fingerprint. It is desirable to have a method and system of detecting video sequences in compressed digital video streams prior to their decompression.

BRIEF SUMMARY OF THE INVENTION

The present method and system is based on the use of statistical parameters of compressed digital video streams for the recognition of known video segments by comparison against fingerprints. The method and system can be used to identify the video segments by comparing statistical parameters of the compressed stream with fingerprints of known video sequences, those fingerprints containing parameters related to the compressed stream. The technique may also be used in conjunction with fingerprinting techniques based on the uncompressed domain such that a partial comparison is made in the compressed domain and a subsequent comparison is made in the uncompressed domain. One of the advantages of the present method and system is that it allows for more efficient and rapid identification of known video sequences and does not rely on processing completely in the uncompressed domain. Synchronization can be obtained from the compressed digital video signal. In other words, the compressed fingerprint may serve as a fast pre-filter to find matching candidates, while the (slower) comparison in the uncompressed domain is used for verification. Based on the detection of synchronization points, subsequent signal processing is facilitated to provide efficient fingerprinting of the incoming digital video signal.

The present method and system is used to detect a known video entity within a compressed digital video stream. The compressed digital stream is received, and synchronization points are determined within the compressed stream. Statistical parameterized representations of the compressed digital video stream for windows following the synchronization points in the video stream are created, and compared to windows of a plurality of fingerprints that includes associated statistical parameterized representations of known video entities. A known video entity is detected in the compressed digital video stream when at least one of the plurality of fingerprints has at least a threshold level of similarity to fingerprint created from the video stream.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the Drawings:

FIG. 3 shows an exemplary pixel grid for a video frame and an associated color histogram, according to one embodiment of the present invention;

FIG. 4 shows an exemplary comparison of two color histograms, according to one embodiment of the present invention;

FIG. 6A shows an exemplary comparison of color histograms and CCVs for two images, according to one embodiment of the present invention;

FIG. 7 shows an exemplary pixel grid for a video frame with a plurality of regions sampled and the determination of the average color for a regions, according to one embodiment of the present invention;

FIG. 9 shows exemplary comparisons of the pixel grids of FIG. 8 based on color histograms for the entire frame, CCVs for the entire frame and average color for the plurality of regions, according to one embodiment of the present invention;

DETAILED DESCRIPTION OF THE INVENTION

Figure 1:
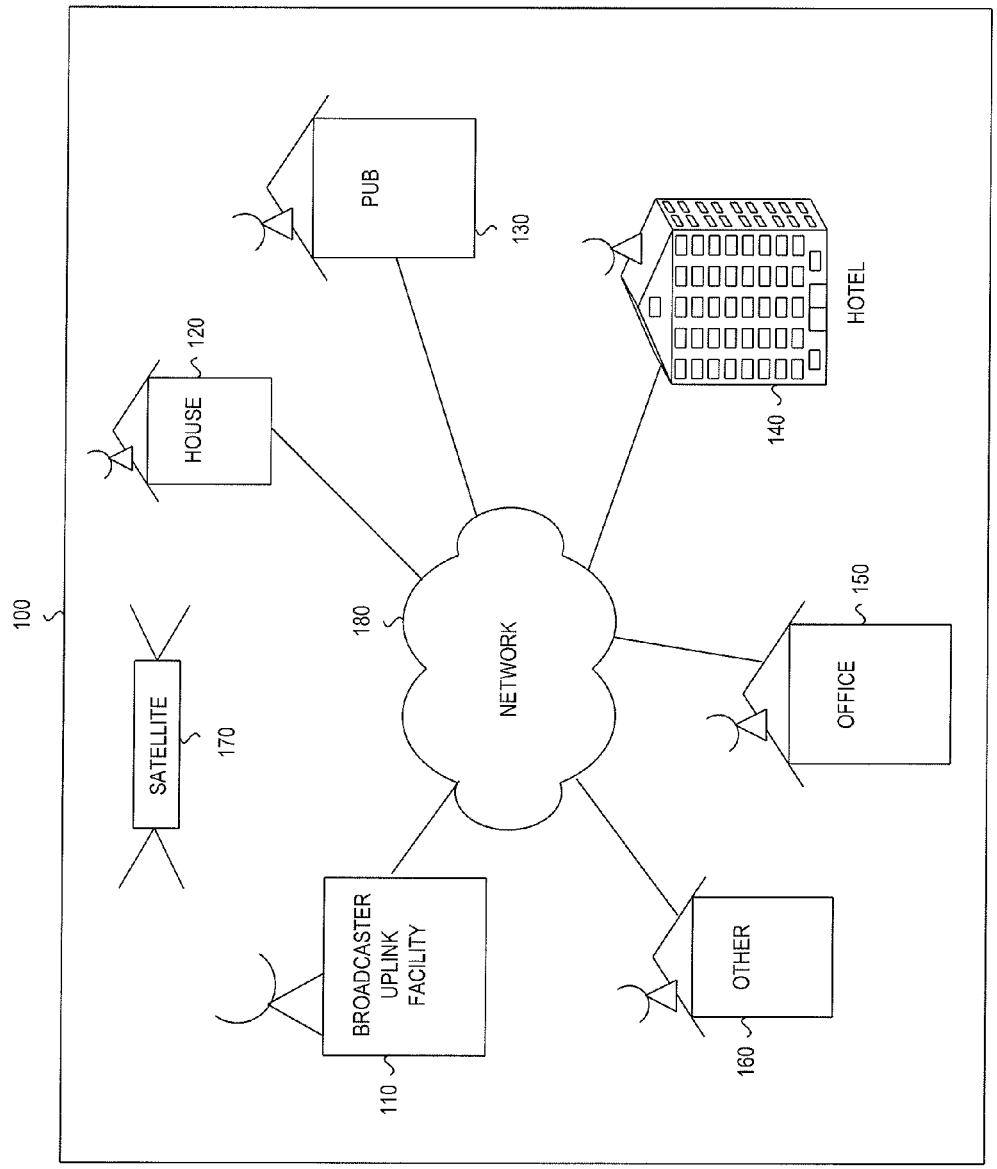
FIG. 1 is a diagram of a content delivery system, according to one embodiment of the present invention.

Certain terminology is used herein for convenience only and is not to be taken as a limitation on the present invention.

In the drawings, the same reference letters are employed for designating the same elements throughout the several figures.

An exemplary content delivery system 100 is shown in FIG. 1. The system 100 includes a broadcast facility 110 and receiving/presentation locations. The broadcast facility 110 transmits content to the receiving/presentation facilities and the receiving/presentation facilities receive the content and present the content to subscribers. The broadcast facility 110 may be a satellite transmission facility, a head-end, a central office or other distribution center. The broadcast facility 110 may transmit the content to the receiving/presentation locations via satellite 170 or via a network 180. The network 180 may be the Internet, a cable television network (e.g., hybrid fiber cable, coaxial), a switched digital video network (e.g., digital subscriber line, or fiber optic network), broadcast television network, other wired or wireless network, public network, private network, or some combination thereof. The receiving/presentation facilities may include residence 120, pubs, bars and/or restaurants 130, hotels and/or motels 140, business 150, and/or other establishments 160.

In addition, the content delivery system 100 may also include a Digital Video Recorder (DVR) that allows the user (residential or commercial establishment) to record and playback the programming. The methods and system described herein can be applied to DVRs both with respect to content being recorded as well as content being played back.

The content delivery network 100 may deliver many different types of content. However, for ease of understanding the remainder of this disclosure will concentrate on programming and specifically video programming. Many programming channels include advertisements with the programming. The advertisements may be provided before and/or after the programming, may be provided in breaks during the programming, or may be provided within the programming (e.g., product placements, bugs, banner ads). For ease of understanding the remainder of the disclosure will focus on advertisements opportunities that are provided between programming, whether it be between programs (e.g., after one program and before another) or during programming (e.g., advertisement breaks in programming, during time outs in sporting events). The advertisements may subsidize the cost of the programming and may provide additional sources of revenue for the broadcaster (e.g., satellite service provider, cable service provider).

In addition to being able to recognize advertisements it is also possible to detect particular scenes of interest or to generically detect scene changes. A segment of video or a particular image, or scene change between images, which is of interest, can be considered to be a video entity. The library of video segments, images, scene changes between images, or fingerprints of those images can be considered to be comprised of known video entities.

A variety of mechanisms for detection of video entities and subsequently mechanisms for defeating the automated detection of video entities such as intros, outros, and advertisements are discussed herein.

As the advertisements provided in the programming may not be appropriate to the audience watching the programming at the particular location, substituting advertisements may be beneficial and/or desired. Substitution of advertisements can be performed locally (e.g., residence 120, pub 130, hotel 140) or may be performed somewhere in the video distribution system 100 (e.g., head end, nodes) and then delivered to a specific location (e.g., pub 130), a specific geographic region (e.g., neighborhood), subscribers having specific traits (e.g., demographics) or some combination thereof. For ease of understanding, the remaining disclosure will focus on local substitution as the substitution and delivery of targeted advertisements from within the system 100.

Substituting advertisements requires that advertisements be detected within the programming. The advertisements may be detected using information that is embedded in the program stream to define where the advertisements are. For analog programming cue tones may be embedded in the programming to mark the advertisement boundaries. For digital programming digital cue messages may be embedded in the programming to identify the advertisement boundaries. Once the cue tones or cue tone messages are detected, a targeted advertisement or targeted advertisements may be substituted in place of a default advertisement, default advertisements, or an entire advertisement block. The local detection of cue tones (or cue tone messages) and substitution of targeted advertisements may be performed by local system equipment including a set top box (STB) or DVR. However, not all programming streams include cue tones or cue tone messages. Moreover, cue tones may not be transmitted to the STB or DVR since the broadcaster may desire to suppress them to prevent automated ad detection (and potential deletion).

Techniques for detecting advertisements without the use of cue tones or cue messages include manual detection (e.g., individuals detecting the start of advertisements) and automatic detection. Regardless of what technique is used, the detection can be performed at various locations (e.g., pubs 130, hotels 140). Alternatively, the detection can be performed external to the locations where the external detection points may be part of the system (e.g., node, head end) or may be external to the system. The external detection points would inform the locations (e.g., pubs 130, hotels 140) of the detection of an advertisement or advertisement block. The communications from the external detection point to the locations could be via the network 170. For ease of understanding this disclosure, we will focus on local detection.

Figure 2:
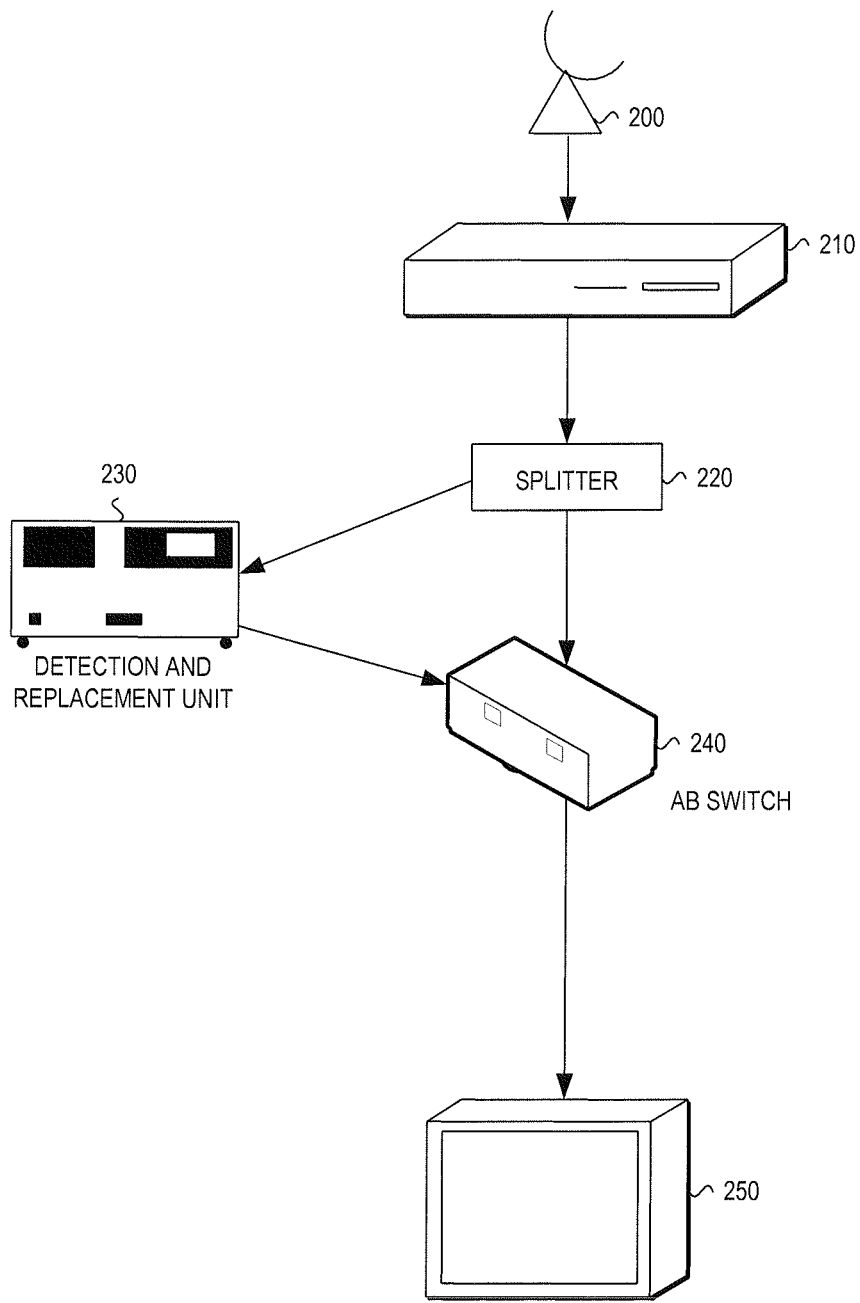
FIG. 2 is a diagram of a configuration for local detection of advertisements within a video programming stream used in the content delivery system of FIG. 1, according to one embodiment of the present invention.

An exemplary configuration for manual local detection of advertisements within a video programming stream is shown in FIG. 2. The incoming video stream is received by a network interface device (NID) 200. The type of network interface device will be dependent on how the incoming video stream is being delivered to the location. For example, if the content is being delivered via satellite (e.g., 170 of FIG. 1) the NID 200 will be a satellite dish (illustrated as such) for receiving the incoming video stream. The incoming video stream is provided to a STB 210 (a tuner) that tunes to a desired channel, and possibly decodes the channel if encrypted or compressed. It should be noted that the STB 210 may also be capable of recording programming as is the case with a DVR or video cassette recorder VCR.

The STB 210 forwards the desired channel (video stream) to a splitter 220 that provides the video stream to a detection/replacement device 230 and a selector (e.g., A/B switch) 240. The detection/replacement device 230 detects and replaces advertisements by creating a presentation stream consisting of programming with targeted advertisements. The selector 240 can select which signal (video steam or presentation stream) to output to an output device 250 (e.g., television). The selector 240 may be controlled manually by an operator, may be controlled by a signal/message (e.g., ad break beginning message, ad break ending message) that was generated and transmitted from an upstream detection location, and/or may be controlled by the detection/replacement device 230. The splitter 220 and the selector 240 may be used as a bypass circuit in case of an operations issue or problem in the detection/replacement device 230. The default mode for the selector 240 may be to pass-through the incoming video stream.

Manually switching the selector 240 to the detection/replacement device 230 may cause the detection/replacement device 230 to provide advertisements (e.g., targeted advertisements) to be displayed to the subscriber (viewer, user). That is, the detection/replacement device 230 may not detect and insert the advertisements in the program stream to create a presentation stream. Accordingly, the manual switching of the selector 240 may be the equivalent to switching a channel from a program content channel to an advertisement channel. Accordingly, this system would have no copyright issues associated therewith as no recording, analyzing, or manipulation of the program stream would be required.

While the splitter 220, the detection/replacement device 230, and the selector 240 are all illustrated as separate components they are not limited thereby. Rather, all the components could be part of a single component (e.g., the splitter 220 and the selector 240 contained inside the detection/replacement device 230; the splitter 220, the detection/replacement device 230, and the selector 240 could be part of the STB 210).

Automatic techniques for detecting advertisements (or advertisement blocks) may include detecting aspects (features) of the video stream that indicate an advertisement is about to be displayed or is being displayed (feature based detection). For example, advertisements are often played at a higher volume than programming so a sudden volume increase (without commands from a user) may indicate an advertisement. Many times several dark monochrome (black) frames of video are presented prior to the start of an advertisement so the detection of these types of frames may indicate an advertisement. The above noted techniques may be used individually or in combination with one another. These techniques may be utilized along with temporal measurements, since commercial breaks often begin within a certain known time range. However, these techniques may miss advertisements if the volume does not increase or if the display of black frames is missing or does not meet a detection threshold. Moreover, these techniques may result in false positives (detection of an advertisement when one is not present) as the programming may include volume increases or sequences of black frames.

Frequent scene/shot breaks are more common during an advertisement since action/scene changes stimulate interest in the advertisement. Additionally, there is typically more action and scene changes during an advertisement block. Accordingly, another possible automatic feature based technique for detecting advertisements is the detection of scene/shot breaks (or frequent scene/shot breaks) in the video programming. Scene breaks may be detected by comparing consecutive frames of video. Comparing the actual images of consecutive frames may require significant processing. Alternatively, scene/shot breaks may be detected by computing characteristics for consecutive frames of video and for comparing these characteristics. The computed characteristics may include, for example, a color histogram or a color coherence vector (CCV). The detection of scene/shot breaks may result in many false positives (detection of scene changes in programming as opposed to actual advertisements).

A color histogram is an analysis of the number of pixels of various colors within an image or frame. Prior to calculating a color histogram the frame may be scaled to a particular size (e.g., a fixed number of pixels), the colors may be reduced to the most significant bits for each color of the red, blue, green (RGB) spectrum, and the image may be smoothed by filtering. As an example, if the RGB spectrum is reduced to the 2 most significant bits for each color (4 versions of each color) there will be a total of 6 bits for the RGB color spectrum or 64 total color combinations ($2^6$).

An exemplary pixel grid 300 for a video frame and an associated color histogram 310 is shown in FIG. 3. As illustrated the pixel grid 300 is 4×4 (16 pixels) and each grid is identified by a six digit number with each two digit portion 320 representing a specific color (RGB). Below the digit is the color identifier for each color 330. For example, an upper left grid has a 100000 as the six digit number which equates to $R_2$, $G_0$ and $B_0$. As discussed, the color histogram 310 is the number of each color in the overall pixel grid. For example in FIG. 3, the 9 $R_0$'s in the pixel grid 300 are indicated in the first column 340 of the color histogram 310.

FIG. 4 shows an exemplary comparison of two color histograms 400, 410. The comparison entails computing the difference/distance between the two. The distance may be computed for example by summing the absolute differences (L1–Norm) 420 or by summing the square of the differences (L2–Norm) 430. For simplicity and ease of understanding we assume that the image contains only 9 pixels and that each pixel has the same bit identifier for each of the colors in the RGB spectrum such that each color is represented by a single number. The difference between the color histograms 400, 410 is 6 using the absolute difference method 420 and 10 using the squared difference method 430. Depending on the method utilized to compare the color histograms the threshold used to detect scene changes or other parameters may be adjusted accordingly.

A color histogram tracks the total number of colors in a frame. Thus, it is possible that when comparing two frames that are completely different but utilize similar colors throughout, a false match will occur. CCVs divide the colors from the color histogram into coherent and incoherent ones based on how the colors are grouped together. Coherent colors are colors that are grouped together in more than a threshold number of connected pixels and incoherent colors are colors that are either not grouped together or are grouped together in less than a threshold number of pixels. For example, if 8 is the threshold and there are only 7 red pixels grouped (connected together) then these 7 red pixels are considered incoherent.

Figure 5:
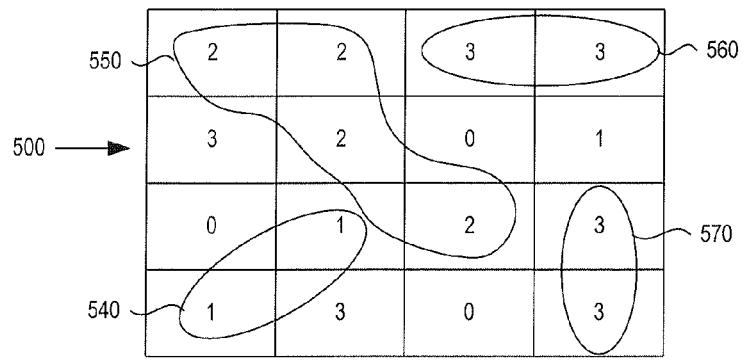
FIG. 5 shows an exemplary pixel grid for a video frame and associated color histogram and color coherence vector, according to one embodiment of the present invention, according to one embodiment of the present invention.

An exemplary pixel grid 500 for a video frame and associated color histogram 510 and CCVs 520, 530 is shown in FIG. 5. For ease of understanding we assume that all of the colors in the pixel grid have the same number associated with each of the colors (RGB) so that a single number represents each color and the pixel grid 500 is limited to 16 pixels. Within the grid 500 there are some colors that are grouped together (has at least one other color at a connected pixel— one of the 8 touching pixels) and some colors that are by themselves. For example, two color 1s 540, four color 2s 550, and four (two sets of 2) color 3s 560, 570 are grouped (connected), while three color 0s, one color 1, and two color 3s are not grouped (connected). The color histogram 510 indicates the number of each color. A first CCV 520 illustrates the number of coherent and incoherent colors assuming that the threshold grouping for being considered coherent is 2 (that is a grouping of two pixels of the same color means the pixels are coherent for that color). A second CCV 530 illustrates the number of coherent and incoherent colors assuming that the threshold grouping was 3. The colors impacted by the change in threshold are color 0 (went from 2 coherent and 1 incoherent to 0 coherent and 3 incoherent) and color 3 (went from 4 coherent and 2 incoherent to 0 coherent and 6 incoherent). Depending on the method utilized to compare the CCVs the threshold used for detecting scene changes or other parameters may be adjusted accordingly.

FIG. 6A shows an exemplary comparison of color histograms 600, 602 and CCVs 604, 606 for two images. In order to compare, the differences (distances) between the color histograms and the CCVs can be calculated. The differences may be calculated, for example, by summing the absolute differences (L1-Norm) or by summing the square of the differences (L2-Norm). For simplicity and ease of understanding assume that the image contains only 9 pixels and that each pixel has the same bit identifier for each of the colors in the RGB spectrum. As illustrated the color histograms 600, 602 are identical so the difference ($\Delta$CH) 608 is 0 (calculation illustrated for summing the absolute differences). The difference ($\Delta$CCV) 610 between the two CCVs 604 606 is 8 (based on the sum of the absolute differences method).

Another possible feature based automatic advertisement detection technique includes detecting action (e.g., fast moving objects, hard cuts, zooms, changing colors) as an advertisement may have more action in a short time than the programming. According to one embodiment, action can be determined using edge change ratios (ECR). ECR detects structural changes in a scene, such as entering, exiting and moving objects. The changes are detected by comparing the edge pixels of consecutive images (frames), n and n−1. Edge pixels are the pixels that form a distinct boundary between two distinct objects or surfaces within a scene (e.g., a person, a house). A determination is made as to the total number of edge pixels for two consecutive images, $\sigma_n$ and $\sigma_{n-1}$, the number of edge pixels exiting a first frame, $X_{n-1}^{out}$ and the number of edge pixels entering a second image, $X_n^{in}$. The ECR is the maximum of (1) the ratio of outgoing edge pixels to total pixels for a first image $$\left(\frac{X_{n-1}^{out}}{\sigma_{n-1}}\right),$$

or (2) the ratio of incoming edge pixels to total pixels for a second image $$\left(\frac{X_n^{in}}{\sigma_n}\right).$$

Figure 6B:
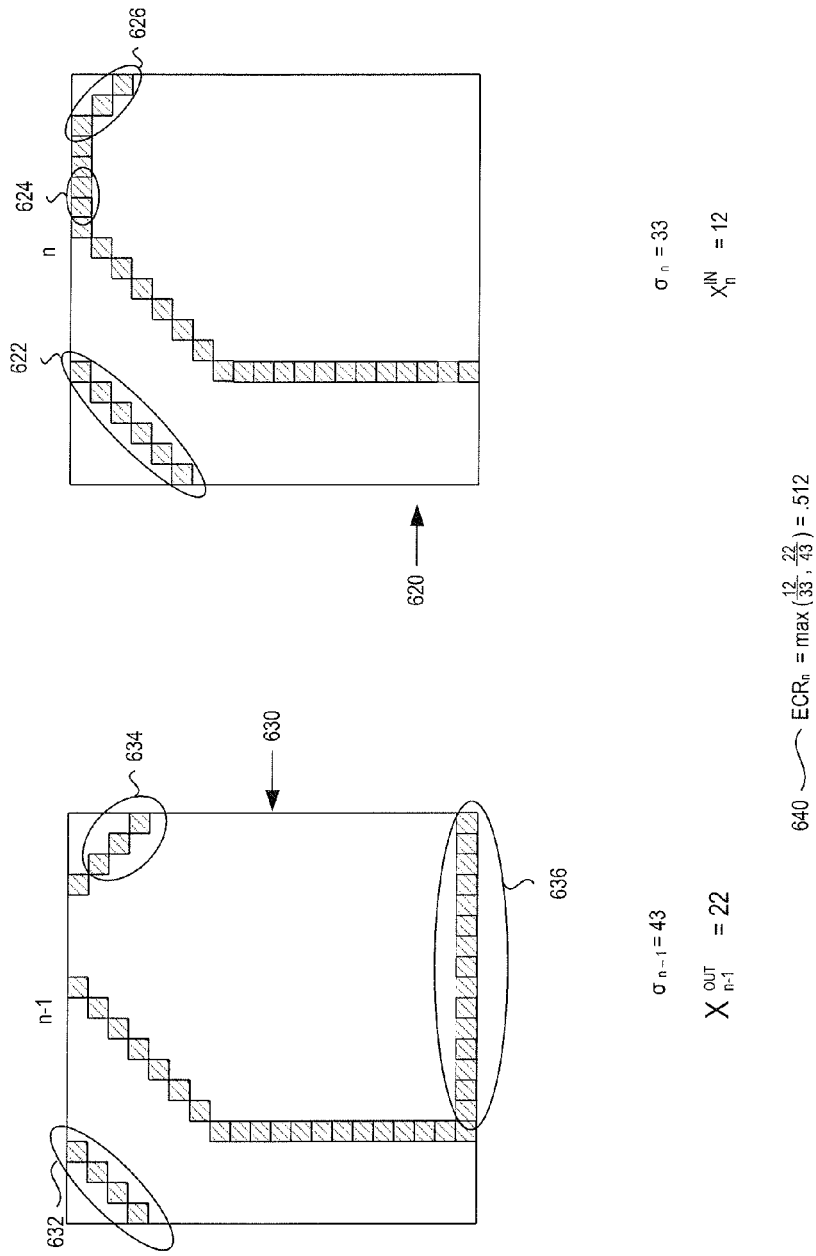
FIG. 6B shows comparison of edge pixels for two exemplary consecutive images, according to one embodiment of the present invention.

Two exemplary consecutive images, n 620 and n−1 630 are shown in FIG. 6B. Edge pixels for each of the images are shaded. The total number of edge pixels for image n−1, $\sigma_{n-1}$, is 43 while the total number of edge pixels for image n, $\sigma_n$, is 33. The pixels circled 632, 634, and 636 in image n−1 are not part of the image n (they exited image n−1). Accordingly, the number of edge pixels exiting image n−1, $X_{n-1}^{out}$, is 22. The pixels circled 622, 624, and 626 in image n were not part of image n−1 (they entered image n). Accordingly, the number of edge pixels entering image n, $X_n^{in}$, is 12. The ECR 640 is the greater of the two ratios $$\frac{X_{n-1}^{out}}{\sigma_{n-1}}(22/43) \text{ and } \frac{X_n^{in}}{\sigma_n}(12/33).$$

Accordingly, the ECR value is 0.512.

Action can be determined using a motion vector length (MVL). The MVL divides images (frames) into macroblocks (e.g., 16×16 pixels). A determination is then made as to where each macroblock is in the next image (e.g., distance between macroblock in consecutive images). The determination may be limited to a certain number of pixels (e.g., 20) in each direction. If the location of the macroblock can not be determined then a predefined maximum distance may be defined (e.g., 20 pixels in each direction). The macroblock length vector for each macroblock can be calculated as the square root of the sum of the squares of the differences between the x and y coordinates ($\sqrt{(x_1-x_x)^2+(y_1+y_2)^2}$).

Figure 6C:
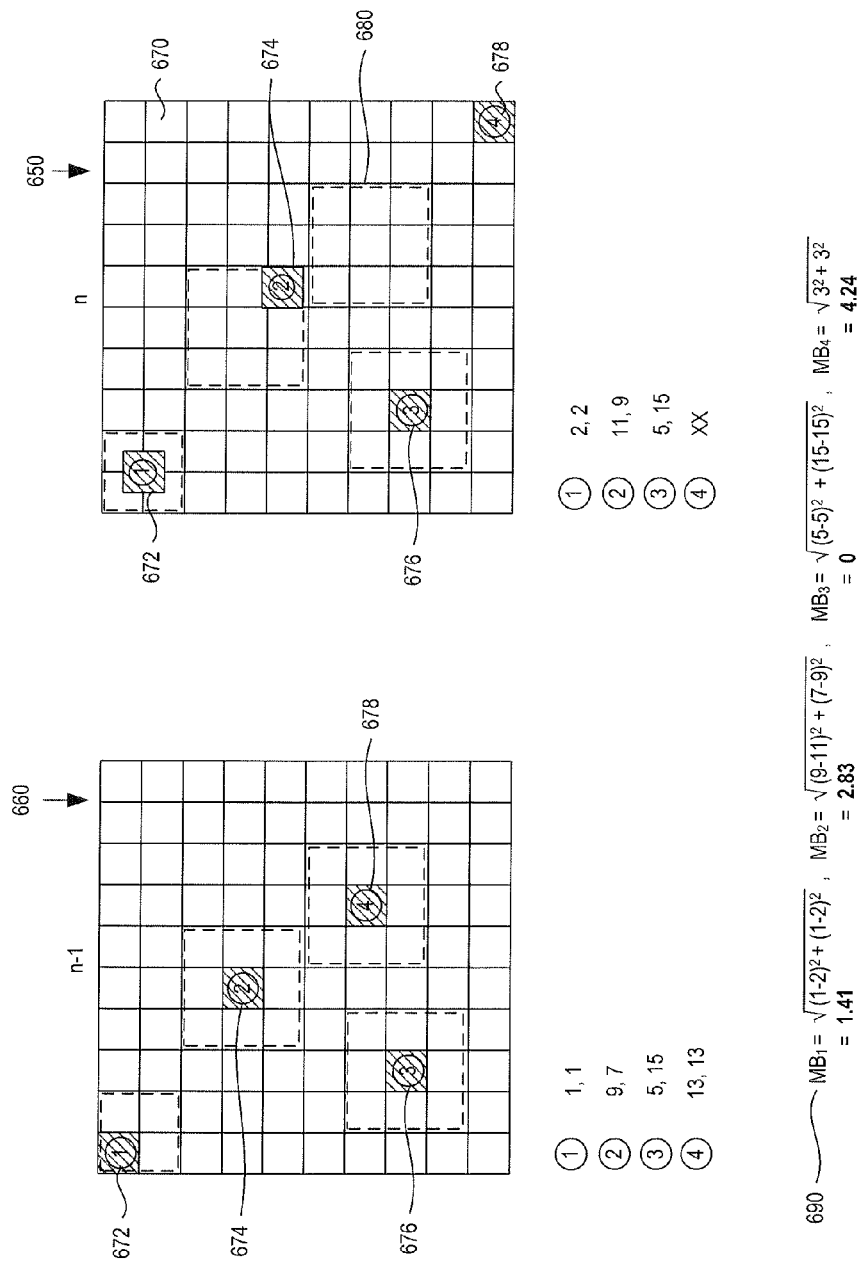
FIG. 6C shows comparison of the movement of macroblocks for two exemplary consecutive images, according to one embodiment of the present invention.

FIG. 6C shows two exemplary consecutive images, n 650 and n−1 660. The images are divided into a plurality of macroblocks 670 (as illustrated each macroblock is 4 (2×2) pixels). Four specific macroblocks 672, 674, 676, and 678 are identified with shading and are labeled 1-4 in the image n−1 660. A maximum search area 680 is defined around the 4 specific macroblocks as a dotted line (as illustrated the search areas is one macroblock in each direction). The four macroblocks 672, 674, 676, and 678 are identified with shading on the image n 650. Comparing the specified macroblocks between images 650 and 660 reveals that the first 672 and second macroblocks 674 moved within the defined search area, the third macroblock 676 did not move, and the fourth macroblock 678 moved out of the search area. If the upper left hand pixel is used as the coordinates for the macroblock it can be seen that MB1 moved from 1,1 to 2,2; MB2 moved from 9,7 to 11,9; MB3 did not move from 5,15; and MB4 moved from 13,13 to outside of the range. Since MB4 could not be found within the search window a maximum distance of 3 pixels in each direction is defined. Accordingly, the length vectors 590 for the macroblocks are 1.41 for MB1, 2.83 for MB2, 0 for MB3, and 4.24 for MB4.

As with the other feature based automatic advertisement detection techniques the action detection techniques (e.g., ECR, MVL) do not always provide a high level of confidence that the advertisement is detected and may also led to false positives.

Several of these techniques may be used in conjunction with one another to produce a result with a higher degree of confidence and may be able to reduce the number of false positives and detect the advertisements faster. However, as the feature based techniques are based solely on recognition of features that may be present more often in advertisements than programming there can probably never be a complete level of confidence that an advertisement has been detected. In addition, it may take a long time to recognize that these features are present (several advertisements).

In some countries, commercial break intros are utilized to indicate to the viewers that the subsequent material being presented is not programming but rather sponsored advertising. These commercial break intros vary in nature but may include certain logos, characters, or other specific video and audio messages to indicate that the subsequent material is not programming but rather advertising. The return to programming may in some instances also be preceded by a commercial break outro which is a short video segment that indicates the return to programming. In some cases the intros and the outros may be the same with an identical programming segment being used for both the intro and the outro. Detecting the potential presence of the commercial break intros or outros may indicate that an advertisement (or advertisement block) is about to begin or end respectively. If the intros and/or outros were always the same, detection could be done by detecting the existence of specific video or audio, or specific logos or characters in the video stream, or by detecting specific features about the video stream (e.g., CCVs). However, the intros and/or outros need not be the same. The intros/outros may vary based on at least some subset of day, time, channel (network), program, and advertisement (or advertisement break).

Intros may be several frames of video easily recognized by the viewer, but may also be icons, graphics, text, or other representations that do not cover the entire screen or which are only shown for very brief periods of time.

Increasingly, broadcasters are also selling sponsorship of certain programming which means that a sponsor's short message appears on either side (beginning or end) of each ad break during that programming. These sponsorship messages can also be used as latent cue tones indicating the start and end of ad breaks.

The detection of the intros, outros, and/or sponsorship messages may be based on comparing the incoming video stream, to a plurality of known intros, outros, and/or sponsorship messages. This would require that each of a plurality of known intros, outros, and/or sponsorship messages be stored and that the incoming video stream be compared to each. This may require a large amount of storage and may require significant processing as well, including the use of non-real-time processing. Such storage and processing may not be feasible or practical, especially for real time detection systems. Moreover, storing the known advertisements for comparing to the video programming could potentially be considered a copyright violation.

The detection of the intros, outros, and/or sponsorship messages may be based on detecting messages, logos or characters within the video stream and comparing them to a plurality of known messages, logos or characters from known intros, outros, and/or sponsorship messages. The incoming video may be processed to find these messages, logos or characters. The known messages, logos or characters would need to be stored in advance along with an association to an intro or outro. The comparison of the detected messages, logos or characters to the known messages, logos or characters may require significant processing, including the use of non-real-time processing. Moreover, storing the known messages, logos or characters for comparison to messages, logos or characters from the incoming video stream could potentially be considered a copyright violation.

The detection of the intros, outros, and/or sponsorship messages may be based on detecting messages within the video stream and determining the meaning of the words (e.g., detecting text in the video stream and analyzing the text to determine if it means an advertisement is about to start).

Alternatively, the detection may be based on calculating features (statistical parameters) about the incoming video stream. The features calculated may include, for example, color histograms or CCVs as discussed above. The features may be calculated for an entire video frame, as discussed above, number of frames, or may be calculated for evenly/randomly highly subsampled representations of the video frame. For example, the video frame could be sampled at a number (e.g., 64) of random locations or regions in the video frame and parameters such as average color) may be computed for each of these regions. The subsampling can also be performed in the temporal domain. The collection of features including CCVs for a plurality of images/frames, color histograms for a plurality of regions, may be referred to as a fingerprint.

An exemplary pixel grid 700 for a video frame is shown in FIG. 7. For ease of understanding, we limit the pixel grid to 12×12 (144 pixels), limit the color variations for each color (RGB) to the two most significant bits (4 color variations), and have each pixel have the same number associated with each of the colors (RGB) so that a single number represents each color. A plurality of regions 710, 720, 730, 740, 750, 760, 770, 780, 785, 790, 795 of the pixel grid 700 are sampled and an average color for each of the regions 710, 720, 730, 740, 750, 760, 770, 780, 785, 790, 795 is calculated. For example, the region 710 has an average color of 1.5, the region 790 has an average color of 0.5 and the region 795 has an average color of 2.5, as shown in the average color chart 705.

One advantage of the sampling of regions of a frame instead of an entire frame is that the entire frame would not need to be copied in order to calculate the features (if copying was even needed to calculate the features). Rather, certain regions of the image may be copied in order to calculate the features for those regions. As the regions of the frame would provide only a partial image and could not be used to recreate the image, there would be less potential copyright issues. As will be discussed in more detail later, the generation of fingerprints for known entities (e.g., advertisements, intros) that are stored in a database for comparison could be done for regions as well and therefore create less potential copyright issues.

Figure 8:
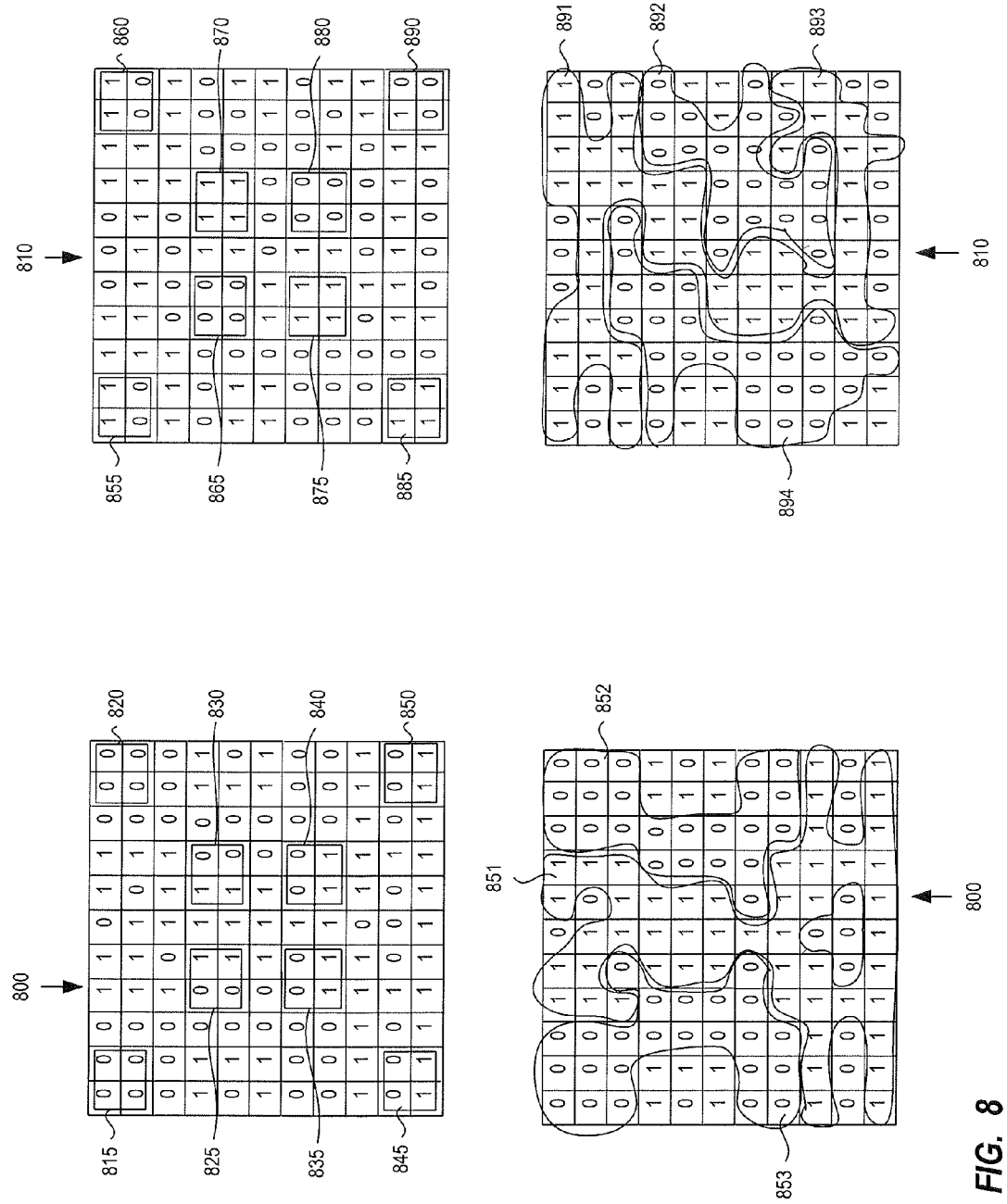
FIG. 8 shows two exemplary pixel grids having a plurality of regions for sampling and coherent and incoherent pixels identified, according to one embodiment of the present invention.

Two exemplary pixel grids 800 and 810 are shown in FIG. 8. Each of the pixel grids is 11×11 (121 pixels) and is limited to binary color values (0 or 1) for simplicity reasons. The top view of each pixel grid 800, 810 has a plurality of regions identified 815-850 and 855-890 respectively. The lower view of each pixel grids 800, 810 has the coherent 851-853 and 891-894 and incoherent pixels identified, where the threshold level is greater than 5.

FIG. 9 shows exemplary comparisons of the pixel grids 800, 810 of FIG. 8. Color histograms 900, 910 are for the entire frame 800, 810 respectively and the difference in the color histograms $\Delta$CH 920 is 0. CCVs 930, 940 are for the entire frame 800, 810 respectively and the difference, $\Delta$CCVs 950 is 0. Average colors 960, 970 capture the average colors for the various identified regions in frames 800, 810. The difference is the average color of the regions 980 is 3.5 (using the sum of absolute values).

FIGS. 7-9 focused on determining the average color for each of the regions but the techniques illustrated therein are not limited to average color determinations. For example, a color histogram or CCV could be generated for each of these regions. For CCVs to provide useful benefits the regions would have to be big enough or all of the colors will be incoherent. All of the colors will be coherent if the coherent threshold is made too low.

The calculated features/fingerprints (e.g., CCVs, evenly/randomly highly subsampled representations) are compared to corresponding features/fingerprints for known intros and/or outros. The fingerprints for the known intros and outros could be calculated and stored in advance. The comparison of calculated features of the incoming video stream (statistical parameterized representations) to the stored fingerprints for known intros/outros will be discussed in more detail later.

Another method for detecting the presentation of an advertisement is automatic detection of the advertisement. Automatic detection techniques may include recognizing that the incoming video stream is a known advertisement. Recognition techniques may include comparing the incoming video stream to known video advertisements. This would require that each of a plurality of known video advertisements be stored in order to do the comparison. This would require a relatively large amount of storage and would likely require significant processing, including non-real-time processing. Such storage and processing may not be feasible or practical, especially for real time detection systems. Moreover, storing the known advertisements for comparison to the video programming could potentially be considered a copyright violation.

Accordingly, a more practical automatic advertisement recognition technique may be used to calculate features (statistical parameters) about the incoming video stream and to compare the calculated features to a database of the same features (previously calculated) for known advertisements. The features may include color histograms, CCVs, and/or evenly/randomly highly subsampled representations of the video stream as discussed above or may include other features such as text and object recognition, logo or other graphic overlay recognition, and unique spatial frequencies or patterns of spatial frequencies (e.g., salient points). The features may be calculated for images (e.g., frames) or portions of images (e.g., portions of frames). The features may be calculated for each image (e.g., all frames) or for certain images (e.g., every I-frame in an MPEG stream). The combination of features for different images (or portions of images) make up a fingerprint. The fingerprint (features created from multiple frames or frame portions) may include unique temporal characteristics instead of, or in addition to, the unique spatial characteristics of a single image.

The features/fingerprints for the known advertisements or other segments of programming (also referred to as known video entities) may have been pre-calculated and stored at the detection point. For the known advertisements, the fingerprints may be calculated for the entire advertisement so that the known advertisement fingerprint includes calculated features for the entire advertisement (e.g., every frame for an entire 30-second advertisement). Alternatively, the fingerprints may be calculated for only a portion of the known advertisements (e.g., 5 seconds). The portion should be large enough so that effective matching to the calculated fingerprint for the incoming video stream is possible. For example, an effective match may require comparison of at least a certain number of images/frames (e.g., 10) as the false negatives may be high if less comparison is performed.

Figure 10:
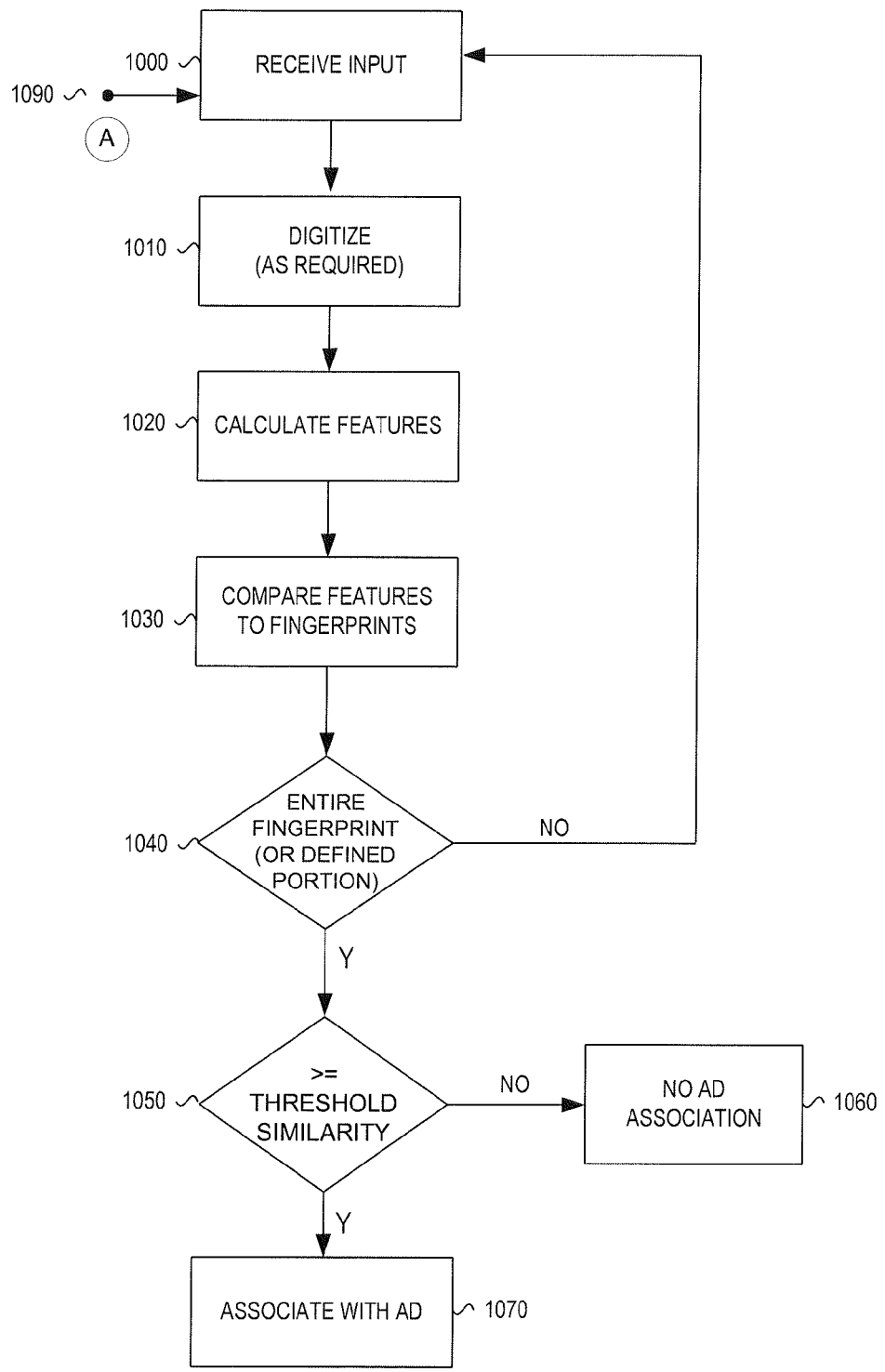
FIG. 10 is a block diagram of an advertisement matching process, according to one embodiment of the present invention.

An exemplary flowchart of the advertisement matching process is shown in FIG. 10. Initially, the video stream is received 1000. The received video stream may be analog or digital video. The processing may be done in either analog or digital but is computationally easier as digital video (accordingly digital video may be preferred). Therefore, the video stream may be digitized 1010 if it is received as analog video. Features (statistical parameters) are calculated for the video stream 1020. The features may include CCVs, color histograms, other statistical parameters, or a combination thereof. As mentioned above the features can be calculated for images or for portions of images. The calculated features/fingerprints are compared to corresponding fingerprints (e.g., CCVs are compared to CCVs) for known advertisements 1030. According to one embodiment, the comparison is made to the pre-stored fingerprints of a plurality of known advertisements (fingerprints of known advertisements stored in a database).

The comparison 1030 may be made to the entire fingerprint for the known advertisements, or may be made after comparing to some portion of the fingerprints (e.g., 1 second which is 25 frames in PAL or 29.97 frames in NTSC, 35 frames which is approximately 1.4 seconds in PAL) that is large enough to make a determination regarding similarity. A determination is made as to whether the comparison was to entire fingerprints (or some large enough portion) 1040. If the entire fingerprint (or large enough portion) was not compared (1040 No) additional video stream will be received and have features calculated and compared to the fingerprint (1000-1030). If the entire fingerprint (or large enough portion) was compared (1040 Yes) then a determination is made as to whether the features of the incoming video stream meets a threshold level of similarity with any of the fingerprints 1050. If the features for the incoming video stream do not meet a threshold level of similarity with one of the known advertisement fingerprints (1050 No) then the incoming video stream is not associated with a known advertisement 1060. If the features for the incoming video stream meet a threshold level of similarity with one of the known advertisement fingerprints (1050 Yes) then the incoming video stream is associated with the known advertisement (the incoming video stream is assumed to be the advertisement) 1070.

Once it is determined that the incoming video stream is an advertisement, ad substitution may occur. Targeted advertisements may be substituted in place of all advertisements within an advertisement block. The targeted advertisements may be inserted in order or may be inserted based on any number of parameters including day, time, program, last time ads were inserted, and default advertisement (advertisement it is replacing). For example, a particular advertisement may be next in the queue to be inserted as long as the incoming video stream is not tuned to a particular program (e.g., a Nike® ad may be next in the queue but may be restricted from being substituted in football games because Adidas® is a sponsor of the football league). Alternatively, the targeted advertisements may only be inserted in place of certain default advertisements. The determination of which default ads should be substituted with targeted ads may be based on the same or similar parameters as noted above with respect to the order of targeted ad insertion. For example, beer ads may not be substituted in a bar, especially if the bar sells that brand of beer. Conversely, if a default ad for a competitor hotel is detected in the incoming video stream at a hotel the default ad should be replaced with a targeted ad.

The process described above with respect to FIG. 10 is focused on detecting advertisements within the incoming video stream. However, the process is not limited to advertisements. For example, the same or similar process could be used to compare calculated features for the incoming video stream to a database of fingerprints for known intros (if intros are used in the video delivery system) or known sponsorships (if sponsorships are used). If a match is detected that would indicate that an intro is being displayed and that an advertisement break is about to begin. Ad substitution could begin once the intro is detected. Targeted advertisements may be inserted for an entire advertisement block (e.g., until an outro is detected). The targeted advertisements may be inserted in order or may be inserted based on any number of parameters including day, time, program, and last time ads were inserted. Alternatively, the targeted advertisements may only be inserted in place of certain default advertisements. To limit insertion of targeted advertisements to specific default advertisements would require the detection of specific advertisements.

The intro or sponsorship may provide some insight as to what ads may be played in the advertisement block. For example, the intro detected may be associated with (often played prior to) an advertisement break in a soccer game and the first ad played may normally be a beer advertisement. This information could be used to limit the comparison of the incoming video stream to ad fingerprints for known beer advertisements as stored in an indexed ad database or could be used to assist in the determination of which advertisement to substitute. For example, a restaurant that did not serve alcohol may want to replace the beer advertisement with an advertisement for a non-alcoholic beverage.

The level of similarity is based on the minimal number of substitutions, deletions and insertions of features necessary to align the features of the incoming video stream with a fingerprint (called approximates substring matching). It is regarded as a match between the fingerprint sequences for the incoming video stream and a known advertisement if the minimal (absolute or relative to matched length) distance between does not exceed a distance threshold and the difference in length of the fingerprints does not exceed a length difference threshold. Approximate substring matching may allow detection of commercials that have been slightly shortened or lengthened, or whose color characteristics have been affected by different modes or quality of transmission.

Advertisements only make up a portion of an incoming video stream so that continually calculating features for the incoming video stream 1020 and comparing the features to known advertisement fingerprints 1030 may not be efficient. The feature based techniques described above (e.g., volume increases, increase scene changes, monochrome images) may be used to detect the start of a potential advertisement (or advertisement block) and the calculating of features 1020 and comparing to known fingerprints 1030 may only be performed once a possible advertisement break has been detected. It should be noted that some methods of detecting the possibility of an advertisement break in the video stream such as an increase in scene changes, where scene changes may be detected by comparing successive CCVs, may in fact be calculating features of the video stream 1020 so the advertisement detection process may begin with the comparison 1030.

The calculating of features 1020 and comparing to known fingerprints 1030 may be limited to predicted advertisement break times (e.g., between :10 and :20 after every hour). The generation 1020 and the comparison 1030 may be based on the channel to which it is tuned. For example, a broadcast channel may have scheduled advertisement blocks so that the generation 1020 and the comparison 1030 may be limited to specific times. However, a live event such as a sporting event may not have fixed advertisement blocks so time limiting may not be an option. Moreover channels are changed at random times, so time blocks would have to be channel specific.

When intros are used, the calculated fingerprint for the incoming video stream may be continually compared to fingerprints for known intros stored in a database (known intro fingerprints). After an intro is detected indicating that an advertisement (or advertisement block) is about to begin, the comparison of the calculated fingerprint for the incoming video stream to fingerprints for known advertisements stored in a database (known advertisement fingerprints) begins.

If an actual advertisement detection is desired, a comparison of the calculated fingerprints of the incoming video stream to the known advertisement fingerprints stored in a database will be performed whether the comparison is continual or only after some event (e.g., detection of intro, certain time). Comparing the calculated fingerprint of the incoming video stream to entire fingerprints (or portions thereof) for all the known advertisement fingerprints 1030 may not be an efficient use of resources. The calculated fingerprint may have little or no similarity with a percentage of the known advertisement fingerprints and this difference may be obvious early in the comparison process. Accordingly, continuing to compare the calculated fingerprint to these known advertisement fingerprints is a waste of resources.

An initial window (e.g., several frames, several regions of a frame) of the calculated fingerprint of the incoming video steam may be compared to an initial window of all of the known advertisement fingerprints (e.g., several frames, several regions). Only the known advertisement fingerprints that have less than some defined level of dissimilarity (e.g., less than a certain distance between them) proceed for further comparison. The initial window may be, for example, a certain period (e.g., 1 second), a certain number of images (e.g., first 5 I-frames), or a certain number of regions of a frame (e.g., 16 of 64 regions of frame).

Figure 11:
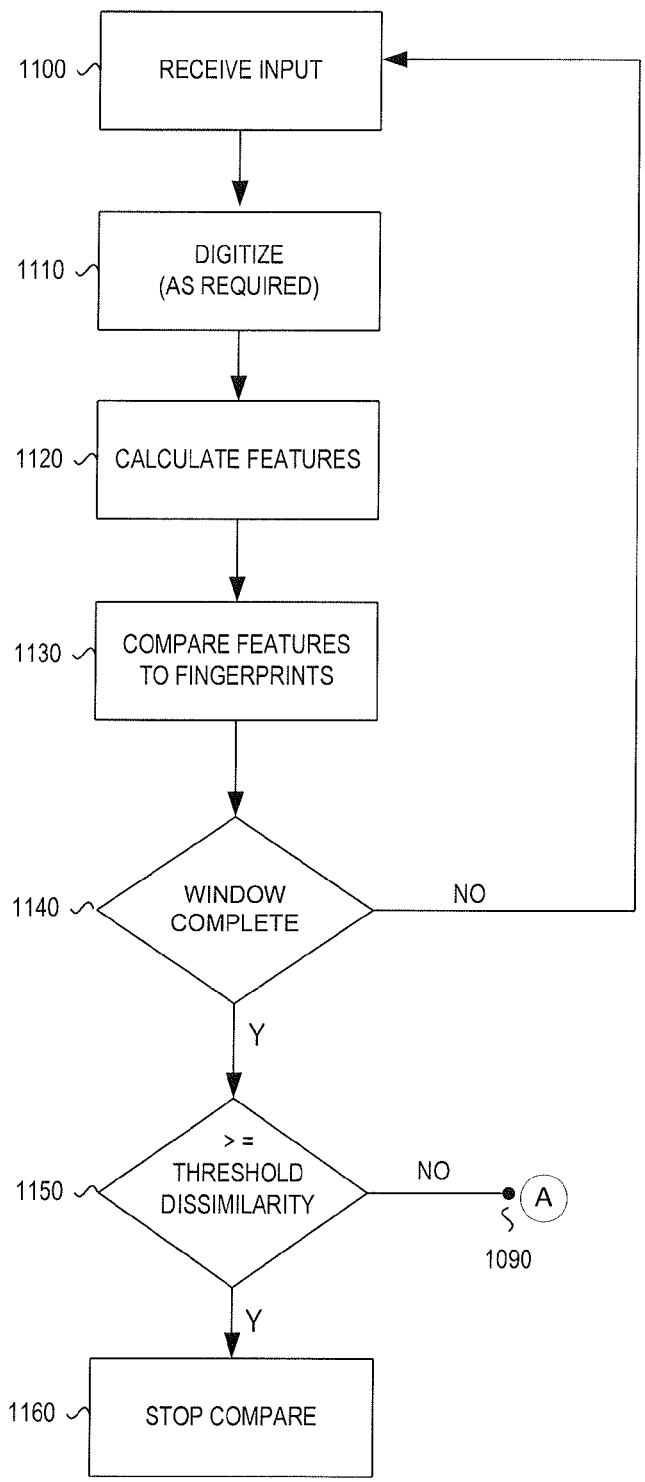
FIG. 11 is a block diagram of an initial dissimilarity determination process, according to one embodiment of the present invention.

FIG. 11 shows an exemplary flowchart of an initial dissimilarity determination process. The video stream is received 1100 and may be digitized 1110 (e.g., if it is received as analog video). Features (statistical parameters) are calculated for the video stream (e.g., digital video stream) 1120. The features (fingerprint) may include CCVs, color histograms, other statistical parameters, or a combination thereof. The features can be calculated for images or for portions of images. The calculated features (fingerprint) are compared to the fingerprints for known advertisements 1130 (known advertisement fingerprints). A determination is made as to whether the comparison has been completed for an initial period (window) 1140. If the initial window comparison is not complete (1140 No) the process returns to 1100-1130. If the initial window comparison is complete (1140 Yes) then a determination is made as to the level of dissimilarity (distance) between the calculated fingerprint and the known advertisement fingerprints exceeding a threshold 1150. If the dissimilarity is below the threshold, the process proceeds to FIG. 10 (1090) for those fingerprints. For the known advertisement fingerprints that the threshold is exceeded (1150 Yes) the comparing is aborted.

Figure 12:
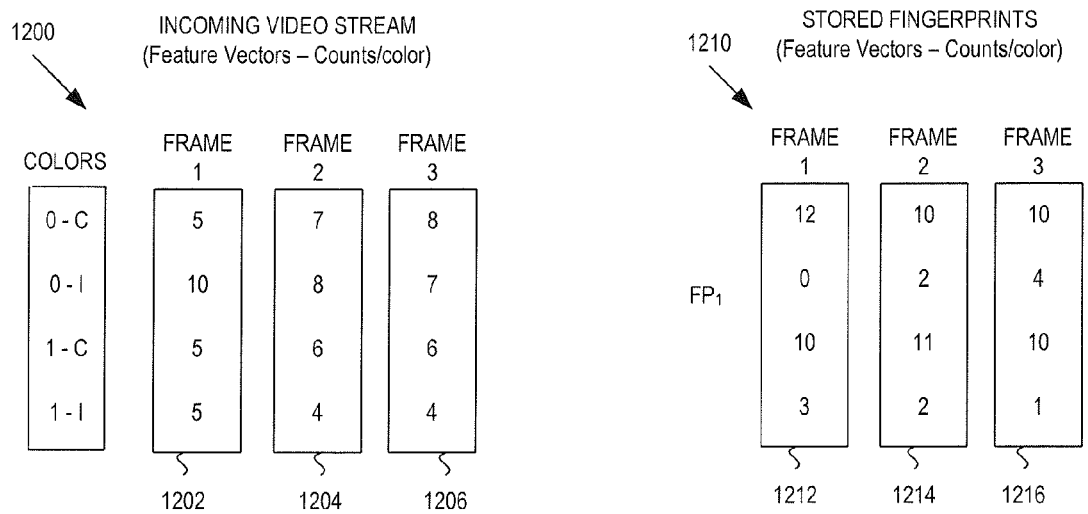
FIG. 12 shows an exemplary initial comparison of calculated features for an incoming stream versus initial portions of fingerprints for a plurality of known advertisements, according to one embodiment of the present invention.
Figure 12:
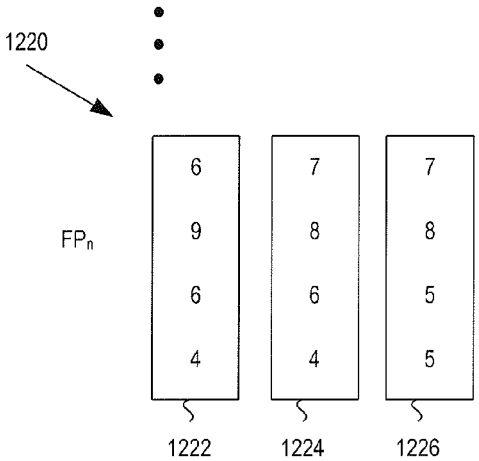

FIG. 12 shows an exemplary initial comparison of the calculated fingerprint for an incoming stream 1200 versus initial portions of fingerprints 1210, 1220 for a plurality of known advertisements stored in a database (known advertisement fingerprints). For ease of understanding we will assume that each color is limited to a single digit (two colors), that each color has the same digit so that a single number can represent each color, and that the pixel grid is 25 pixels. The calculated fingerprint includes a CCV for each image 1202, 1204, and 1206 (e.g., frame, I-frame). The incoming video stream has a CCV calculated for the first three frames. The CCV for the first three frames of the incoming stream are compared to the associated portion 1212-1216 and 1222-1226 (CCVs of the first three frames) of each of the known advertisement fingerprints. The comparison includes summating the dissimilarity (e.g., calculated distance) between corresponding frames (e.g., distance Frame 1+distance Frame 2+distance Frame 3). The distance between the CCVs for each of the frames can be calculated in various manners including the sum of the absolute differences and the sum of the squared differences as described above. The sum of the absolute differences is utilized in FIG. 12. The difference $\Delta CCV$ 1230 between the incoming video steam 1200 and a first fingerprint ($FP_1$) 1210 is 52 while the difference $\Delta CCV$ 1240 between the incoming video stream 1200 and the Nth fingerprint ($FP_N$) 1220 is 8. Referring again to FIG. 11, if the predefined level of dissimilarity (distance) was 25, then the comparison for $FP_1$ would not proceed further (e.g., 1160) since the level of dissimilarity exceeds the predefined level (e.g., 1150 Yes). The comparison for $FP_N$ would continue (1090) since the level of dissimilarity did not exceed the predefined level (e.g., 1150 No).

It is possible that the incoming video stream may have dropped the first few frames of the advertisement or that the calculated features (e.g., CCV) are not calculated for the beginning of the advertisement (e.g., first few frames) because, for example, the possibility of an advertisement being presented was not detected early enough. In this case, if the comparison of the calculated features for the first three frames is compared to the associated portion (calculated features of the first three frames) of each of the known advertisement fingerprints, the level of dissimilarity may be increased erroneously since the frames do not correspond. One way to handle this is to extend the length of the fingerprint window in order to attempt to line the frames up.

Figure 13:
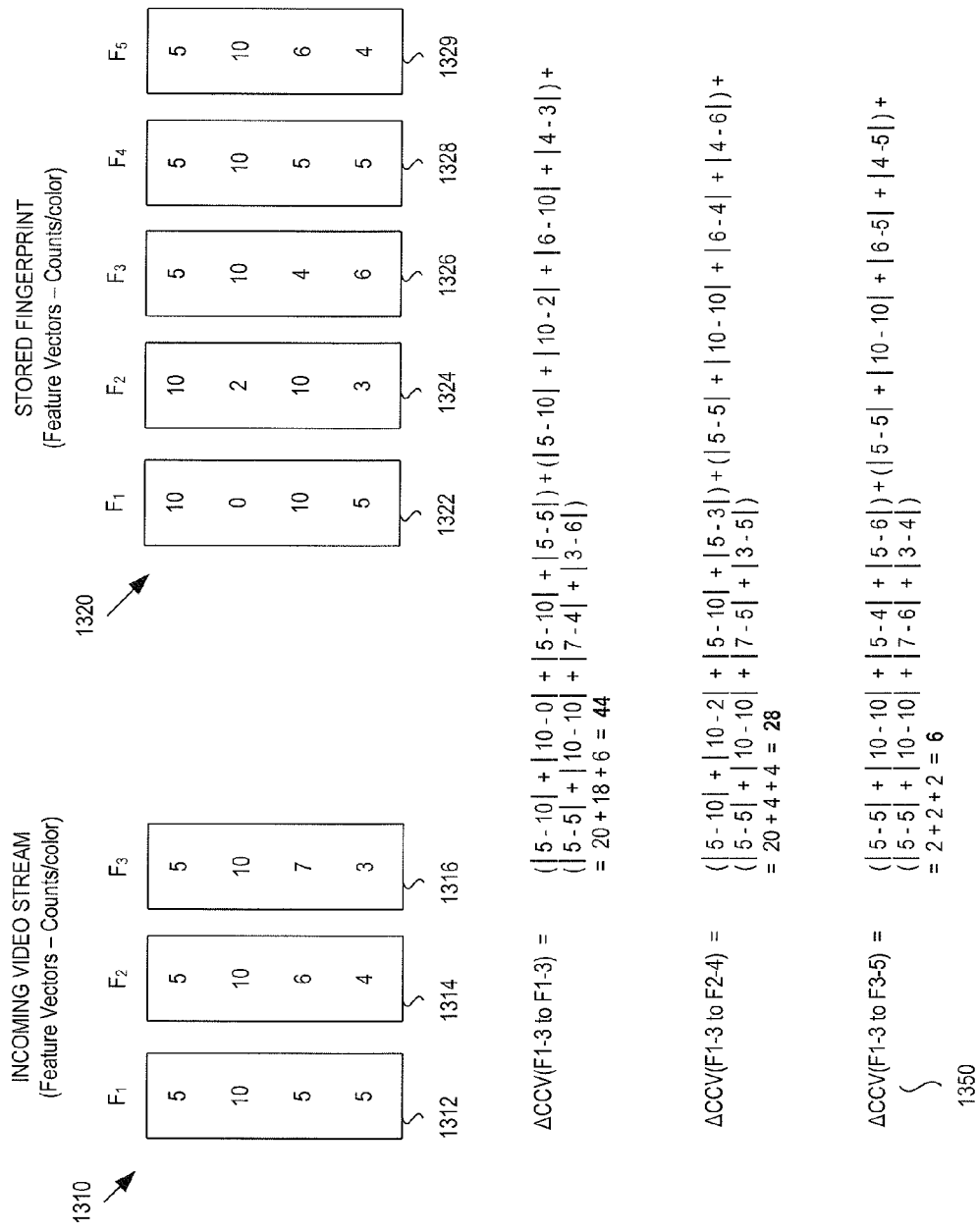
FIG. 13 shows an exemplary initial comparison of calculated features for an incoming stream, similar to FIG. 12, with an expanded initial portion of a fingerprint for a known advertisement, according to one embodiment of the present invention.

FIG. 13 shows an exemplary initial comparison of calculated features for an incoming stream 1310 versus an expanded initial portion 1320 of known advertisement fingerprints. For ease of understanding one can make the same assumptions as with regard to FIG. 12. The CCVs calculated for the first three frames 1312-1316 of the incoming video stream are compared by a sliding window to the first five frames 1322-1329 for a stored fingerprint. That is, frames 1-3 of the calculated features of the incoming video stream are compared against frames 1-3 1322-1326 of the fingerprint, frames 2-4 1324-1328 of the fingerprint, and frames 3-5 1326-1329 of the fingerprint. By doing this it is possible to reduce or eliminate the differences that may have been caused by one or more frames being dropped from the incoming video stream. In the example of FIG. 13, the first two frames of the incoming stream were dropped. Accordingly, the difference 1350 between the calculated features of the incoming video stream equated best to frames 3-5 of the fingerprint.

If the comparison between the calculated features of the incoming stream and the fingerprint has less dissimilarity than the threshold, the comparison continues. The comparison may continue from the portion of the fingerprint where the best match was found for the initial comparison. In the exemplary comparison of FIG. 13, the comparison should continue between frame 6 (next frame outside of initial window) of the fingerprint and frame 4 of incoming stream. It should be noted that if the comparison resulted in the best match for frames 1-3 of the fingerprint, then the comparison may continue starting at frame 4 (next frame within the initial window) for the fingerprint.

To increase the efficiency by limiting the amount of comparisons being performed, the window of comparison may continually be increased for the known advertisement fingerprints that do not meet or exceed the dissimilarity threshold until one of the known advertisement fingerprints possibly meets or exceeds the similarity threshold. For example, the window may be extended 5 frames for each known advertisement fingerprint that does not exceed the dissimilarity threshold. The dissimilarity threshold may be measured in distance (e.g., total distance, average distance/frame). Comparison is stopped if the incoming video fingerprint and the known advertisement fingerprint differ by more than a chosen dissimilarity threshold. A determination of a match would be based on a similarity threshold. A determination of the similarity threshold being met or exceeded may be delayed until some predefined number of frames (e.g., 20) have been compared to ensure a false match is not detected accidentally, which is more like with a small number of frames. Like the dissimilarity threshold, the similarity threshold may be measured in distance. For example, if the distance between the features for the incoming video stream and the fingerprint differ by less than 5 per frame after at least 20 frames are compared it is considered a match.

Figure 14:
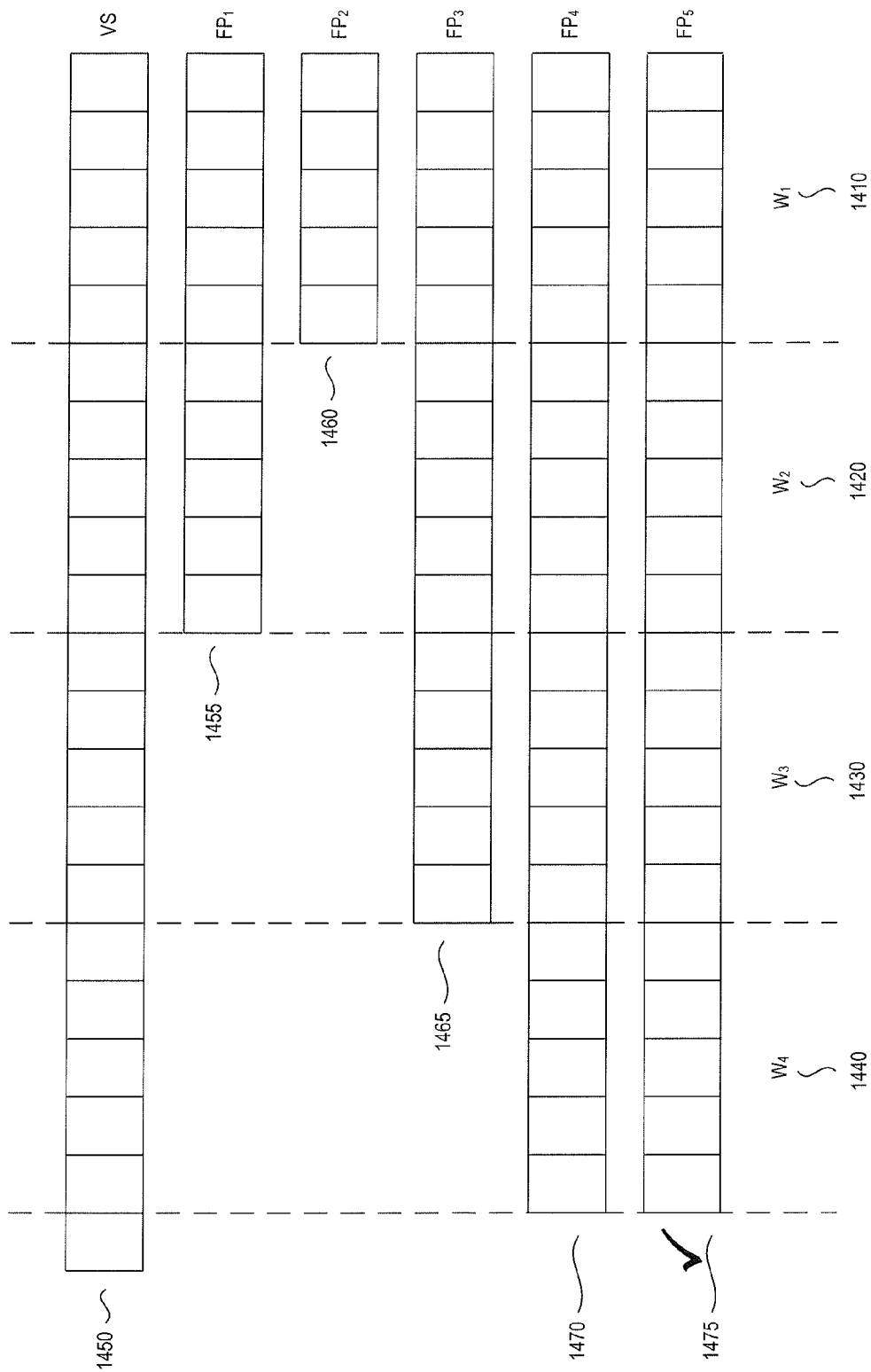
FIG. 14 shows an exemplary expanding window comparison of the features of the incoming video stream and the features of the fingerprints of known advertisements, according to one embodiment of the present invention.

FIG. 14 shows an exemplary expanding window comparison of the features of the incoming video stream and the features of the fingerprints of known advertisements. For the initial window $W_1$ 1410, the incoming video stream 1450 is compared to each of five known advertisement fingerprints, $FP_1$-$FP_5$ 1455-1475, respectively. After $W_1$, the comparison of $FP_2$ 1460 is aborted because it exceeded the dissimilarity threshold. The comparison of the remaining known advertisement fingerprints continues for the next window $W_2$ 1420 (e.g., next five frames, total of 10 frames). After $W_2$, the comparison of $FP_1$ 1455 is aborted because it exceeded the dissimilarity threshold. The comparison of the remaining known advertisement fingerprints continues for the next window $W_3$ 1430 (e.g., next five frames, total of 15 frames). After $W_3$, the comparison of $FP_3$ 1465 is aborted. The comparison of the remaining known advertisement fingerprints continues for the next window $W_4$ 1430 (e.g., next five frames, total of 20 frames). After $W_4$, a determination can be made about the level of similarity. As illustrated, it was determined that $FP_5$ 1475 meets the similarity threshold.

If neither of the known advertisement fingerprints ($FP_4$ or $FP_5$) meet the similarity threshold, the comparison would continue for the known advertisement fingerprints that did not exceed the dissimilarity threshold. Those that meet the dissimilarity threshold would not continue with the comparisons. If more than one known advertisement fingerprint meets the similarity threshold then the comparison may continue until one of the known advertisement fingerprints falls outside of the similarity threshold, or the most similar known advertisement fingerprint is chosen. The comparison always ends if the length of the comparison reaches the length of the respective fingerprint.

The windows of comparison in FIG. 14 (e.g., 5 frames) may have been a comparison of temporal alignment of the frames, a summation of the differences between the individual frames, a summation of the differences of individual regions of the frames, or some combination thereof. It should also be noted, that the window is not limited to a certain number of frames as illustrated and may be based on regions of a frame (e.g., 16 of the 32 regions the frame is divided into). If the window was for less than a frame, certain fingerprints may be excluded from further comparisons after comparing less than a frame. It should be noted that the level of dissimilarity may have to be high for comparisons of less than a frame so as not to exclude comparisons that are temporarily high due to, for example, misalignment of the fingerprints.

The calculated features for the incoming video stream do not need to be stored. Rather, they can be calculated, compared and then discarded. No video is being copied or if the video is being copied it is only for a short time (temporarily) while the features are calculated. The features calculated for images can not be used to reconstruct the video, and the calculated features are not copied or if the features are copied it is only for a short time (temporarily) while the comparison to the known advertisement fingerprints is being performed.

As previously noted, the features may be calculated for an image (e.g., frame) or for a portion or portions of an image. Calculating features for a portion may entail sampling certain regions of an image as discussed above with respect to FIGS. 7-9 above. Calculating features for a portion of an image may entail dividing the image into sections, selecting a specific portion of the image or excluding a specific portion of the image. Selecting specific portions may be done to focus on specific areas of the incoming video stream (e.g., network logo, channel identification, program identification). The focus on specific areas will be discussed in more detail later. Excluding specific portions may be done to avoid overlays (e.g., network logo) or banners (e.g., scrolling news, weather or sport updates) that may be placed on the incoming video stream that could potentially affect the matching of the calculated features of the video stream to fingerprints, due to the fact that known advertisements might not have had these overlays and/or banners when the original library fingerprints were generated.

Figure 15:
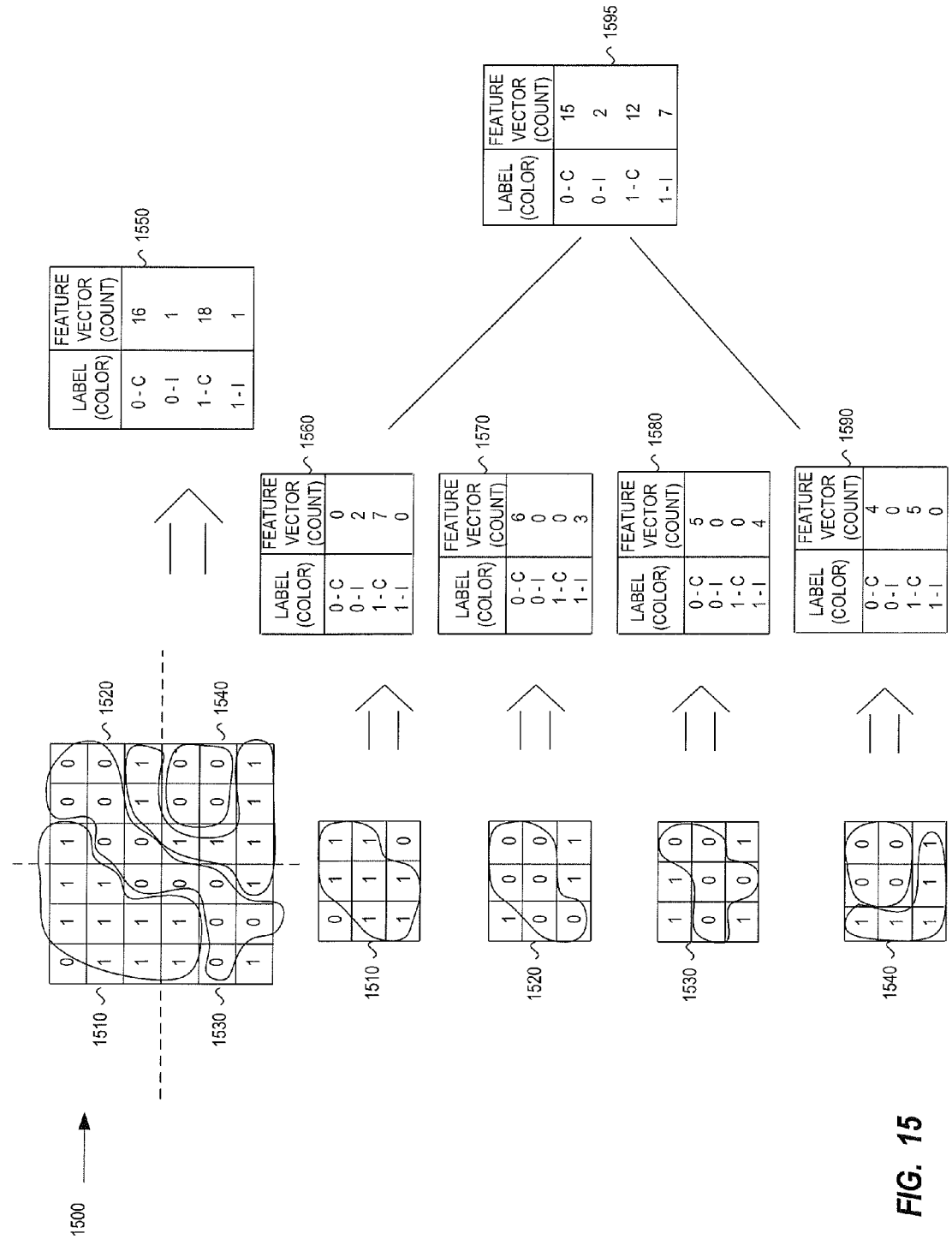
FIG. 15 shows an exemplary pixel grid divided into sections, according to one embodiment of the present invention.

FIG. 15 shows an exemplary pixel grid 1500 divided into sections 1510, 1520, 1530, 1540 as indicated by the dotted line. The pixel grid 1500 consists of 36 pixels (a 6×6 grid) and a single digit for each color with each pixel having the same number associated with each color. The pixel grid 1500 is divided into 4 separate 3×3 grids 1510-1540. A full image CCV 1550 is generated for the entire grid 1500, and partial image CCVs 1560, 1570, 1580, 1590 are generated for the associated sections 1510-1540. A summation of the section CCVs 1595 would not result in the CCV 1550 as the pixels may have been coherent because they were grouped over section borders which would not be indicated in the summation CCV 1595. It should be noted that the summation CCV 1595 is simply for comparing to the CCV 1550 and would not be used in a comparison to fingerprints. When calculating CCVs for sections the coherence threshold may be lowered. For example, the coherence threshold for the overall grid was four and may have been three for the sections. It should be noted that if it was lowered to 2 that the color 1 pixels in the lower right corner of section pixel grid 1520 would be considered coherent and the CCV would change accordingly to reflect this fact.

If the image is divided into sections, the comparison of the features associated with the incoming video stream to the features associated with known advertisements may be done based on sections. The comparison may be based on a single section. Comparing a single section by itself may have less granularity than comparing an entire image.

Figure 16:
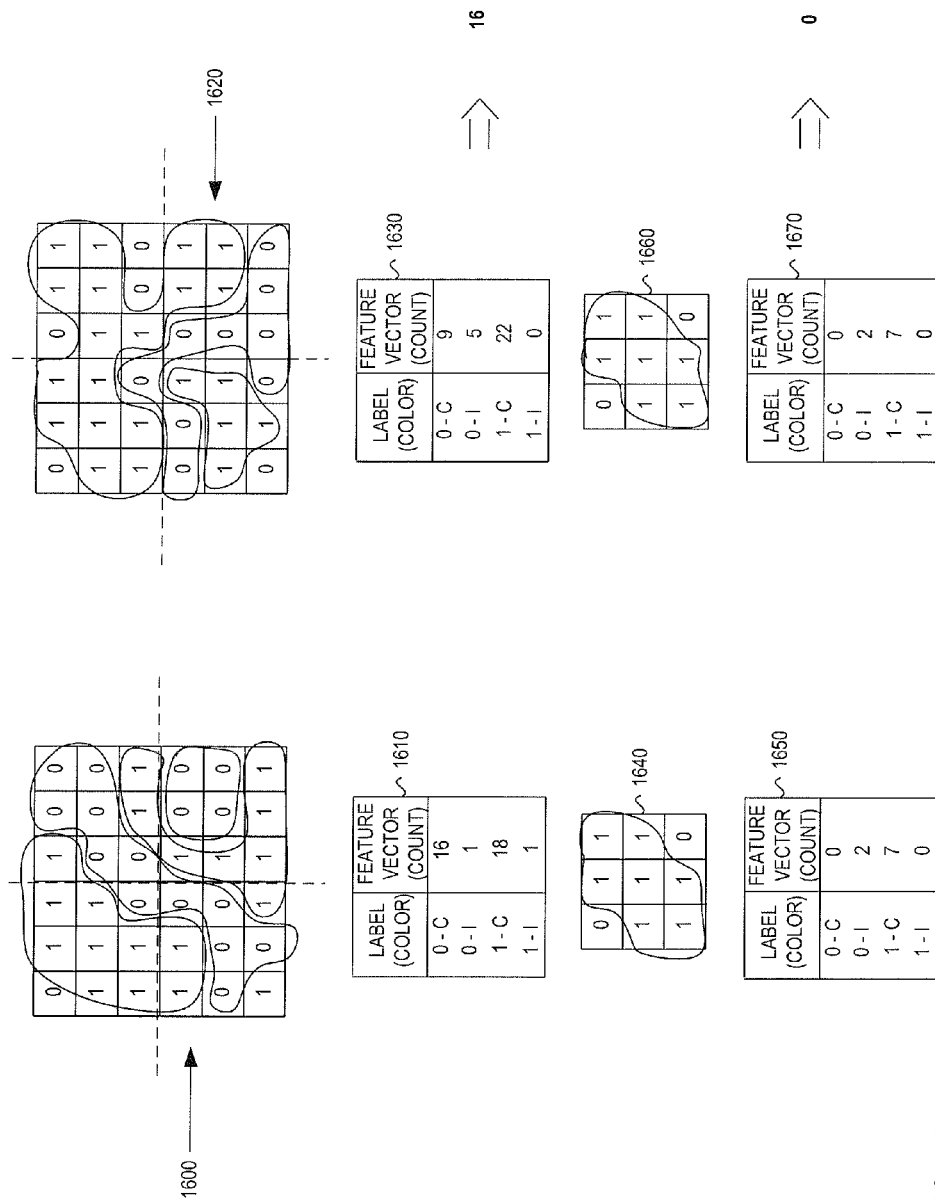
FIG. 16 shows an exemplary comparison of two whole images and corresponding sections of the two images, according to one embodiment of the present invention.

FIG. 16 shows an exemplary comparison of two images 1600, 1620 based on the whole images 1600, 1620 and sections of the images 1640, 1660 (e.g., upper left quarter of image). Features (CCVs) 1610, 1630 are calculated for the images 1600, 1620 and reveal that the difference (distance) between them is 16 (based on sum of absolute values). Features (CCVs) 1650, 1670 are calculated for the sections 1640, 1660 and reveal that there is no difference. The first sections 1640, 1660 of the images were the same while the other sections were different thus comparing only the features 1650, 1670 may erroneously result in not being filtered (not exceeding dissimilarity threshold) or a match (exceeding similarity threshold). A match based on this false positive would not be likely, as in a preferred embodiment a match would be based on more than a single comparison of calculated features for a section of an image in an incoming video stream to portions of known advertisement fingerprints. Rather, the false positive would likely be filtered out as the comparison was extended to further sections. In the example of FIG. 16, when the comparison is extended to other sections of the image or other sections of additional images the appropriate weeding out should occur.

It should be noted that comparing only a single section may provide the opposite result (being filtered or not matching) if the section being compared was the only section that was different and all the other sections were the same. The dissimilarity threshold will have to be set at an appropriate level to account for this possible effect or several comparisons will have to be made before a comparison can be terminated due to a mismatch (exceeding dissimilarity threshold).

Alternatively, the comparison of the sections may be done at the same time (e.g., features of sections 1-4 of the incoming video stream to features of sections 1-4 of the known advertisements). As discussed above, comparing features of sections may require thresholds (e.g., coherence threshold) to be adjusted. Comparing each of the sections individually may result in a finer granularity than comparing the whole image.

Figure 17:
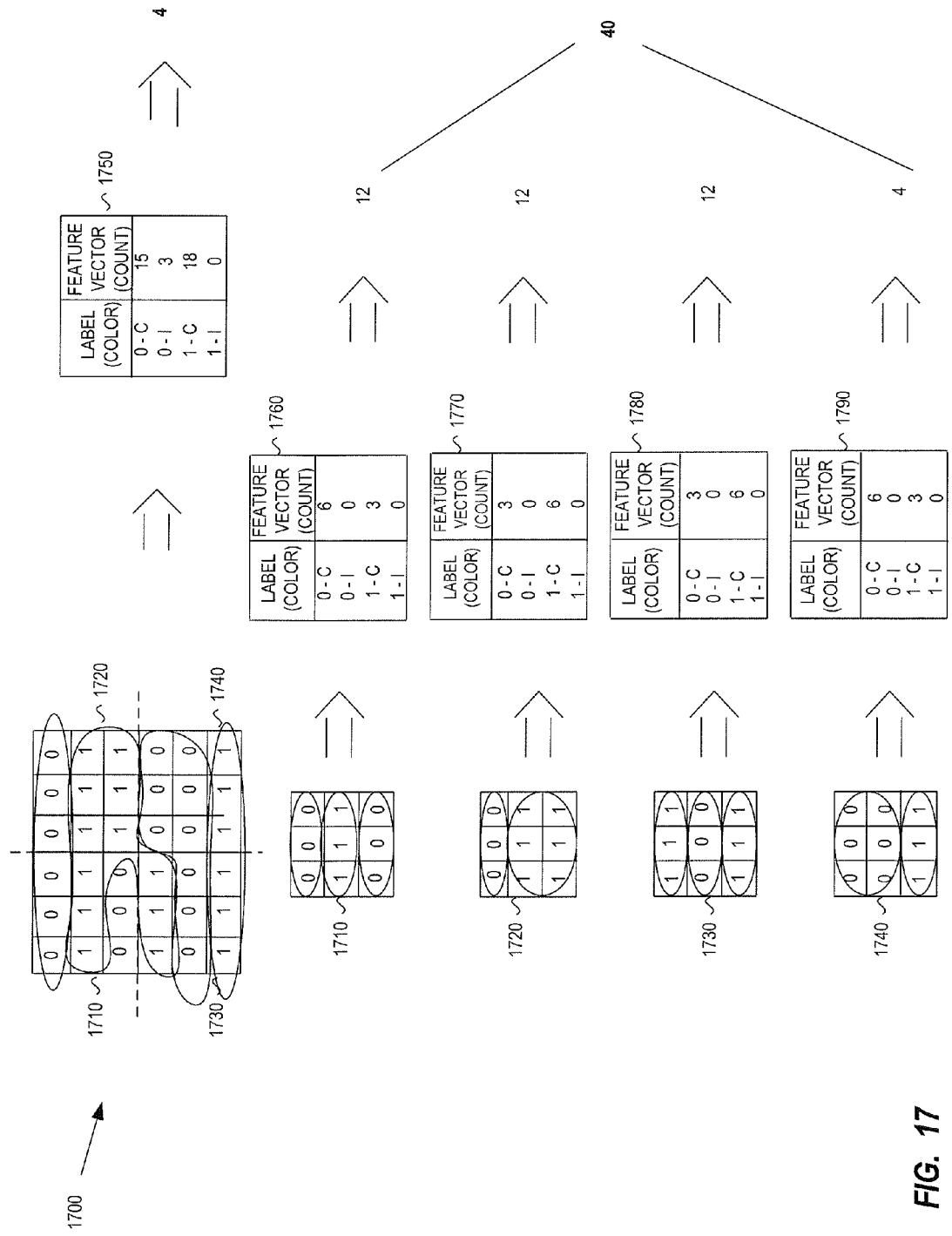
FIG. 17 shows an exemplary comparison of pixel grids by sections, according to one embodiment of the present invention.

FIG. 17 shows an exemplary comparison of a pixel grid 1700 (divided into sections 1710, 1720, 1730, 1740) to the pixel grid 1500 (divided into sections 1510, 1520, 1530, 1540) of FIG. 15. By simply comparing the pixel grids 1500 and 1700 it can be seen that the color distribution is different. However, comparing a CCV 1750 of the pixel grid 1700 and the CCV 1550 of the pixel grid 1500 results in a difference (distance) of only 4. However, comparing CCVs 1760-1790 for sections 1710-1740 to the CCVs 1560-1590 for sections 1510-1540 would result in differences of 12, 12, 12 and 4 respectively, for a total difference of 40.

It should be noted that FIGS. 15-17 depicted the image being divided into four quadrants of equal size, but is not limited thereto. Rather the image could be divided in numerous ways without departing from the scope (e.g., row slices, column slices, sections of unequal size and/or shape). The image need not be divided in a manner in which the whole image is covered. For example, the image could be divided into a plurality of random regions as discussed above with respect to FIGS. 7-9. In fact, the sections of an image that are analyzed and compared are only a portion of the entire image and could not be used to recreate the image so that there could clearly be no copyright issues. That is, certain portions of the image are not captured for calculating features or for comparing to associated portions of the known advertisement fingerprints that are stored in a database. The known advertisement fingerprints would also not be calculated for entire images but would be calculated for the same or similar portions of the images.

FIGS. 11-14 discussed comparing calculated features for the incoming video stream to windows (small portions) of the fingerprints at a time so that likely mismatches need not be continually compared. The same basic process can be used with segments. If the features for each of the segments for an image are calculated and compared together (e.g., FIG. 17) the process may be identical except for the fact that separate features for an image are being compared instead of a single feature. If the features for a subset of all the sections are generated and compared, then the process may compare the features for that subset of the incoming video stream to the features for that subset of the advertisement fingerprints. For the fingerprints that do not exceed the threshold level of dissimilarity (e.g., 1150 No of FIG. 11) the comparison window may be expanded to the additional segments of the image and fingerprints or may be extended to the same section of additional images. When determining if there is a match between the incoming video stream and a fingerprint for a known ad (e.g., 1050 of FIG. 10), the comparison is likely not based on a single section/region as this may result in erroneous conclusions (as depicted in FIG. 16). Rather, it is preferable if the determination of a match is made after sufficient comparisons of sections/regions (e.g., a plurality of sections of an image, a plurality of images).

For example, a fingerprint for an incoming video stream (query fingerprint q) may be based on an image (or portion of an image) and consist of features calculated for different regions $(q_1, q_2 \ldots q_n)$ of the image. The fingerprints for known advertisements (subject fingerprints s) may be based on images and consist of features calculated for different regions $(s_1, s_2 \ldots s_m)$ of the images. The integer m (the number of regions in an image for a stored fingerprint) may be greater than the integer n (number of regions in an image of incoming video stream) if the fingerprint of the incoming video stream is not for a complete image. For example, regions may not be defined for boundaries on an incoming video stream due to the differences associated with presentation of images for different TVs and/or STBs. A comparison of the fingerprints would (similarity measure) be the sum for i=1 to n of the minimum distance between $q_i$ and $s_j$, where i is the particular region. Alternatively the Earth Movers distance could be used. The Earth Movers distance is defined as the minimal changes necessary to transform the features in region q1, . . . , qn into the reference features of region s1, . . . , sm. This distance can usually be efficient compute by means of solving a special linear program called the optimal (partial) flow computation.

Some distance measures may not really be affected by calculating a fingerprint (q) based on less than the whole image. However, it might accidentally match the wrong areas since some features such as color histograms may not encode any spatial distribution. For instance, areas which are visible in the top half of the incoming video stream and are used for the calculation of the query fingerprint might match an area in a subject fingerprint that is not part of the query fingerprint. This would result in a false match. Such situations can be handled by incorporation of spatial constraints to the matching process.

As previously noted, entire images of neither the incoming video stream nor the known advertisements (ad intros, sponsorship messages, etc.) are stored, rather the portions of the images are captured so that the features can be calculated. Moreover, the features calculated for the portions of the images of the incoming video stream are not stored, they are calculated and compared to features for known advertisements and then discarded.

If the video stream is an analog stream and it is desired to calculate the features and compare to fingerprints in digital, then the video stream is converted to digital only as necessary. That is, if the comparisons to fingerprints are done on an image by image basis the conversion to digital will be done image by image. If the video stream is not having features generated (e.g., CCV) or being compared to at least one fingerprint then the digital conversion will not be performed. That is, if the features for the incoming video stream do not match any fingerprints so no comparison is being done or the incoming video stream was equated with an advertisement and the comparison is temporarily terminated while the ad is being displayed or a targeted ad is being substituted. If no features are being generated or compared then there is no need for the digital conversion. Limiting the amount of conversion from analog to digital for the incoming video stream means that there is less manipulation and less temporary storage (if any is required) of the analog stream while it is being converted.

When calculating the features for the incoming video stream certain sections (regions of interest) may be either avoided or focused on. Portions of an image that are excluded may be defined as regions of disinterest while regions that are focused on may be defined as regions of interest. Regions of disinterest and/or interest may include overlays, bugs, and banners. The overlays, bugs and banners may include at least some subset of channel and/or network logo, clock, sports scoreboard, timer, program information, EPG screen, promotions, weather reports, special news bulletins, close captioned data, and interactive TV buttons.

If a bug (e.g., network logo) is placed on top of a video stream (including advertisements within the stream) the calculated features (e.g., CCVs) may be incomparable to fingerprints of the same video sequence (ads or intros) that were generated without the overlays. Accordingly, the overlay may be a region of disinterest that should be excluded from calculations and comparisons.

Figure 18A:
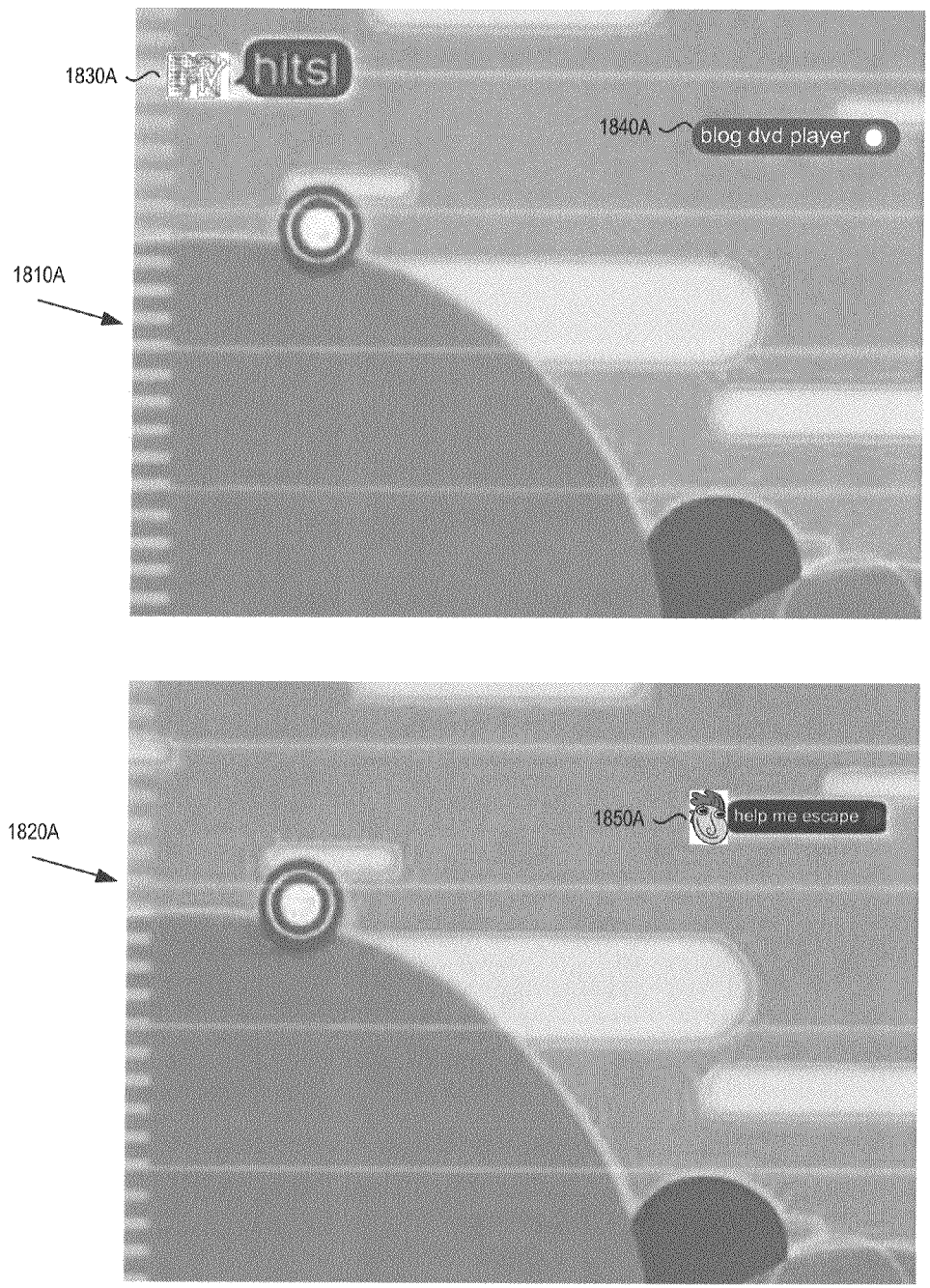
FIG. 18A shows two images with different overlays, according to one embodiment of the present invention.
Figure 18B:
FIG. 18B shows two additional images with different overlays, according to one embodiment of the present invention.
Figure 18B:

FIGS. 18A and 18B illustrate exemplary images with different overlays. The two images 1810A, 1820A in FIG. 18A are taken from the same video stream. The first image 1810A has a channel logo overlay 1830A in the upper left corner and a promotion overlay 1840A in the upper right corner while the second image 1820A has no channel overlay and has a different promotion overlay 1850A. The two images 1810B, 1820B in FIG. 18B are taken from the same video stream. The first image 1810B has a station overlay 1840B in the upper right corner and an interactive bottom 1830B in the lower right corner while the second image 1820B has a different channel logo 1850B in the upper right and no interactive button. Comparing fingerprints for the first set of images or the second set of images may result in a non-match due to the different overlays.

Figure 19A:
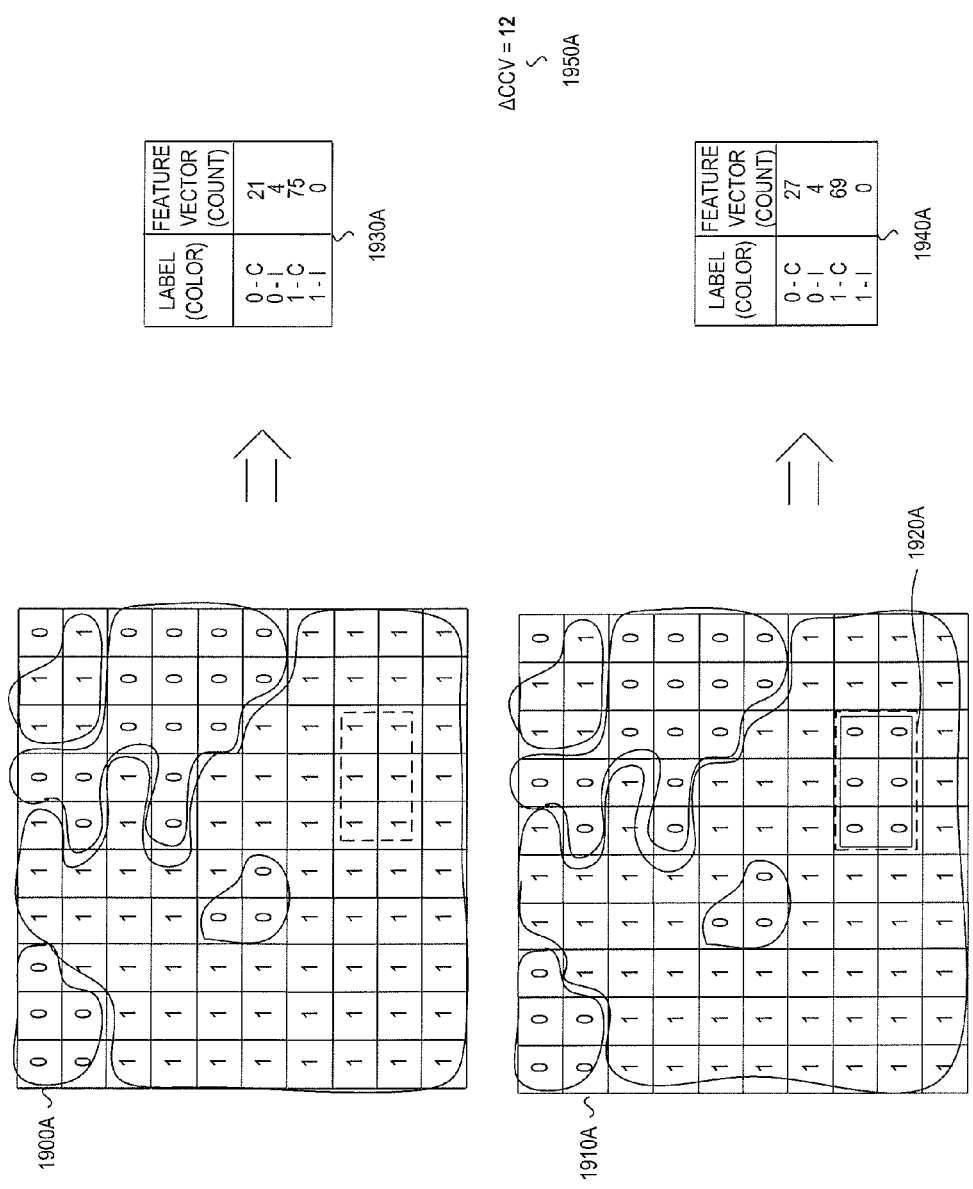
FIG. 19A shows an exemplary impact on pixel grids of an overlay being placed on corresponding image, according to one embodiment of the present invention.

FIG. 19A shows an exemplary impact on pixel grids of an overlay being placed on a corresponding image. Pixel grid 1900A is for an image and pixel grid 1910A is for the image with an overlay. For ease of explanation and understanding the pixel grids are limited to 10×10 (100 pixels) and each pixel has a single bit defining each of the RGB colors. The overlay was placed in the lower right corner of the image and accordingly a lower right corner 1920A of the pixel grid 1910A was affected. Comparing the features (e.g., CCVs) 1930A, 1940A of the pixel grids 1900A, 1910A respectively indicates that the difference (distance) 1950A is 12 (using sum of absolute values).

FIG. 19A shows a system where the calculated fingerprint for the incoming video stream and the known advertisement fingerprints stored in a local database were calculated for entire frames. According to one embodiment, the regions of disinterest (e.g., overlays, bugs or banners) are detected in the video stream and are excluded from the calculation of the fingerprint (e.g., CCVs) for the incoming video stream. The detection of regions of disinterest in the video stream will be discussed in more detail later. Excluding the region from the fingerprint will affect the comparison of the calculated fingerprint to the known advertisement fingerprints that may not have the region excluded.

Figure 19B:
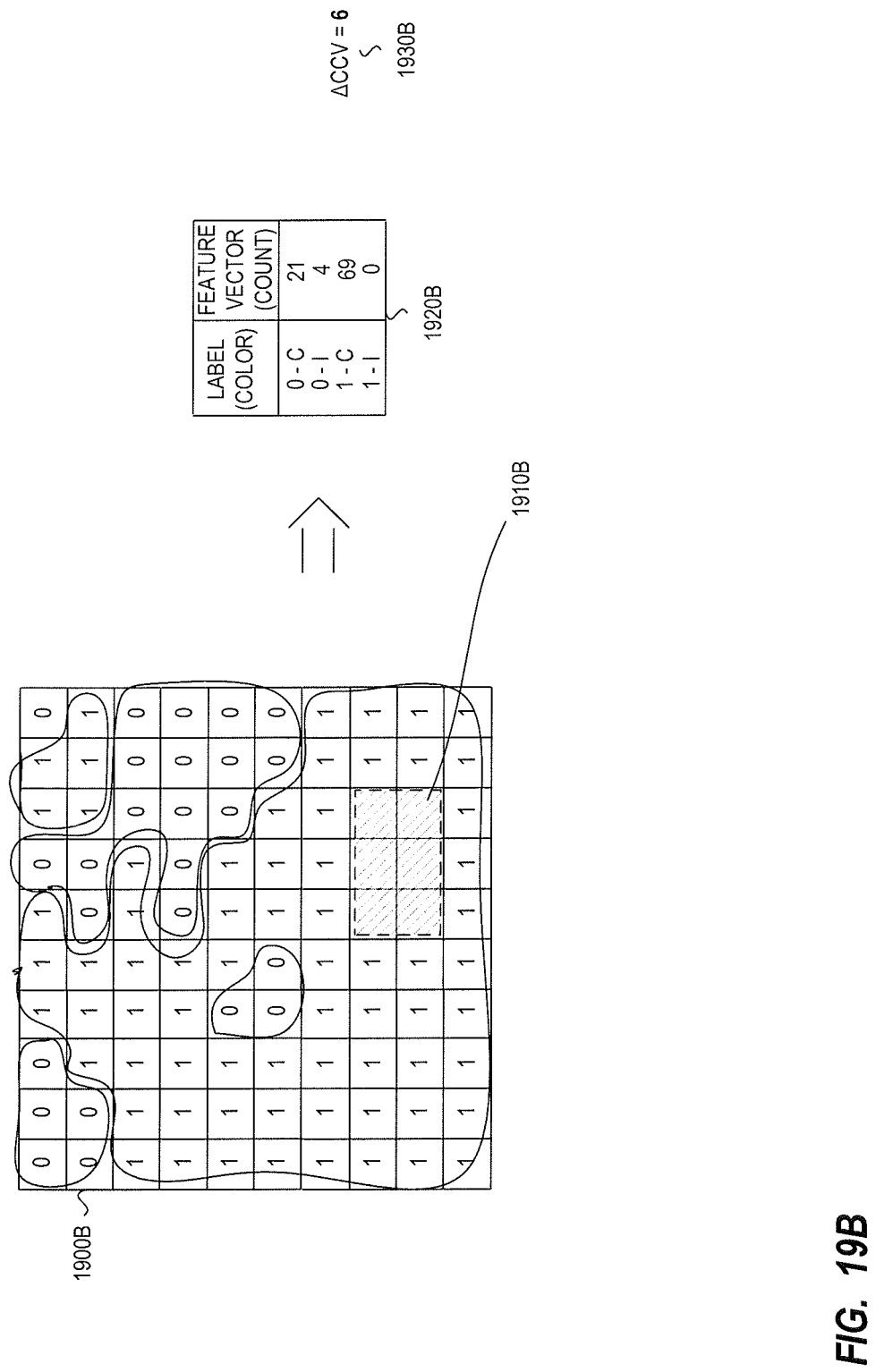
FIG. 19B shows an exemplary pixel grid with a region of interest excluded, according to one embodiment of the present invention.

FIG. 19B shows an exemplary pixel grid 1900B with the region of interest 1910B (e.g., 1920A of FIG. 19A) excluded. The excluded region of interest 1910B is not used in calculating the features (e.g., CCV) of the pixel grid 1900B. As 6 pixels are in the excluded region of interest 1910B, a CCV 1920B will only identify 94 pixels. Comparing the CCV 1920B having the region of interest excluded and the CCV 1930A for the pixel grid for the image without an overlay 1900A results in a difference 1930B of 6 (using the sum of absolute values). By removing the region of interest from the difference (distance) calculation, the distance between the image with no overlay 1900A and the image with the overlay removed 1900B was half of the difference between the image with no overlay 1900A and the image with the overlay 1910A.

The regions of disinterest (ROD) may be detected by searching for certain characteristics in the video stream. The search for the characteristics may be limited to locations where overlays, bugs and banners may normally be placed (e.g., banner scrolling along bottom of image). The detection of the RODs may include comparing the image (or portions of it) to stored regions of interest. For example, network overlays may be stored and the incoming video stream may be compared to the stored overlay to determine if an overlay is part of the video stream. Comparing actual images may require extensive memory for storing the known regions of interest as well as extensive processing to compare the incoming video stream to the stored regions.

A ROD may be detected by comparing a plurality of successive images. If a group of pixels is determined to not have changed for a predetermined number of frames, scene changes or hard cuts then it may be a logo or some over type of overlay (e.g., logo, banner). Accordingly, the ROD may be excluded from comparisons.

The known RODs may have features calculated (e.g., CCVs) and these features may be stored as ROD fingerprints. Features (e.g., CCVs) may be generated for the incoming video stream and the video stream features may be compared to the ROD fingerprints. As the ROD is likely small with respect to the image the features for the incoming video stream may have to be limited to specific portions (portions where the ROD is likely to be). For example, bugs may normally be placed in a lower right hand corner so the features will be generated for a lower right portion of the incoming video and compared to the ROD fingerprints (at least the ROD fingerprints associated with bugs) to determine if an overlay is present. Banners may be placed on the lower 10% of the image so that features would be generated for the bottom 10% of an incoming video stream and compared to the ROD fingerprints (at least the ROD fingerprints for banners).

The detection of RODs may require that separate fingerprints be generated for the incoming video stream and compared to distinct fingerprints for RODs. Moreover, the features calculated for the possible RODs for the incoming video stream may not match stored ROD fingerprints because the RODs for the incoming video stream may be overlaid on top of the video stream so that the features calculated will include the video stream as well as the overlay where the known fingerprint may be generated for simply the overlay or for the overlay over a different video stream. Accordingly it may not be practical to determine RODs in an incoming video stream.

The generation of the fingerprints for known advertisements as well as for the incoming video stream may exclude portions of an image that are known to possibly contain RODs (e.g., overlays, banners). For example as previously discussed with respect to FIG. 19B, a possible ROD 1910B may be excluded from the calculation of the fingerprint for the entire frame. This would be the case for both the calculated fingerprint of the incoming video stream as well as the known advertisement fingerprints stored in the database. Accordingly, the possible ROD would be excluded from comparisons of the calculated fingerprint and the known advertisement fingerprints.

The excluded region may be identified in numerous manners. For example, the ROD may be specifically defined (e.g., exclude pixels 117-128). The portion of the image that should be included in fingerprinting may be defined (e.g., include pixels 1-116 and 129-150). The image may be broken up into a plurality of blocks (e.g., 16×16 pixel grids) and those blocks that are included or excluded may be defined (e.g., include regions 1-7 and 9-12, exclude region 6). A bit vector may be used to identify the pixels and/or blocks that should be included or excluded from the fingerprint calculation (e.g., 0101100 may indicate that blocks 2, 4 and 5 should be included and blocks 1, 3, 6 and 7 are excluded).

The RODs may also be excluded from sections and/or regions if the fingerprints are generated for portions of an image as opposed to an entire image as illustrated in FIG. 19B.

Figure 20:
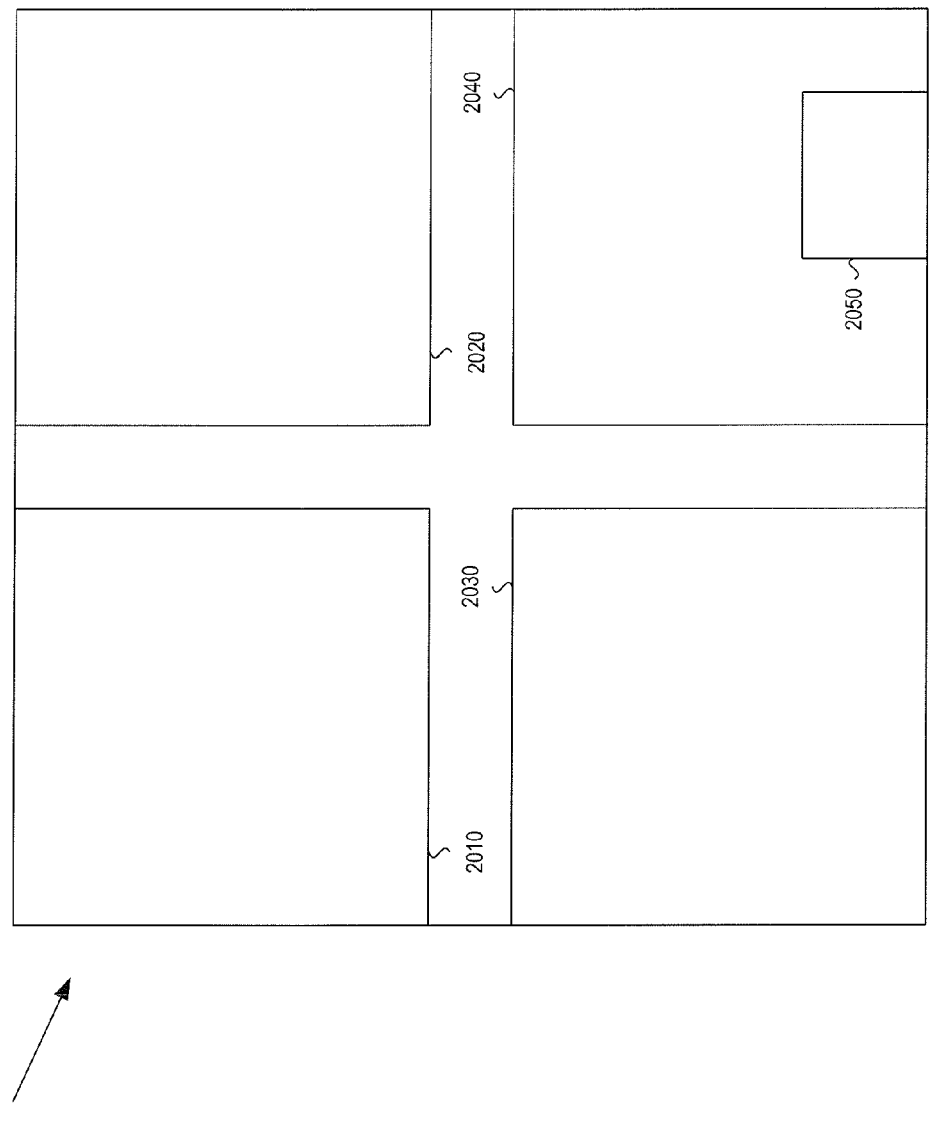
FIG. 20 shows an exemplary image to be fingerprinted that is divided into four sections and has a portion to be excluded from fingerprinting, according to one embodiment of the present invention.

FIG. 20 shows an exemplary image 2000 to be fingerprinted that is divided into four sections 2010-2040. The image 2000 may be from an incoming video stream or a known advertisement, intro, outro, or channel identifier. It should be noted that the sections 2010-2040 do not make up the entire image. That is, if each of these sections is grabbed in order to create the fingerprint for the sections there is clearly no copyright issues associated therewith as the entire image is not captured and the image could not be regenerated based on the portions thereof. Each of the sections 2010-2040 is approximately 25% of the image 2000, however the section 2040 has a portion 2050 excluded therefrom as the portion 2050 may be associated with where an overlay is normally placed.

Figure 21:
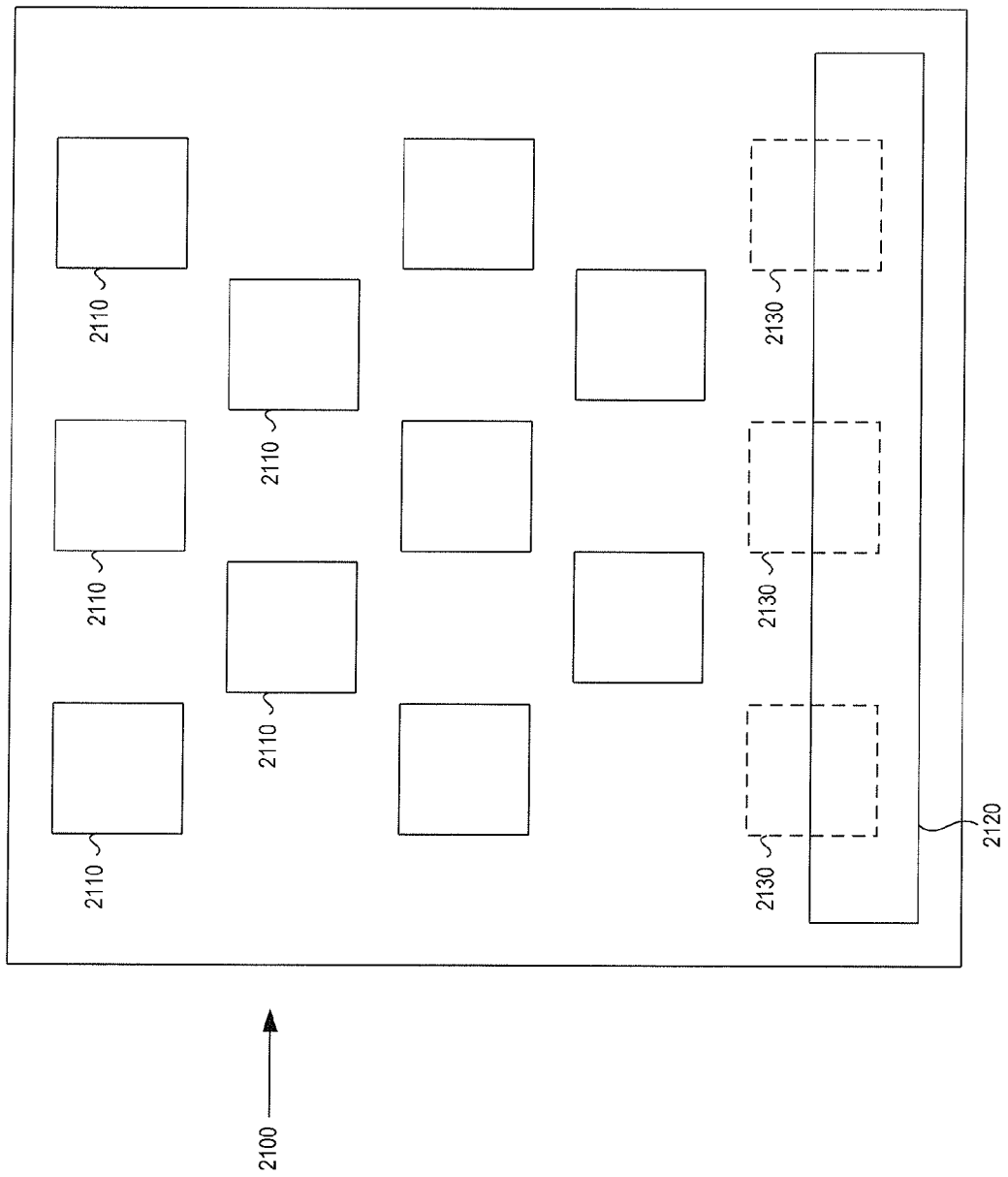
FIG. 21 shows an exemplary image to be fingerprinted that is divided into a plurality of regions that are evenly distributed across the image and has a portion to be excluded from fingerprinting, according to one embodiment of the present invention.

FIG. 21 shows an exemplary image 2100 to be fingerprinted that is divided into a plurality of regions 2110 that are evenly distributed across the image 2100. Again it should be noted that the image 2100 may be from an incoming video stream or a known advertisement and that the regions 2100 do not make up the entire image. A section 2120 of the image may be associated with where a banner may normally be placed, thus this portion of the image would be excluded. Certain regions 2130 fall within the section 2120 so they may be excluded from the fingerprint or those regions 2130 may be shrunk so as to not fall within the section 2120.

Ad substitution may be based on the particular channel that is being displayed. That is, a particular targeted advertisement may not be able to be displayed on a certain channel (e.g., an alcohol advertisement may not be able to be displayed on a religious programming channel). In addition, if the local ad insertion unit is to respond properly to channel specific cue tones that are centrally generated and distributed to each local site, the local unit has to know what channel is being passed through it. An advertisement detection unit may not have access to data (e.g., specific frequency, metadata) indicating identity of the channel that is being displayed. Accordingly the unit will need to detect the specific channel. Fingerprints may be defined for channel identification information that may be transmitted within the video stream (e.g., channel logos, channel banners, channel messages) and these fingerprints may be stored for comparison.

When the incoming video stream is received an attempt to identify the portion of the video stream containing the channel identification information may be made. For example, channel overlays may normally be placed in a specific location on the video stream so that portion of the video stream may be extracted and have features (e.g. CCV) generated therefore. These features will be compared to stored fingerprints for channel logos. As previously noted, one problem may be the fact that the features calculated for the region of interest for the video stream may include the actual video stream as well as the overlay. Additionally, the logos may not be placed in the same place on the video stream at all times so that defining an exact portion of the video stream to calculate features for may be difficult.

Channel changes may be detected and the channel information may be detected during the channel change. The detection of a channel change may be detected by comparing features of successive images of the incoming video stream and detecting a sudden and abrupt change in features. In digital programming a change in channel often results in the display of several monochrome (e.g., blank, black, blue) frames while the new channel is decoded.

The display of these monochrome frames may be detected in order to determine that a channel change is occurring. The display of these monochrome frames may be detected by calculating a fingerprint for the incoming video stream and comparing it to fingerprints for known channel change events (e.g., monochrome images displayed between channel changes). When channels are changed, the channel numbers may be overlaid on a portion of the video stream. Alternatively, a channel banner identifying various aspects of the channel being changed to may be displayed. The channel numbers and/or channel banner may normally be displayed in the same location. As discussed above with respect to the RODs, the locations on the images that may be associated with a channel overlay or channel banner may be excluded from the fingerprint calculation. Accordingly, the fingerprints for either the incoming video stream or the channel change fingerprint(s) stored in the database would likely be for simply a monochrome image.

Figure 22A:
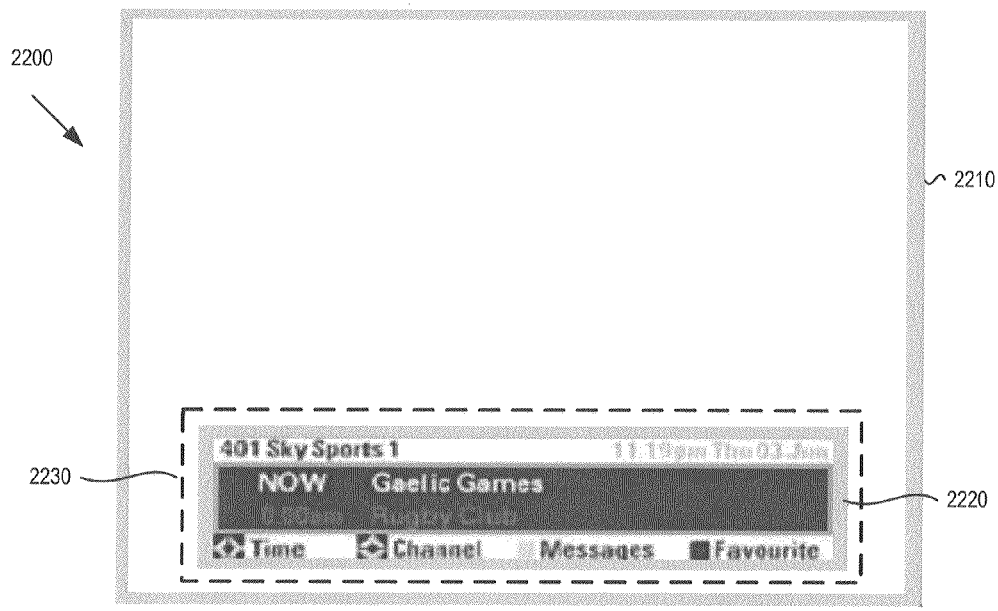
FIG. 22A shows an exemplary channel change image where a channel banner is a region of disinterest, according to one embodiment of the present invention.
Figure 22B:
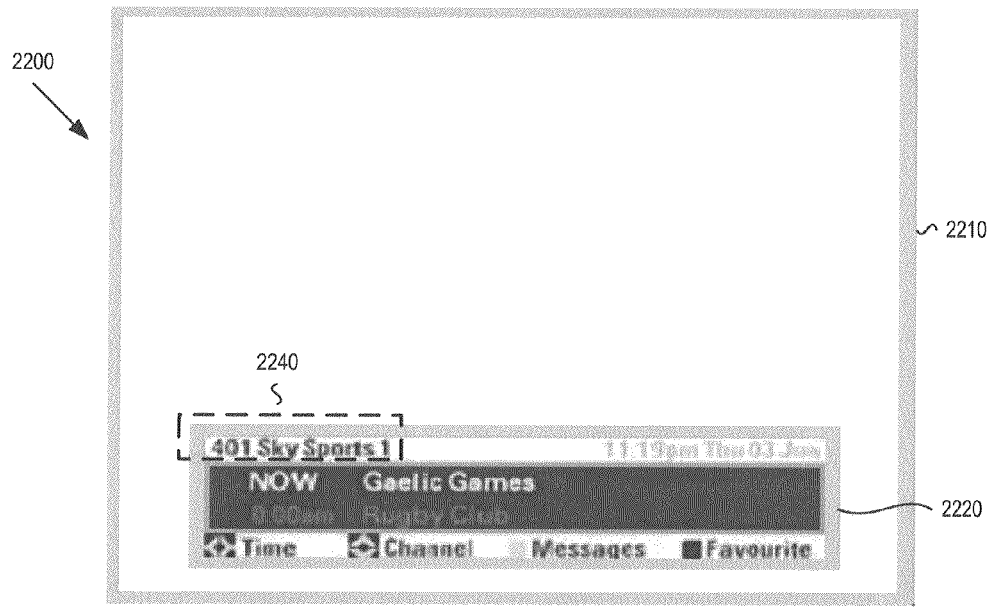
FIG. 22B shows an exemplary channel change image where channel identification information contained in a channel banner is a region of interest, according to one embodiment of the present invention.

An exemplary channel change image 2200 is show in FIGS. 22A and 22B. The image during a channel change is a monochrome frame 2210 with the exception of the channel change banner 2220 along the bottom of the image. Accordingly, as shown in FIG. 22A, the entire channel banner 2220 plus some tolerance may be identified as a region of disinterest 2230 to be excluded from comparisons of the features generated for the incoming video stream and the stored fingerprints.

After, the channel change has been detected (whether based on comparing fingerprints or some other method), a determination as to what channel the system is tuned to can be made. The determination may be based on analyzing channel numbers overlaid on the image or the channel banner. The analysis may include comparing to stored channel numbers and/or channel banners. As addressed above, the actual comparison of images or portions of images requires large amounts of storage and processing and may not be possible to perform in real time.

Alternatively, features/fingerprints may be calculated for the incoming video stream and compared to fingerprints for known channel identification data. As addressed above, calculating and comparing fingerprints for overlays may be difficult due to the background image. Accordingly, the calculation and comparison of fingerprints for channel numbers will focus on the channel banners. It should be noted that the channel banner may have more data than just the channel name or number. For example, it may include time, day, and program details (e.g., title, duration, actors, rating). The channel identification data is likely contained in the same location of the channel banner so that only that portion of the channel banner will be of interest and only that portion will be analyzed.

FIG. 22B shows that the channel identification data 2240 is in the upper left hand corner of the channel banner 2220. Accordingly, this area containing the channel identification data 2240 may be defined as a region of interest. Fingerprints for the relevant portion of channel banners for each channel will be generated and will be stored in a database. The channel identification fingerprints may be stored in same database as the known advertisement (intro, outro, sponsorship message) fingerprints or may be stored in a separate database. If stored in the same database the channel ident fingerprints are likely segregated so that the incoming video stream is only compared to these fingerprints when a channel change has been detected.

It should be noted that different televisions and/or different set-top boxes may display an incoming video stream in slightly different fashions. This includes the channel change banners 2220 and the channel number 2240 in the channel change banner being in different locations or being scaled differently. When looking at an entire image or multiple regions of an image this difference may be negligible in the comparison. However, when generating channel identification fingerprints for an incoming video stream and comparing the calculated channel identification fingerprints to known channel identification fingerprints, the difference in display may be significant.

Figure 23:
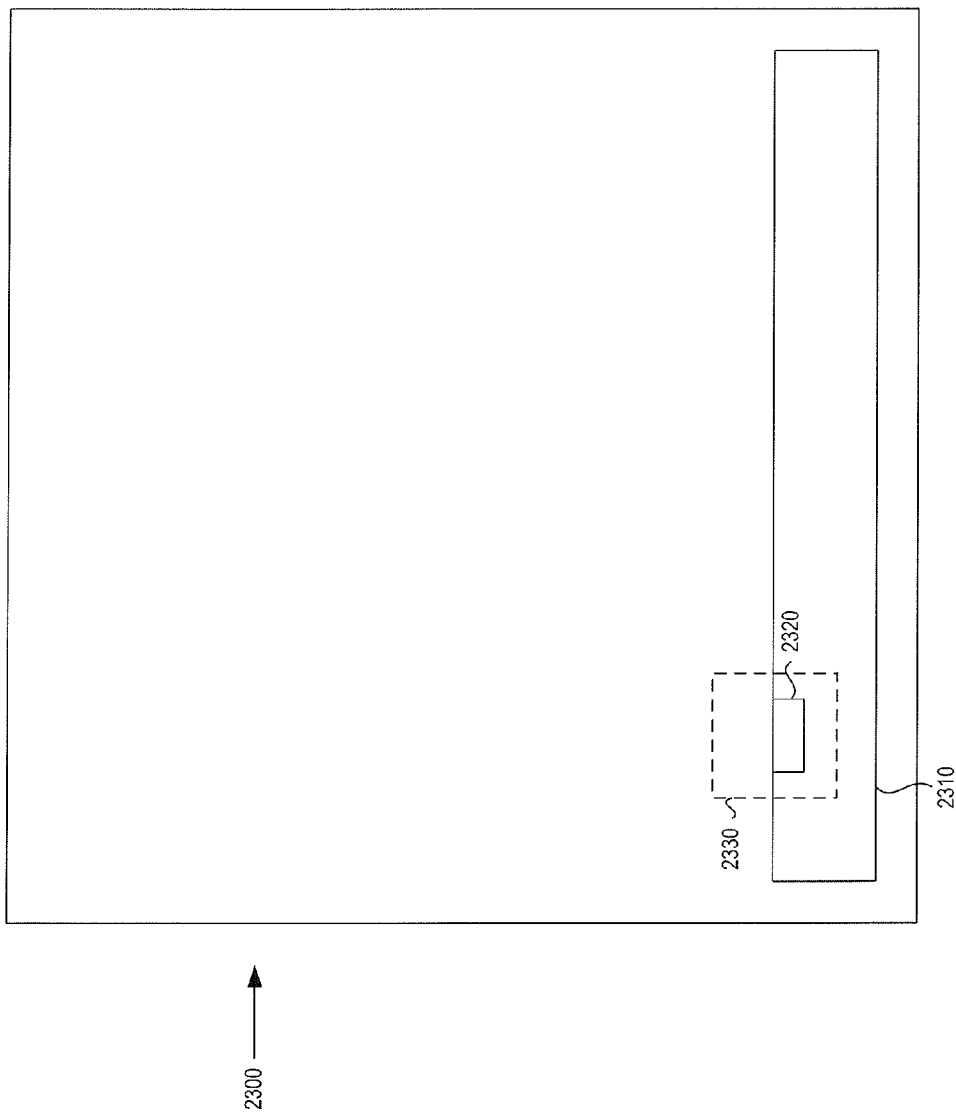
FIG. 23 shows an image with expected locations of a channel banner and channel identification information within the channel banner identified, according to one embodiment of the present invention.

FIG. 23 shows an image 2300 with expected locations of a channel banner 2310 and channel identification information 2320 within the channel banner 2310 identified. The channel identification information 2320 may not be in the exact location expected due to parameters (e.g., scaling, translation) associated with the specific TV and/or STB (or DVR) used to receive and view the programming. For example, it is possible that the channel identification information 2320 could be located within a specific region 2330 that is greatly expanded from the expected location 2320.

In order to account for the possible differences, scaling and translation factors must be determined for the incoming video stream. These factors can be determined by comparing location of the channel banner for the incoming video stream to the reference channel banner 2310. Initially a determination will be made as to where an inner boundary between the monochrome background and the channel banner is. Once the inner boundary is determined, the width and length of the channel banner can be determined. The scale factor can be determined by comparing the actual dimensions to the expected dimensions. The scale factor in x direction is the ratio of the actual width of the channel banner and the reference width, the scale factor in y direction is the ratio of the actual height of channel banner and the reference height. The translation factor can be determined based on comparing a certain point of the incoming stream to the same reference point (e.g., top left corner of the inner boundary between the monochrome background and the channel banner).

The reference channel banner banners for the various channels are scaled and translated during the start-up procedure to the actual size and position. The translation and scaling parameter are stored so they are known. They can be used to scale and translate the incoming stream so that an accurate comparison to the reference material (e.g., fingerprints) can be made. The scaling and translation factors have been discussed with respect to the channel banner and channel identification information but are in no way limited thereto. Rather, these factors can be used to ensure an appropriate comparison of fingerprints of the incoming video stream to known fingerprints (e.g., ads, ad intros, ad outros, channel idents, sponsorships). These factors can also be used to ensure that regions of disinterest or regions of interest are adequately identified.

Alternatively, rather than creating a fingerprint for the channel identifier region of interest the region of interest can be analyzed by a text recognition system that may recognize the text associated with the channel identification data in order to determine the associated channel.

Some networks may send messages ('channel ident') identifying the network (or channel) that is being displayed to reinforce network (channel) branding. According to one embodiment, these messages are detected and analyzed to determine the channel. The analysis may be comparing the message to stored messages for known networks (channels). Alternatively, the analysis may be calculating features for the message and comparing to stored features for known network (channel) messages/idents. The features may be generated for an entire video stream (entire image) or may be generated for a portion containing the branding message. Alternatively, the analysis may include using text recognition to determine what the message says and identifying the channel based on that.

A maximum break duration can be identified and is the maximum amount of time that the incoming video stream will be preempted. After this period of time is up, insertion of advertisements will end and return to the incoming video stream. In addition a pre-outro time is identified. A pre-outro is a still or animation that is presented until the max break duration is achieved or an outro is detected whichever is sooner. For example, the maximum break duration may be defined as 1:45 and the pre-outro may be defined as :15.

Accordingly, three 30 second advertisements may be displayed during the first 1:30 of the ad break and then the pre-outro may be displayed for the remaining :15 or until an outro is detected, whichever is sooner. The maximum break duration and outro time are defined so as to attempt to prevent targeted advertisements from being presented during programming. If an outro is detected while advertisements are still being inserted (e.g., before the pre-outro begins) a return to the incoming video stream may be initiated. As previously discussed sponsorship messages may be utilized along with or in place of outros prior to return of programming. Detection of a sponsorship message will also cause the return to the incoming video stream. Detection of programming may also cause the return to programming.

A minimum time between detection of a video entity (e.g., ad, ad intro) that starts advertisement insertion and ability to detect a video entity (e.g., ad outro, programming) that causes ad insertion to end can be defined (minimum break duration). The minimum break duration may be beneficial where intros and outros are the same. The minimum break duration may be associated with a shortest advertisement period (e.g., 30 seconds). The minimum break duration would prevent the system from detecting an intro twice in a relatively short time frame and assuming that the detection of the second was an outro and accordingly ending insertion of an advertisement almost instantly.

A minimum duration between breaks (insertions) may be defined, and may be beneficial where intros and outros are the same. The duration would come into play when the maximum break duration was reached and the display of the incoming video steam was reestablished before detection of the outro. If the outro was detected when the incoming video stream was being displayed it may be associated with an intro and attempt to start another insertion. The minimum duration between breaks may also be useful where video entities similar to know intros and/or outros are used during programming but are not followed by ad breaks. Such a condition may occur during replays of specific events during a sporting event, or possibly during the beginning or ending of a program, when titles and/or credits are being displayed.

The titles at the beginning of a program may contain subsequences or images that are similar to know intros and/or outros. In order to prevent the detection of these sub-sequences or images from initiating an ad break, the detection of programming can be used to suppress any detection for a predefined time frame (minimum duration after program start). The minimum duration after program start ensures that once the start of a program is detected that sub-sequences or images that are similar to know intros and/or outros will not interrupt programming.

The detection of the beginning of programming (either the actual beginning of the program or the return of programming after an advertisement break) may end the insertion of targeted advertisements or the pre-outro if the beginning of programming is identified before the maximum break duration is expired or an outro is identified.

Alternatively, if an outro, sponsorship message or programming is detected during an advertisement being inserted, the advertisement may be completed and then a return to programming may be initiated.

The detection of the beginning of programming may be detected by comparing a calculated fingerprint of the incoming video stream with previously generated fingerprints for the programming. The fingerprints for programming may be for the scenes that are displayed during the theme song, or a particular image that is displayed once programming is about to resume (e.g., an image with the name of the program). The fingerprints of programming and scenes within programming will be defined in more detail below.

Once it is determined that programming is again being presented on the incoming video stream the generation and comparison of fingerprints may be halted temporarily as it is unlikely that an advertisement break be presented in a short time frame.

The detection of a channel change or an electronic program guide (EPG) activation may cause the insertion of advertisements to cease and the new program or EPG to be displayed.

Fingerprints can be generated for special bulletins that may preempt advertising in the incoming video stream and correspondingly would want to preempt insertion of targeted advertising. Special bulletins may begin with a standard image such as the station name and logo and the words special bulletin or similar type slogan. Fingerprints would be generated for each known special bulletin (one or more for each network) and stored locally. If the calculated fingerprint for an incoming video stream matched the special bulletin while targeted advertisement or the pre-outro was being displayed, a return to the incoming video stream would be initiated.

While methods for local detection of advertisements or advertisement intros and local insertion of targeted advertisements have been described, the methods described are not limited thereto. For example, certain programs may be detected locally. The local detection of programs may enable the automatic recording of the program on a digital recording device such as a DVR. Likewise, specific scenes or scene changes may be detected. Based on the detection of scenes a program being recorded can be bookmarked for future viewing ease.

To detect a particular program, fingerprints may be established for a plurality of programs (e.g., video that plays weekly during theme song, program title displayed in the video stream) and calculated features for the incoming video stream may be compared to these fingerprints. When a match is detected the incoming video stream is associated with that program. Once the association is made, a determination can be made as to whether this is a program of interest to the user. If the detected program is a program of interest, a recording device may be turned on to record the program. The use of fingerprints to detect the programs and ensure they are recorded without any user interaction is an alternative to using the electronic or interactive program guide to schedule recordings. The recorded programs could be archived and indexed based on any number of parameters (e.g., program, genre, actor, channel, network).

Scene changes can be detected as described above through the matching of fingerprints. If during recording of a program scene changes are detected, the change in scenes can be bookmarked for ease of viewing at a later time. If specific scenes have already been identified and fingerprints stored for those scenes, fingerprints could be generated for the incoming video stream and compared against scene fingerprints. When a match is found the scene title could bookmark the scene being recorded.

The fingerprints stored locally may be updated as new fingerprints are generated for any combination of ads, ad intros, channel banners, program overlays, programs, and scenes. The updates may be downloaded automatically at certain times (e.g., every night between 1 and 2 am), or may require a user to download fingerprints from a certain location (e.g., website) or any other means of updating. Automated distribution of fingerprints can also be utilized to ensure that viewers local fingerprint libraries are up-to-date.

The local detection system may track the features it generates for the incoming streams and if there is no match to a stored fingerprint, the system may determine that it is a new fingerprint and may store the fingerprint. For example, if the system detects that an advertisement break has started and generates a fingerprint for the ad (e.g., new Pepsi® ad) and the features generated for the new ad are not already stored, the calculated features may be stored for the new ad.

In order to ensure that video segments (and in particular intros and advertisements) are detected reliably, regions of interest in the video programming are marked and regions outside of the regions of interest are excluded from processing. The marking of the regions of interest is also used to focus processing on the areas that can provide information that is useful in determining to which channel the unit is tuned. In one instance, the region of interest for detection of video segments is the region that is excluded for channel detection and visa versa. In this instance the area that provides graphics, icons or text indicating the channel is examined for channel recognition but excluded for video segment recognition.

Figure 24:
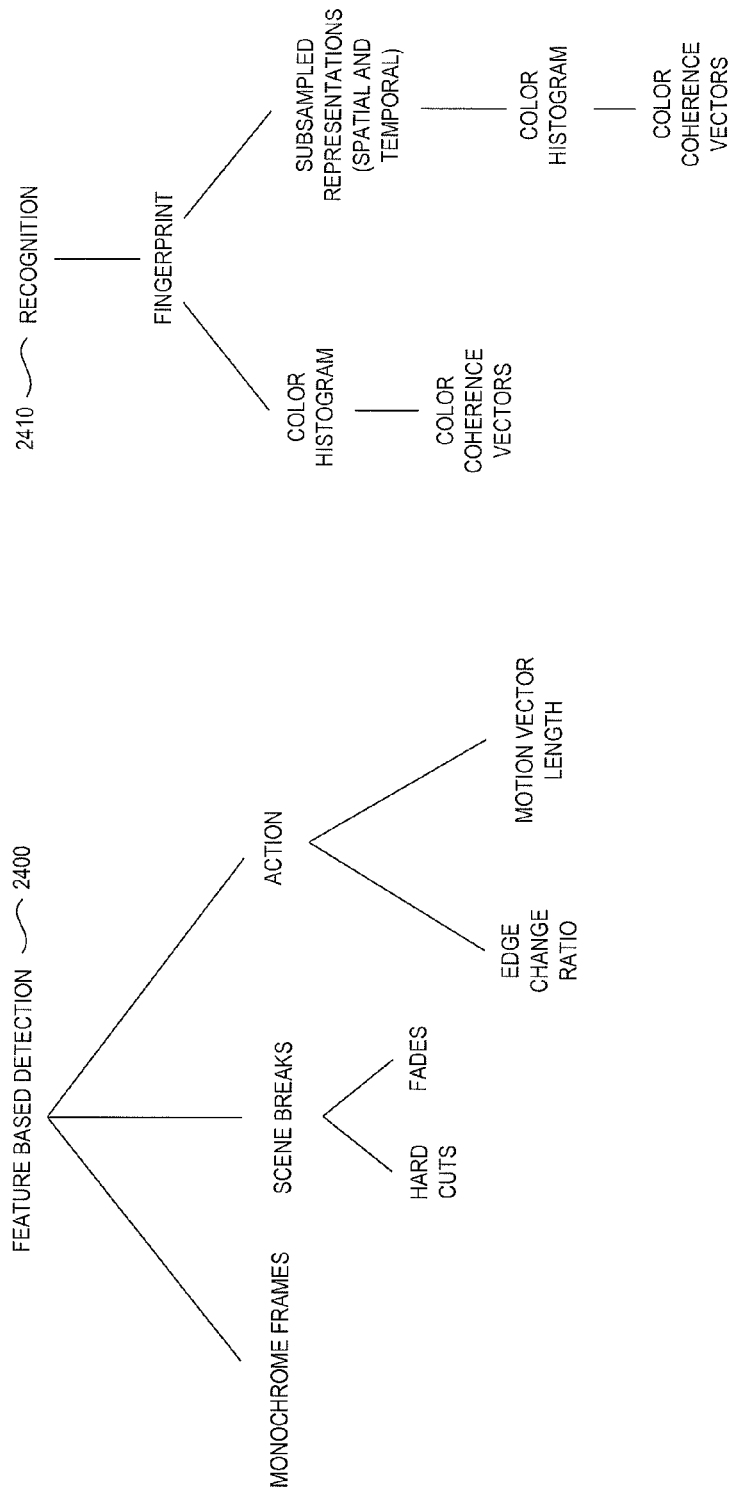
FIG. 24 shows the family of feature based detection methods as well as recognition, and specifically fingerprint, detection methods, according to one embodiment of the present invention.

Both feature based detection and recognition based detection methods can be applied to video streams to recognize video entities as shown in FIG. 24. Feature based detection methods 2400 can include, but are not limited to, the detection of monochrome frames, the detection of scene break either through hard cuts or fades or the detection of action either through measurement of edge change ratios or motion vector lengths. Recognition methods 2410 are based on fingerprints. Fingerprints can be created using both color histograms or CCVs based on the entire image or can be generated based on subsampled representations where the subsampling occurs either spatially or temporally. Although FIG. 24 shows the use of color histograms and CCVs, a number of other statistical parameters associated with the images or portions thereof can be used to create fingerprints. Video entities can be considered to be either known segments or sections of video which are of interest for automatic detection. For example, advertisements, intros to sets of advertisements, promotions, still images representing advertisements, and other types of inserted advertising materials are video entities. Scene breaks including scene breaks leading to advertisements or scene breaks simply placed between scenes of the programming can also be considered to be video entities. As such video entities represent portions of the video stream that content providers may desire to keep integral to the video stream but which automatic detection equipment may be able to recognize for alteration of the video stream contrary to the wishes of the content provider.

Figure 25:
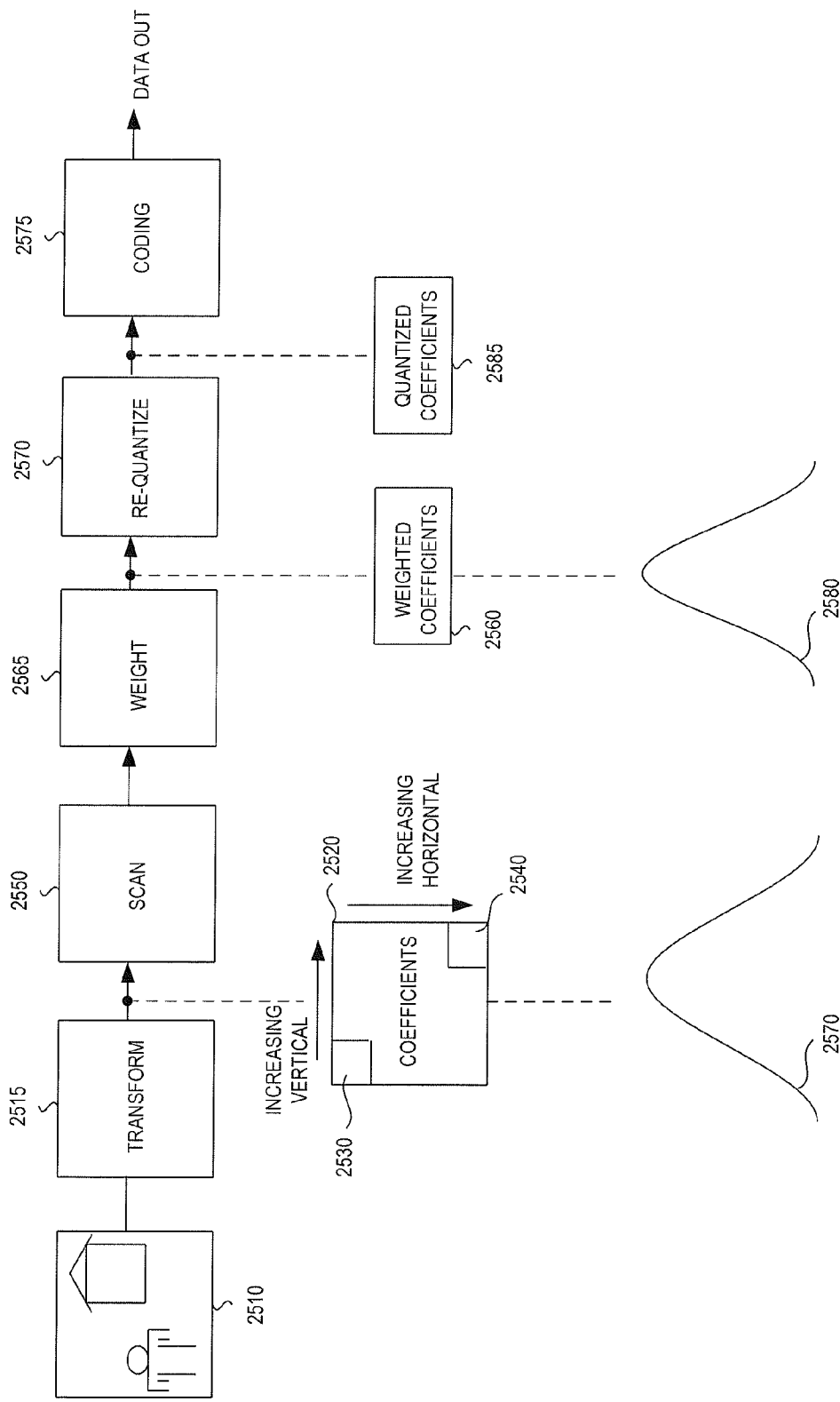
FIG. 25 is a diagram of a spatial compression process for digital video with associated statistically relevant parameters, according to an embodiment of the present invention.

The statistical properties of the compressed digital stream can also be used for video entity detection. Compression of a digital video stream can comprise spatial and temporal compression techniques. FIG. 25 shows spatial compression of a digital video image, where an image frame 2510 in an uncompressed state is subsequently transformed 2515 into a frequency domain representation. As will be understood by those skilled in the art, the image 2510 can be either a frame representing complete information within the image or a prediction error frame that contains only partial information related to movement of macro blocks. The spatial compression techniques can be applied to both full frames of information as well as to prediction error frames. The transformed image in the frequency domain can be represented in a table of coefficients 2520, ranging from the DC coefficient 2530 in the upper left hand corner to highest frequency component coefficients 2540 in the lower right hand corner, where vertical and horizontal frequencies vary along the X and Y axis, respectively. A variety of techniques may be used to transform 2515 the image from the spatial domain into the frequency domain including Discrete Cosine Transform (DCT), wavelet transforms, and a variety of other transforms which will result in frequency coefficients that represent the image.

The coefficients 2520 are scanned 2550 and weighted 2565 such that particular coefficients are given more importance than other coefficients. This is due to the fact that the human eye will process the image in a particular manner and that certain coefficients may be more important than others and should thus be weighted accordingly for subsequent compression steps and transmission. A quantizing step 2570 is used to reduce the length of some of the coefficients. Because some of the coefficients can be less important to the human eye, they are represented with fewer bits and thus a lower accuracy, which increases what is termed as the quantizing error. This technique can be applied to coefficients that are of less importance (usually the higher frequency components) and reduce the amount of information which needs to be transmitted, thus achieving a coding gain or compression but which do not perceivably affect the image.

Figure 26:
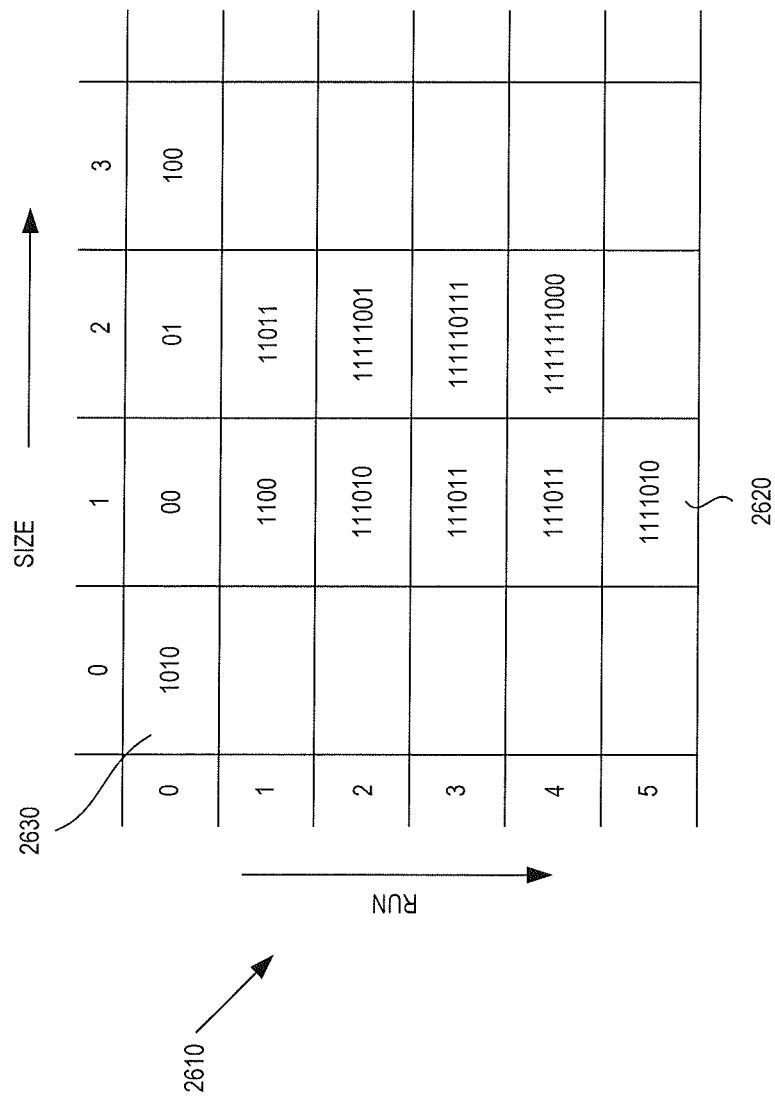
FIG. 26 is a table of size and run length parameters being converted to code words for transmission as indicated the process in FIG. 25, according to one embodiment of the present invention.

Once the image is appropriately weighted 2565 and quantized 2570, it can be further encoded 2575 and output for either temporal coding, or transmission if no temporal coding is being utilized as is also show in FIG. 25. For example, as will be understood to those skilled in the art, a Huffman coding algorithm (or arithmetic coding) can be used to further encode the compressed image data in the spatial domain. The quantized coefficients 2585 representing an uncompressed digital image can be represented all together in a one dimensional sequence. In this sequence, each non-zero coefficient is known as a "size", and a number of successive zero value coefficients preceding a size value is known as a "run". FIG. 26 shows a table 2610 where size and run length parameters are converted to a particular Huffman code word 2620 for transmission. The particular code word to be transmitted is dependent on both the number of zeros that have previously appeared and the particular coefficient that is then needed to be transmitted. Although that table 2610 represents a particular assignment of codes, any number of coding schemes can be used, those coding schemes being able to efficiently code the information such that transmission bandwidth is minimized and such that the information is appropriately transmitted. In some instances, codes will be used that are particularly robust and can survive loss of certain bits of information, while in other instances the goal will simply be that of compression.

The entry in the size column of table 2610 is a coefficient that in some instances is a 1010 coefficient 2630 and which represents a pattern for the End of Blocks (EOB) symbol. This code word is assigned to the zero/zero entry in the table since the code of zero/zero has no meaningful run-size interpretation. Use of this code word for end of block allows easy determination of the end of a block in the spatial compressed digital video stream.

As is also shown in FIG. 25, there are statistical parameters related to the coefficients 2520 after transformation as well as statistical parameters related to the weighted coefficients 2560. The statistical parameters of the coefficients or weighted coefficients can be used as a method of understanding the image and, in particular, of fingerprinting the image. For example, an image that has been compressed will have a certain histogram of coefficients 2570 that can be used as a fingerprint. Likewise, a histogram of the weighted coefficients 2580 can be used to create a fingerprint for an image. In the event that this fingerprint of the statistical parameters of compression are recorded and stored, the incoming video can be checked against the stored video by comparing the statistical parameters of the incoming video with the statistical compression parameters of the stored video.

Figure 28:
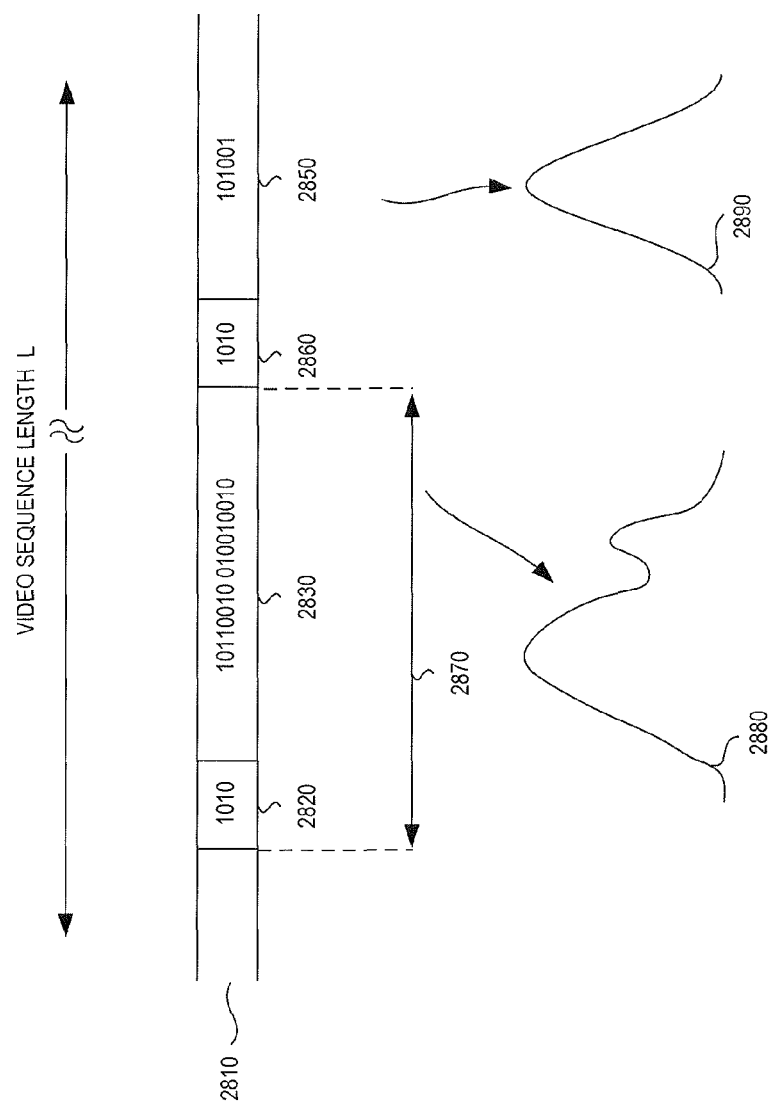
FIG. 28 shows a spatially coded transmission stream created with the encoding demonstrated in FIG. 26, with associated statistically relevant parameters, according to an embodiment of the present invention.

The statistical parameters of the code words can also be used for fingerprinting. FIG. 28 shows the use of code word histograms for fingerprinting by showing an actual possible transmission stream 2810 with an end of block 2820 followed by a series of code words 2830, followed by another end of block 2860 followed by a series of code words 2850. Other statistical parameters that can be used in addition to those previously mentioned include the time separation between the end of blocks 2870, the histogram of the end of block separation 2880 and the code word histogram 2890. There will be statistical variations such that a video segment of several seconds or 30 seconds in length will have a particular code word histogram which can be potentially used to identify that video segment. In some instances looking at a small portion of the video segments such as a few milliseconds of video sequence will create a code word histogram that is sufficiently unique to allow that code word histogram to be used for either a full or partial identification of that video sequence.

Figure 29:
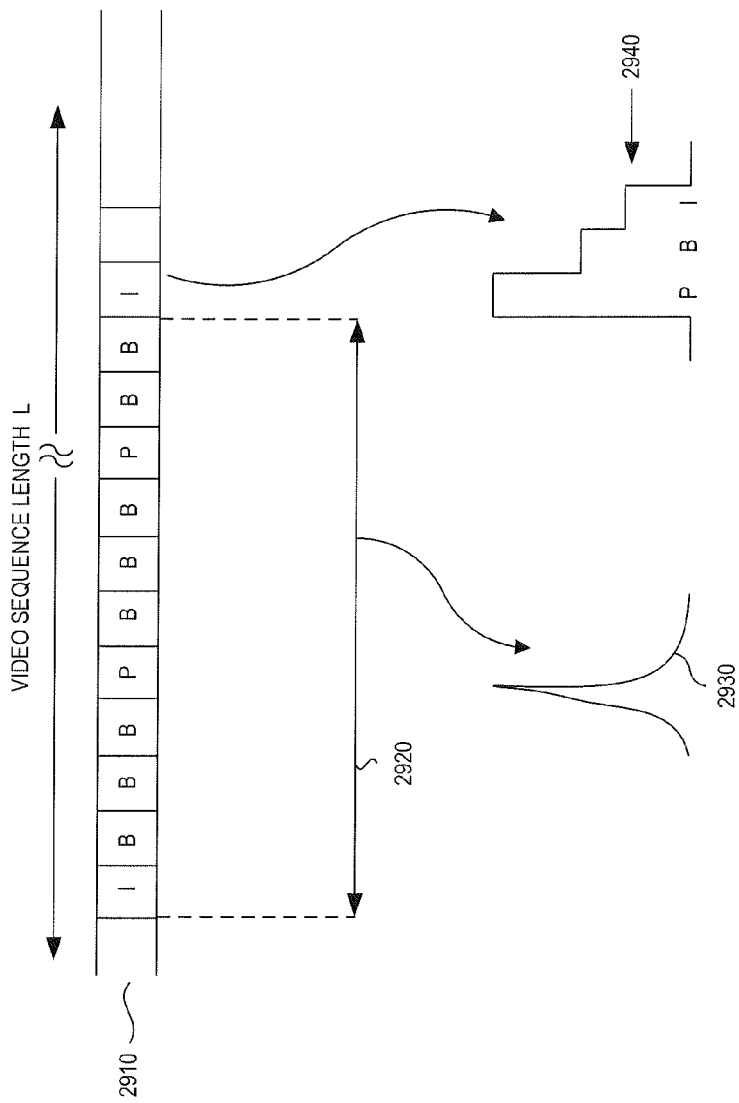
FIG. 29 shows a temporally encoded transmission stream with associated statistically relevant parameters, according to an embodiment of the present invention.

A spatially transformed and compressed digital video sequence can be further temporally compressed by removing redundant information in time and creating representations that are of only a partial frame, but allow reconstruction of entire frame. For example in MPEG-2, I-frames are used in conjunction with B—(bidirectional) and P—(predictive) frames to allow efficient transmission of the video without requiring transmission of the full video image in each and every frame. FIG. 29 shows a video sequence in which temporal compression has taken place. In a frame sequence 2910, an I-frame can be followed by a number of B-frames and P-frame, other B-frames, P-frames and then a subsequent I frame. The actual image that is produced is based on a reconstruction from the B-frames and P-frames in conjunction with the I-frames or based on the I-frames alone. The statistically relevant parameters that occur include the separation of the I-frames 2920 as well as the actual statistics of the B-, P- and I-frames between I frames. As such, a statistically relevant fingerprint based on the compression of the video can be created by looking at a histogram of the I-frame separation 2930 or of the number of B-, P- and I-frames within a given time segment 2940. For example, it is possible to measure on a sub frame or full frame basis the statistics of that frame and compare those statistics against statistics of known video sequences which have been fingerprinted. In the event that there is sufficient similarity between the incoming statistics of the compressed incoming video sequence, they can be compared against the statistics of the known sequences and a determination made that the sequences match or that additional analysis needs to be performed in the uncompressed domain to correctly identify the video sequence. Although the ability to use frame histograms will depend to some extent on the use of similar encoders, there are certain frame statistics that will have strong similarities between different encoders.

The statistics associated with the motion vectors can also be analyzed and used as the basis for a fingerprint. In particular, the statistics of the magnitude and direction of the motion vectors can provide the basis for a unique characterization and fingerprinting of a frame.

In one embodiment, it is possible to generate spatially reduced images from MPEG-1, MPEG-2, MPEG-4, VC-1 (video codec based on Microsoft Windows Media Video version 9) or other compressed digital video streams. These spatially reduced images can be derived directly from I-frames, or approximated from P-frames and B-frames. In one embodiment the approximation from P-frames and B-frames is accomplished by employing motion information to derive the DC images. A zero-order approximation can be obtained by taking the DC value from the block in the P-frame or B-frame that has the most overlap with a reference block, the reference block being the current block of interest. A first-order approximation can be determined by weighing the contributions from the 4 neighboring DC values with the ratio of overlaps of the reference block with each of the neighboring blocks. These techniques can be applied to generate DC images from frames of compressed video. Once DC images have been obtained, it is possible to generate fingerprints from those DC images, and to compare those fingerprints against stored fingerprints. Because the processing can be performed at high speeds, it is possible to generate fingerprints at rates equal to or exceeding 1,000 frames per second.

Figure 27:
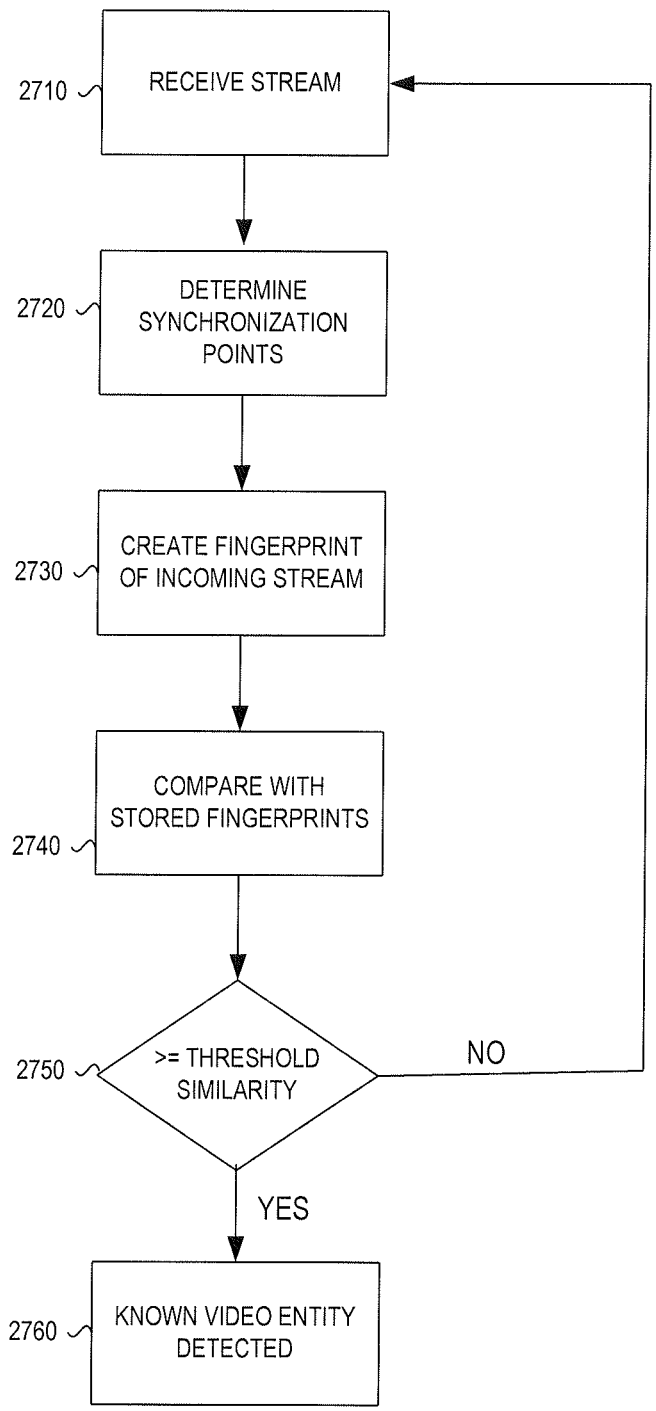
FIG. 27 is a block diagram showing a method for video entity recognition, according to an embodiment of the present invention.

In one embodiment, shown in FIG. 27, synchronization points are determined within a compressed digital video stream. Upon detection of a synchronization point 2720 after receiving a stream 2710, a fingerprint comprising of a statistical parameterized representation of the compressed stream is created for a window following the synchronization point 2730. The fingerprint of the incoming stream is compared with a plurality of fingerprints based on previously parameterized known video entities 2740. If the parameterized representation of the incoming stream has at least a threshold level of similarity 2750 with a particular fingerprint in the plurality of fingerprints then detection of the known video entity within the incoming stream is accomplished 2760. To increase the level of confidence for detection of the known video entity, further processing of the uncompressed video and subsequent comparison to a plurality of fingerprints can be performed. When the level of confidence of known video entity detection is sufficiently high, either with or without additional processing in the uncompressed domain, further action, such as insertion of a targeted advertisement into a presentation stream, can be accomplished.

Figure 30:
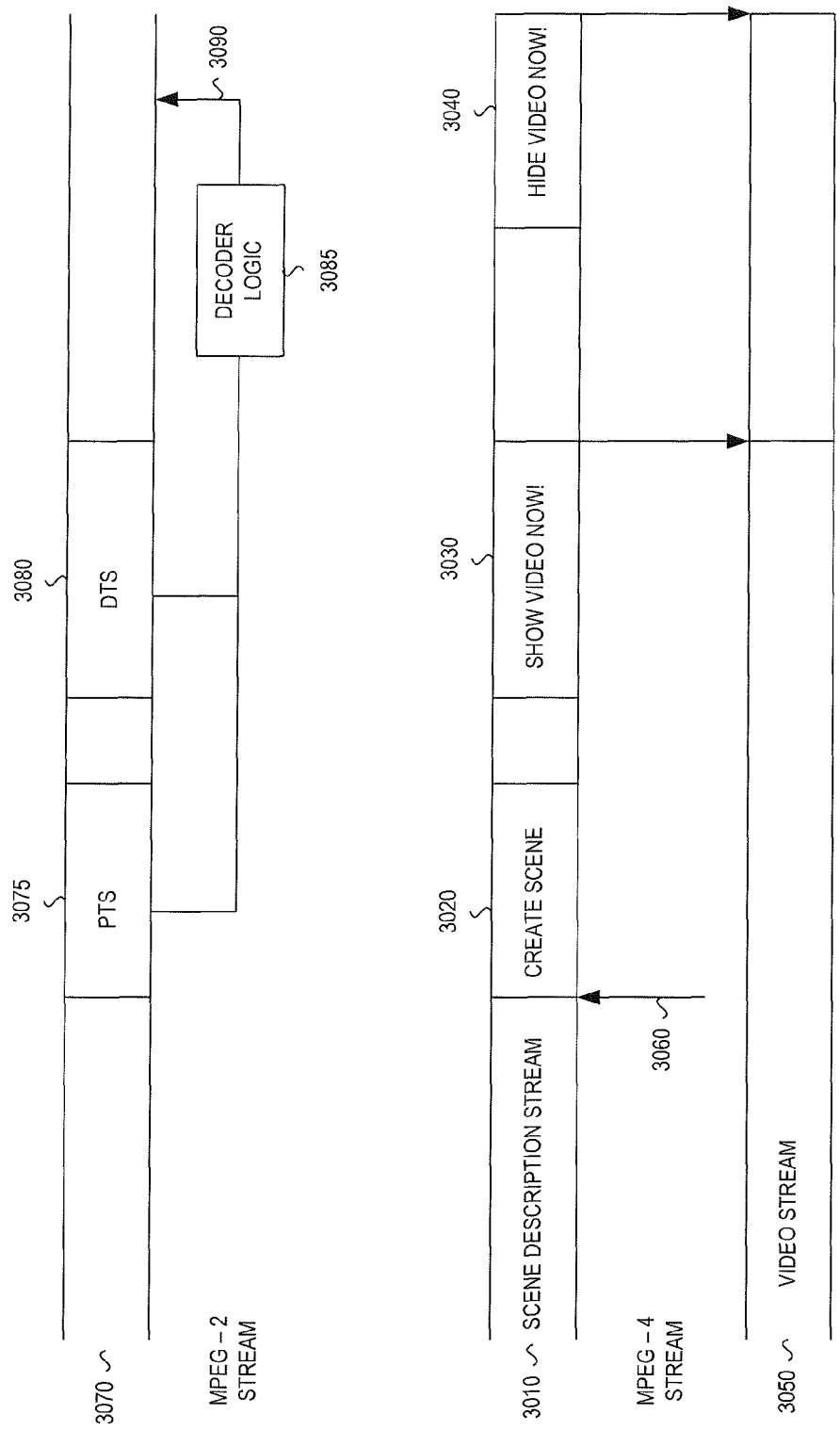
FIG. 30 shows synchronization points within a compressed transmission stream used to trigger creation of statistical parameter as described in FIGS. 25 and 29, according to an embodiment of the present invention.

Synchronization points are determined from time stamps or clock references embedded within a compressed digital video stream. It will be understood by one skilled in that art, that synchronization points for digital streams encoded using different standards can be obtained from time information encoded within those streams. In one embodiment, a synchronization point 3090 in an MPEG-2 steam 3070 can be determined as shown in FIG. 30. The compressed steam 3070 may contain time stamps that indicate to the decoder 3085 to decode and uncompress the compressed video data to create a presentation scene and time stamps which indicate the decoded, uncompressed scene is ready to be output. A DTS (decoding time stamp) 3080 indicates when a presentation scene is to be created and a PTS (presentation time stamp) 3075 indicates when a presentation scene is to be output. Additionally, the decoder 3085 can also determine a synchronization point 3090 based on a DTS and a PTS contained within the stream.

In an alternate embodiment, a synchronization point 3060 is determined from time stamps or clock references embedded within a compressed digital video stream in the MPEG-4 format 3010 as shown in FIG. 30. The compressed steam 3010 contains time stamps in the BIFS commands that indicate to the decoder to decode and uncompress the compressed video data to create a presentation scene 3020 and time stamps which indicate the decoded, uncompressed scene is ready to be output 3030, or likewise, terminate output of a presentation scene 3040 in the presentation stream 3050. FIG. 30 shows a synchronization point associated with the command to create a scene from the compressed steam, although determination of synchronization points within the stream are not limited to this association with a scene creation command.

Based on the detection of synchronization points, fingerprints can be immediately generated from the statistical parameters of the compressed digital stream and compared against fingerprints of the statistical parameters in a stored library. One advantage of the approach described herein is that the ability to detect synchronization points within the compressed digital video stream provides for partial temporal alignment of the fingerprints generated in the incoming video stream with the fingerprints in the library. As a result of this partial temporal alignment, it is no longer necessary to completely cross-correlate frame or sub-frame fingerprints for each in-coming against each and every frame or sub-frame fingerprint of a stored frame. Instead, the timing obtained from the compressed digital video stream is used to identify potential advertisements, and the comparison is made between the beginning of what is believed to be an advertisement and the beginning of an actual stored advertisement. As such, the computational requirements for fingerprint comparison are reduced.

In one embodiment, based on the detection of a synchronization point, fingerprints can be immediately generated from the statistical parameterized representations of the compressed digital stream, including at least some subset of coefficient histograms, weighted coefficient histograms, code word histograms, histograms of separation of end blocks, histograms of I frame separations, the number of B, P, and I frames within a time segment, motion compensation vectors, and spatially reduced coefficients.

In one embodiment, based on the detection of a synchronization point, fingerprints can be immediately generated from the DC coefficients of the I-frames which represent a low resolution images of the image represented by the I frame. Based on the detection of the synchronization points and generation of DC coefficients from the compressed digital video stream, a series of fingerprints can be generated and compared against fingerprints in a stored library.

In an alternate embodiment, the stored fingerprints are based on both AC and DC coefficients in a linear mixture and do not contain recognizable images. The incoming compressed video stream is used to generate similar fingerprints that are linear combinations of AC and DC coefficients which are compared against the stored fingerprints. In this embodiment no actual images exist or are stored in the fingerprinting system, thus minimizing copyright issues.

In another embodiment, video entity recognition is performed in the compressed digital video domain but additional processing is utilized based on the uncompressed images to confirm the presence of an advertisement. In this embodiment, the dual processing (compressed and uncompressed domains) provides for a higher reliability of video entity or advertisement recognition.

The present method and system allows for a fingerprinting of video sequences based on the statistical parameters of compression. The fingerprints that are created are then compared against the statistical parameters of an incoming video stream to detect a known video sequence. These parameters include the statistical parameters generated both in the spatial compression as well as that in the temporal compression. The spatial compression parameters include coefficient histograms, weighting histograms, quantization statistics as well as any other statistics related to the spatial compression process. Similarly in the temporal domain, the statistics related to the creation of the temporal compression including the number of I, B and P frames, the spacing between I frames, and other parameters related to the motion compensation can all be used to create fingerprints and subsequently recognize video sequences. Motion compensation vectors and the statistics thereof can be used as a means of creating a fingerprint and subsequent comparison between incoming motion compensation vectors and the fingerprint to determine if the images match. Fingerprints can also be obtained from spatially reduced images obtained from the DC coefficients, or similarly a linear combination of DC and AC coefficients, of the compressed digital video image.

The techniques described herein can be applied to a variety of video compression techniques including, but not limited to, MPEG-1, MPEG-2 and MPEG-4. In MPEG-4, a number of additional statistical parameters are available including the parameters relating to video objects, still texture objects, mesh objects and face and body animation objects. The statistics related to those objects include differential encoding statistics including the vectors and residuals, the statistics related to what are known as the video object planes and other parameters related specific to MPEG-4 encoding. These parameters can be derived from the compression and decompression of the MPEG-4 and be used to create fingerprints and to recognize those fingerprints just as applied to MPEG-2.

It is noted that any and/or all of the above embodiments, configurations, and/or variations of the present invention described above can be mixed and matched and used in any combination with one another. Moreover, any description of a component or embodiment herein also includes hardware, software, and configurations which already exist in the prior art and may be necessary to the operation of such component(s) or embodiment(s).

All embodiments of the present invention, can be realized in on a number of hardware and software platforms including microprocessor systems programmed in languages including (but not limited to) C, C++, Perl, HTML, Pascal, and Java, although the scope of the invention is not limited by the choice of a particular hardware platform, programming language or tool.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

The many features and advantages of the invention are apparent from the detailed specification. Thus, the appended claims are to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, appropriate modifications and equivalents may be included within the scope.

What is claimed is:

1. A computer based method for automatically detecting a known video segment from a set of known video segments comprising:
  receiving a video stream;
  creating statistical parameterized representations for windows of the video stream;

comparing the statistical parameterized representations with a database containing a set of fingerprints of the set of known video segments, wherein the set of fingerprints comprise statistical parameterized representations of the set of known video segments;

recognizing the known video segment when the comparing of the statistical parameterized representations with the database containing the set of fingerprints of the set of known video segments produces a threshold level of similarity;

generating a transmittable signal indicating the known video segment has appeared in the video stream.

2. The computer based method of claim 1 wherein the transmittable signal is transmitted over a network.

3. The computer based method of claim 1 wherein the database containing the set of fingerprints of the set of known video segments is periodically updated.

4. The computer based method of claim 1 wherein the database containing the set of fingerprints of the set of known video segments is automatically updated.

5. The computer based method of claim 1 wherein the transmittable signal contains at least one indicator from a set of channel ID, video segment start time, and video segment duration.

6. The method of claim 1 wherein the recognizing takes place within a few seconds.

7. The method of claim 1 wherein the recognizing takes place in real time.

8. The method of claim 1 wherein the known video segments are advertisements.

9. A computer program product comprising a computer usable, nontransitory medium having a computer readable program code embodied therein, the computer readable program code adapted to be executed to implement a method of detecting a known video segment from a set of known video segments, the method comprising:

receiving a video stream;

creating statistical parameterized representations for windows of the video stream;

comparing the statistical parameterized representations with a database containing a set of fingerprints of the known video segments, wherein the set of fingerprints comprise statistical parameterized representations of the known video segments;

recognizing the known video segment when the comparing of the statistical parameterized representations with the database containing the set of fingerprints of the known video segments produces a threshold level of similarity;

generating a transmittable signal indicating the known video segment has appeared in the video stream.

10. The computer program product of claim 9 wherein the transmittable signal is transmitted over a network.

11. The computer program product of claim 9 wherein the database containing the set of fingerprints of the known video segments is periodically updated.

12. The computer program product of claim 9 wherein the database containing the set of fingerprints of the known video segments is automatically updated.

13. The computer program product of claim 9 wherein the transmittable signal contains at least one indicator from a set of channel ID, video segment start time, and video segment duration.

14. The computer program product of claim 9 wherein the recognizing takes place within a few seconds.

15. The computer program product of claim 9 wherein the recognizing takes place in real time.

16. The computer program product of claim 9 wherein the known video segments are advertisements.

* * * * *